(12) United States Patent
Suzuki

(10) Patent No.: US 7,843,110 B2
(45) Date of Patent: Nov. 30, 2010

(54) DRIVING APPARATUS

(75) Inventor: Jun Suzuki, Fujimino (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 12/532,930

(22) PCT Filed: Mar. 30, 2007

(86) PCT No.: PCT/JP2007/057063
§ 371 (c)(1),
(2), (4) Date: Jan. 4, 2010

(87) PCT Pub. No.: WO2008/126241
PCT Pub. Date: Oct. 23, 2008

(65) Prior Publication Data
US 2010/0109478 A1    May 6, 2010

(51) Int. Cl.
*H02N 2/00* (2006.01)
(52) U.S. Cl. .................. 310/309; 310/14; 310/328
(58) Field of Classification Search .............. 310/14, 310/309, 328
See application file for complete search history.

(56) References Cited

U.S. PATENT DOCUMENTS

| 2002/0125789 | A1* | 9/2002 | Brandt | 310/309 |
|---|---|---|---|---|
| 2003/0227700 | A1* | 12/2003 | Mizuno et al. | 359/877 |
| 2005/0035682 | A1* | 2/2005 | Tsuboi et al. | 310/309 |
| 2006/0082250 | A1* | 4/2006 | Ko et al. | 310/309 |
| 2006/0125346 | A1* | 6/2006 | Yoda | 310/309 |
| 2006/0125347 | A1* | 6/2006 | Yoda et al. | 310/309 |
| 2007/0063614 | A1* | 3/2007 | Tsuboi et al. | 310/309 |
| 2008/0309191 | A1* | 12/2008 | Chou et al. | 310/309 |

FOREIGN PATENT DOCUMENTS

JP    62-105440    5/1987

(Continued)

OTHER PUBLICATIONS

Hasebe, T et al., "Development of wide lateral stroke electro-magnetic actuator driven by low voltage", IEEJ Sensors and Micromachines Society Sogo-Kenkyukai/Micromachines and Sensor Systems Kenkyu-Kai, No. MSS-06-12, (May 15-16, 2006), pp. 51-55.

*Primary Examiner*—Thomas M Dougherty
(74) *Attorney, Agent, or Firm*—Nixon & Vanderhye P.C.

(57) ABSTRACT

A driving apparatus (100*t*) is provided with: stage portion (130) which can be displaced; a first elastic portion (120-1) whose one end is connected to the stage portion and which has elasticity to displace the stage portion in one direction; a driving source device (180), to which other end of the first elastic portion is connected, comprising: a first applying device (181) for applying an excitation force for displacing the stage portion such that the stage portion is resonated in the one direction at a resonance frequency determined by the stage portion and the first elastic portion; and a second applying device (182) for applying a driving force for displacing, in a stepwise manner or in a continuous manner, the stage portion in other direction; a second elastic portion (120-2) whose one end is connected to the driving source device and which has elasticity to displace the stage portion in the one direction; a third elastic portion (120-3) whose one end is connected to other end of the second elastic portion and which has elasticity to displace the stage portion in the other direction; and a base portion (110) to which other end of the third elastic portion is connected.

10 Claims, 29 Drawing Sheets

FOREIGN PATENT DOCUMENTS

| | | |
|---|---|---|
| JP | 05-126517 | 5/1993 |
| JP | 05-314549 | 11/1993 |
| JP | 6-231493 | 8/1994 |
| JP | 06-231493 | 8/1994 |
| JP | 7-191756 | 7/1995 |
| JP | 2002-18665 | 1/2002 |

* cited by examiner

[FIG. 1]
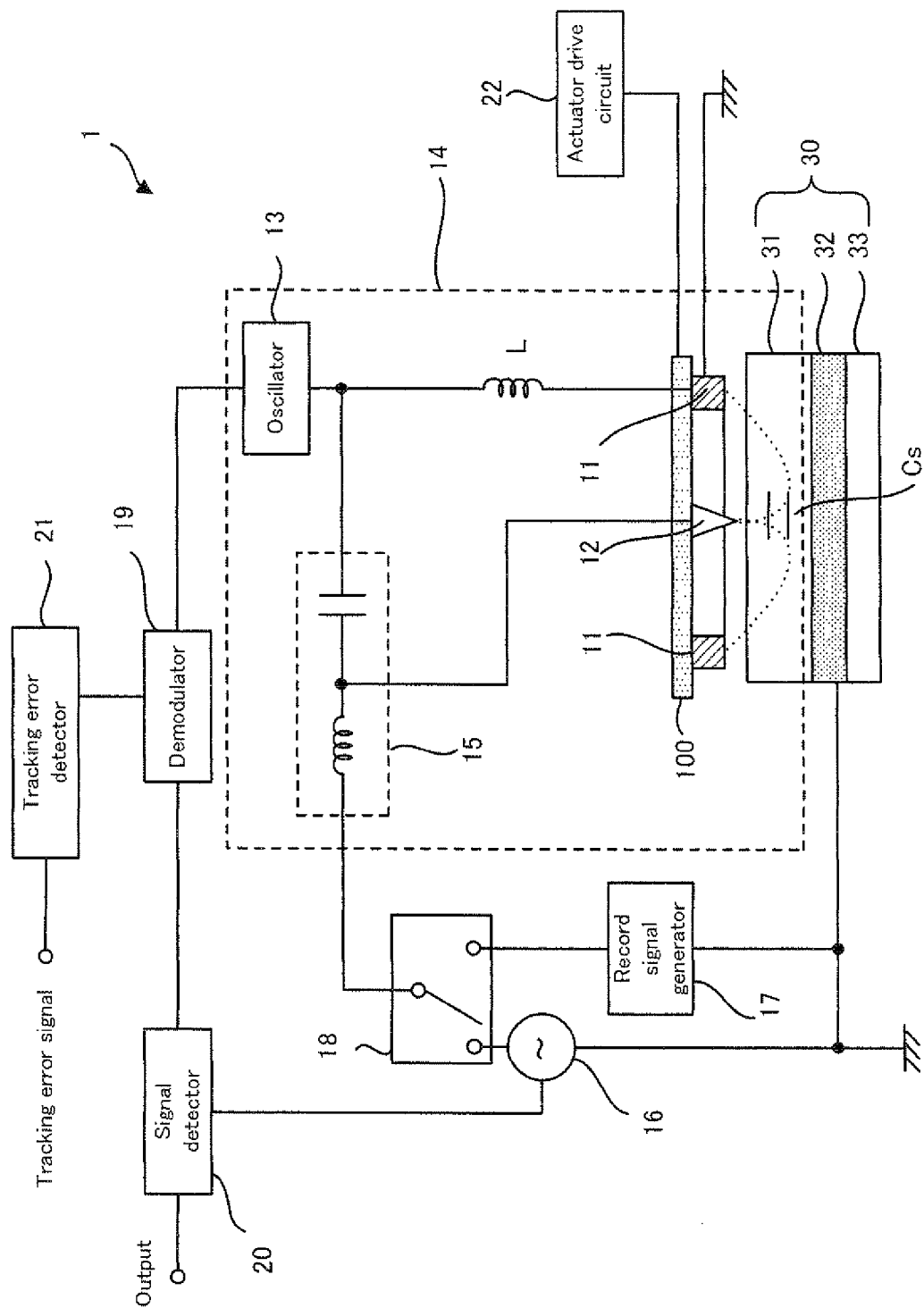

[FIG. 2]
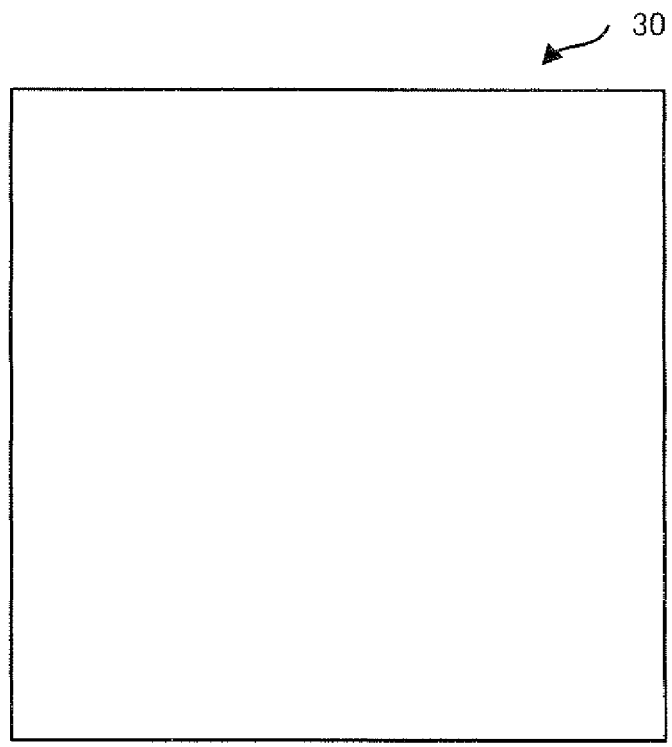
(a)
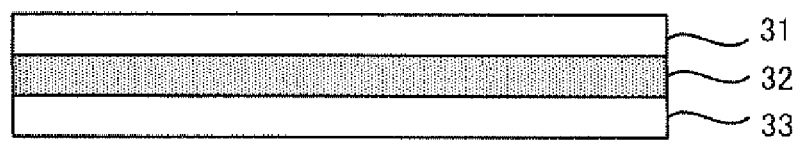
(b)

[FIG. 3]
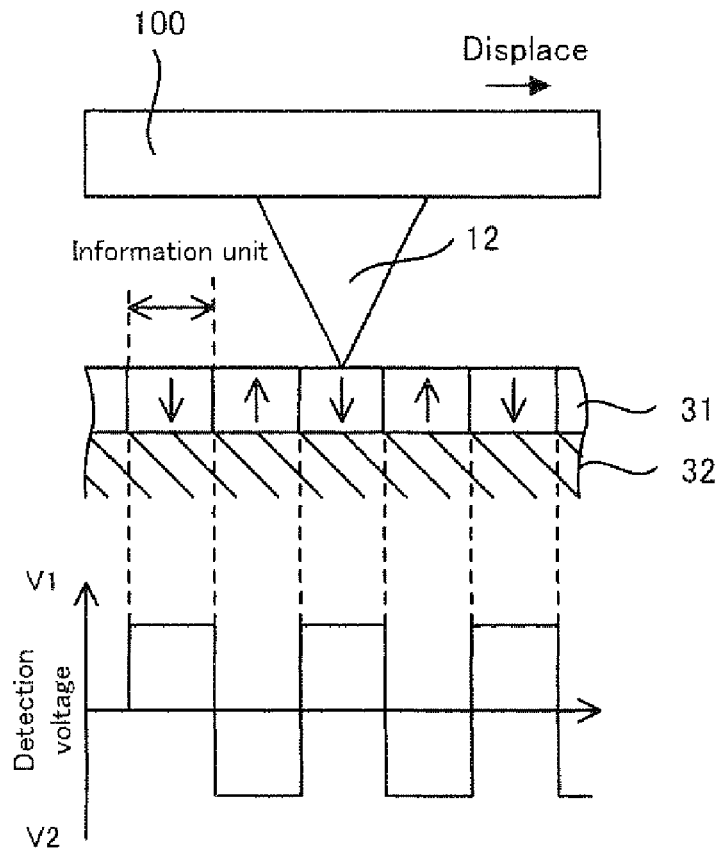
[FIG. 4]
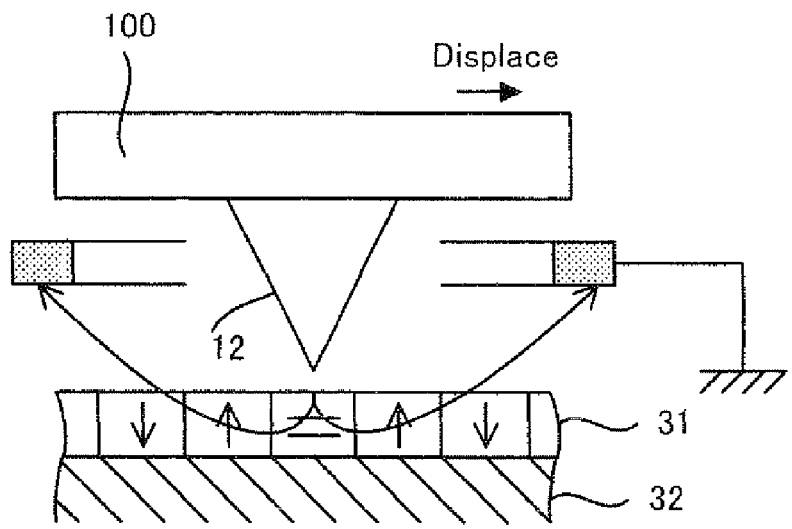

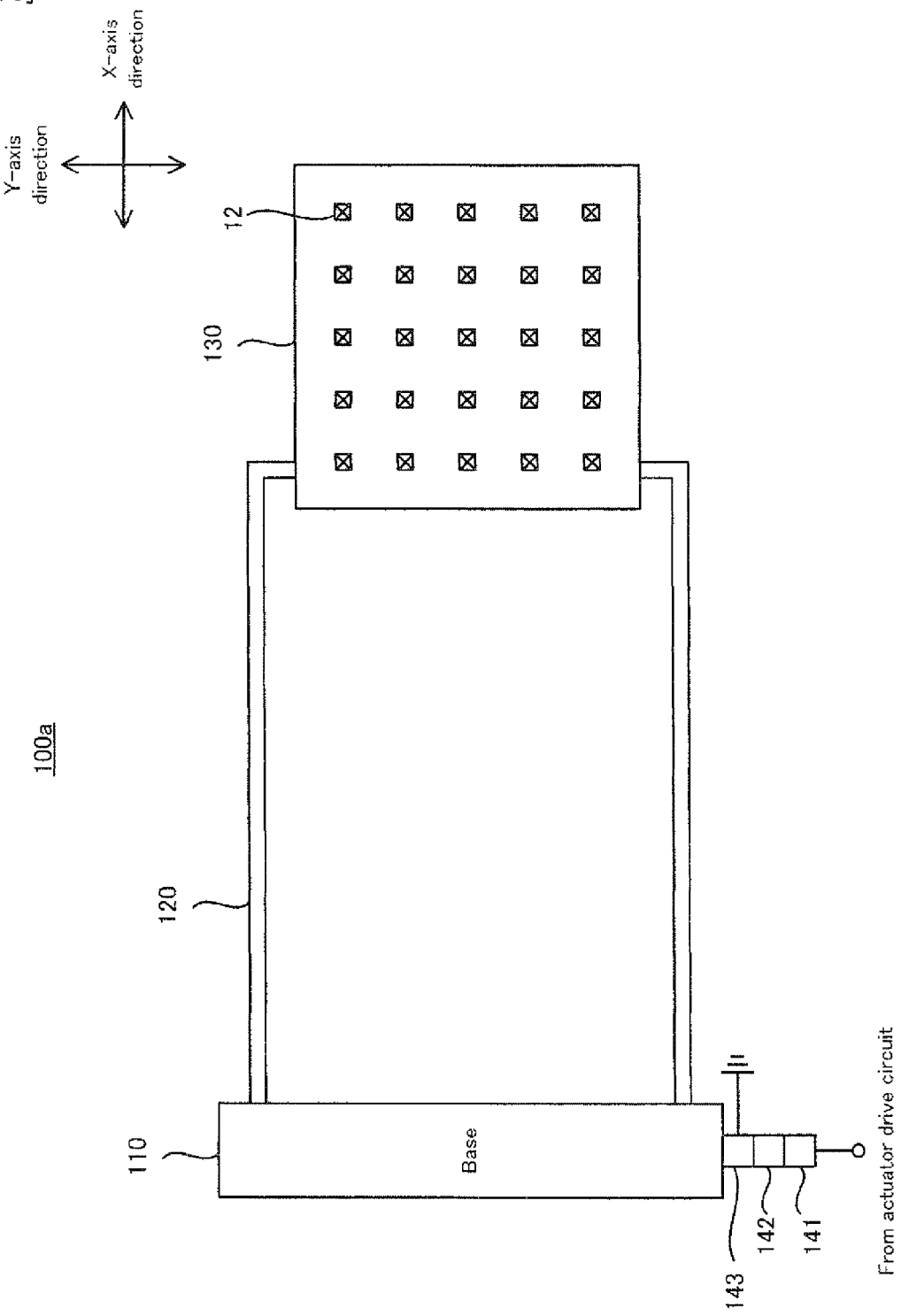

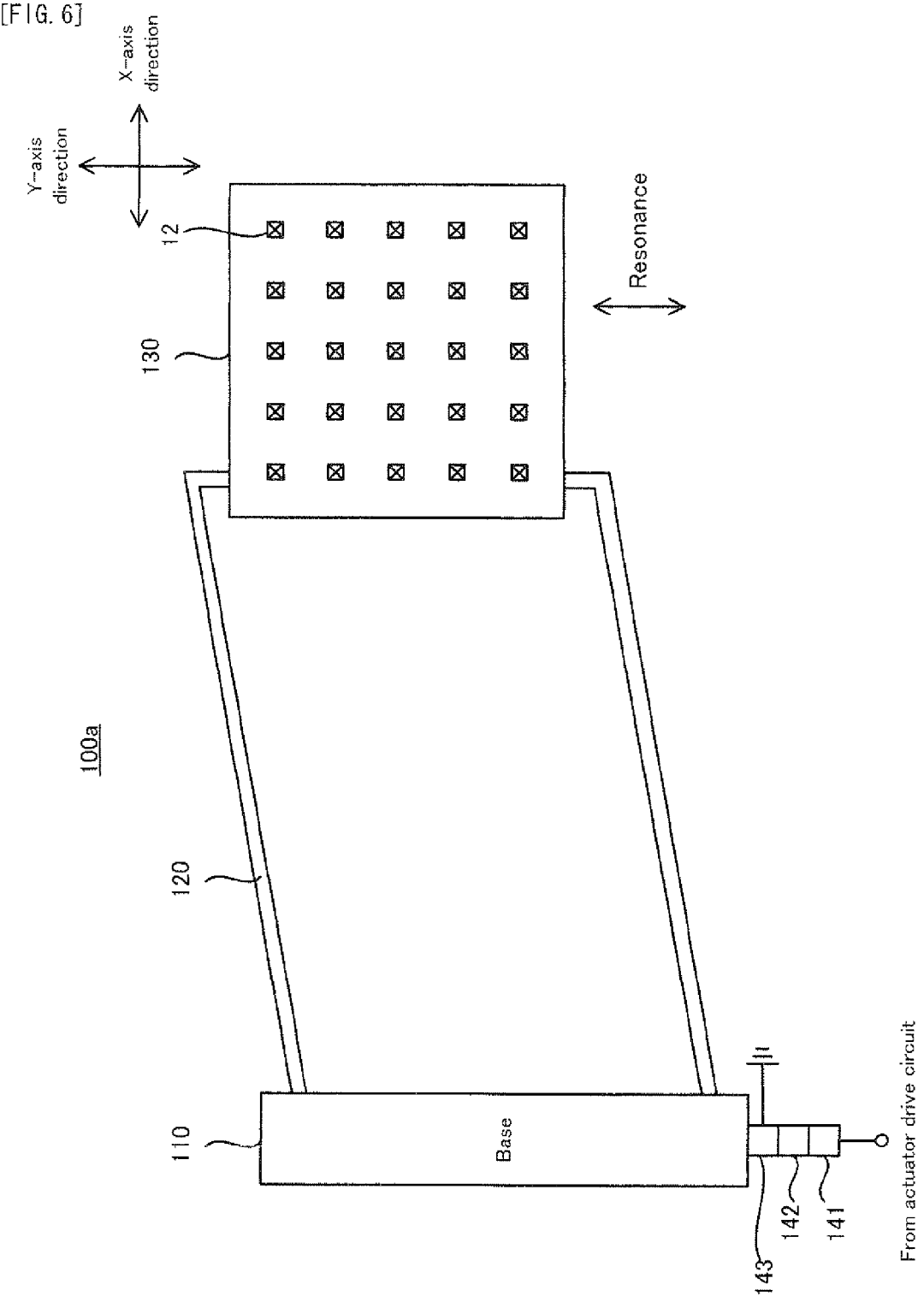

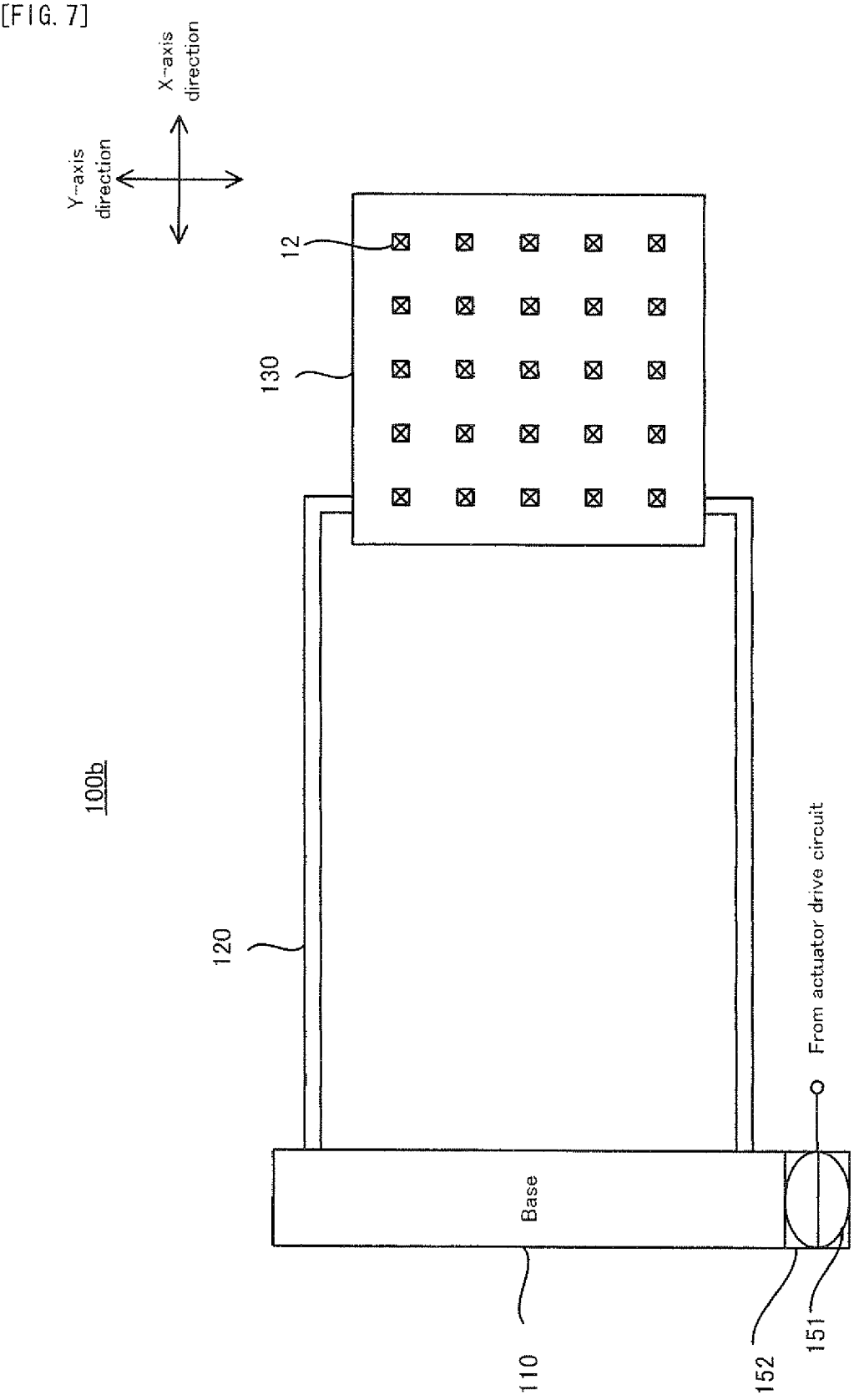

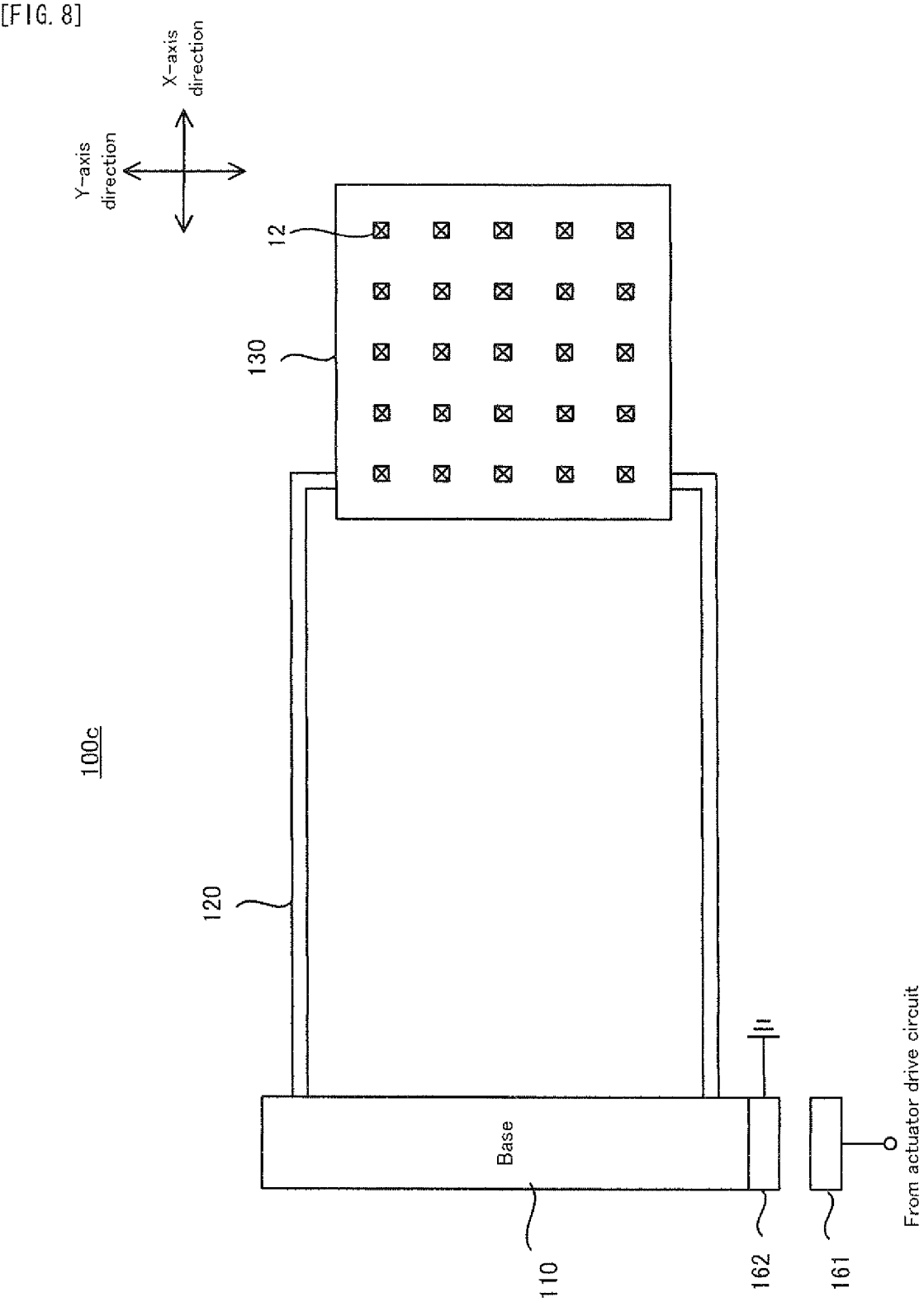

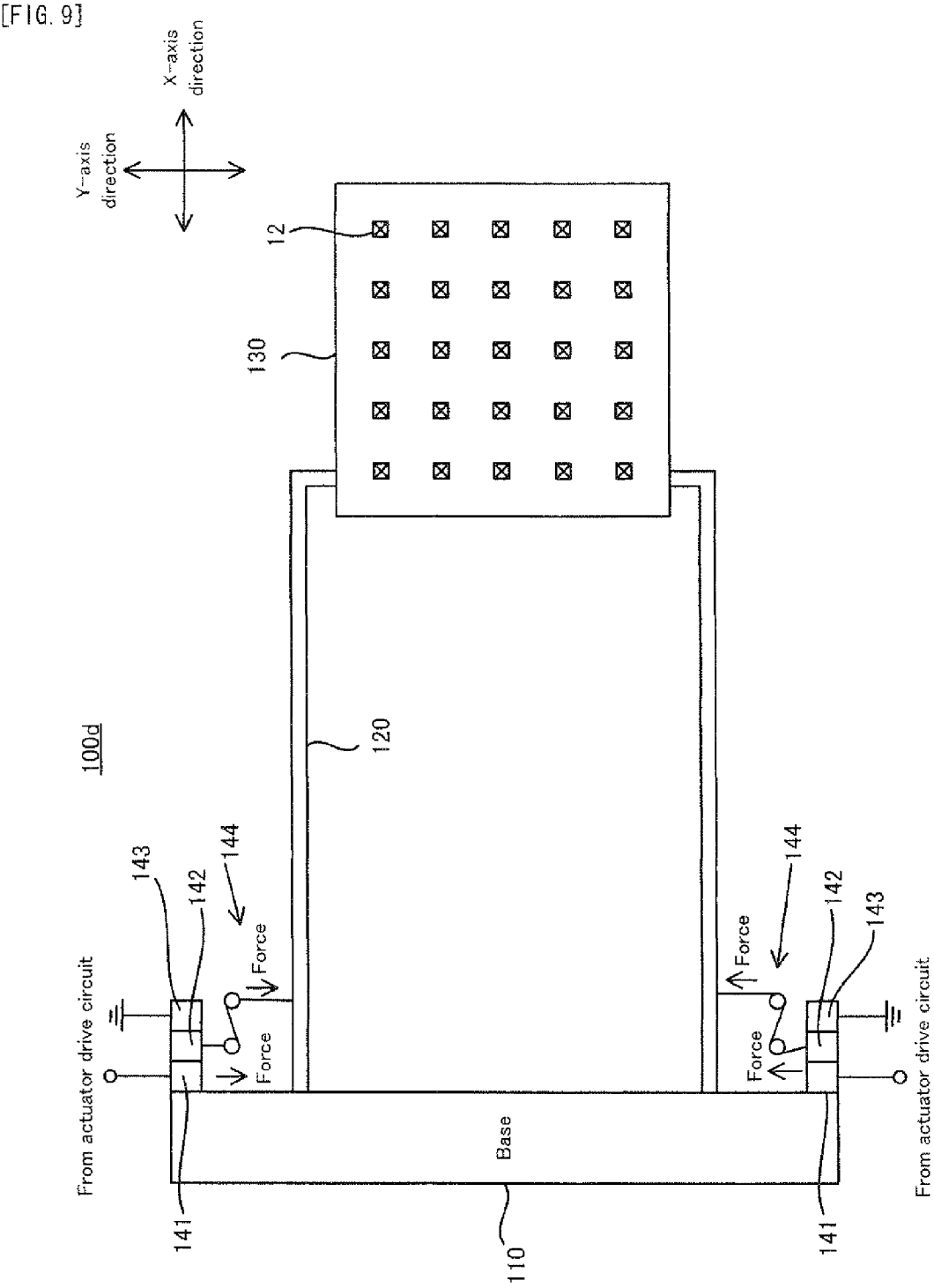

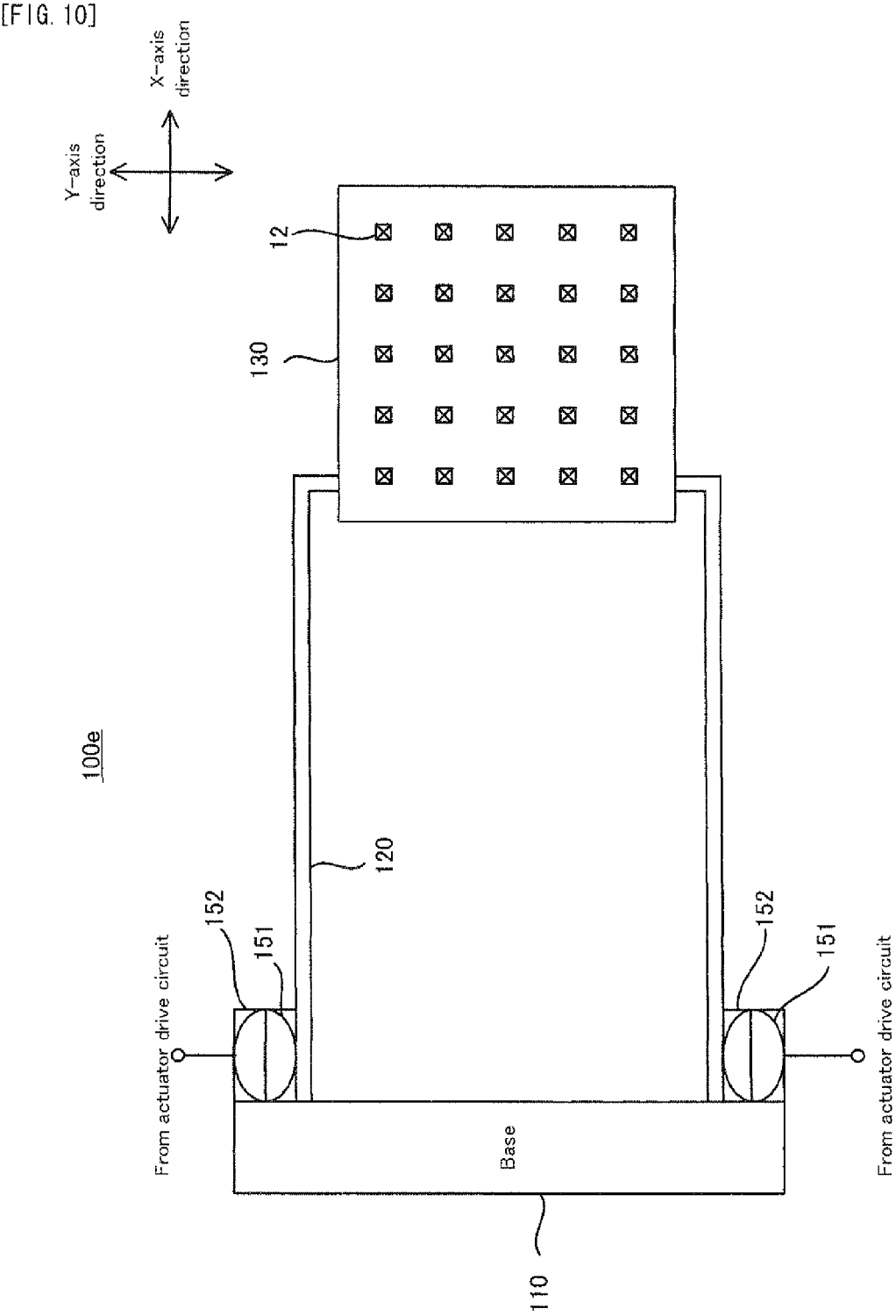

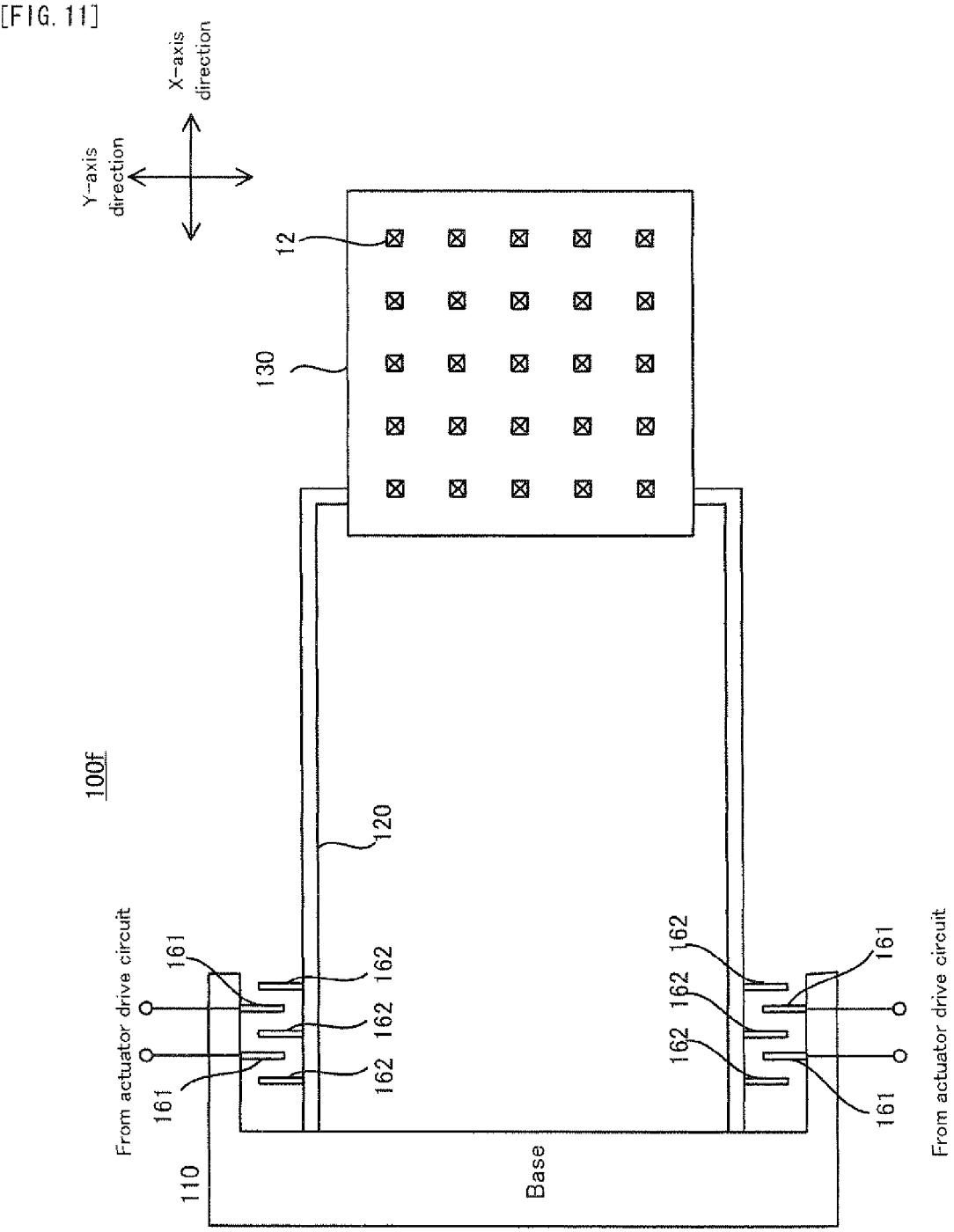

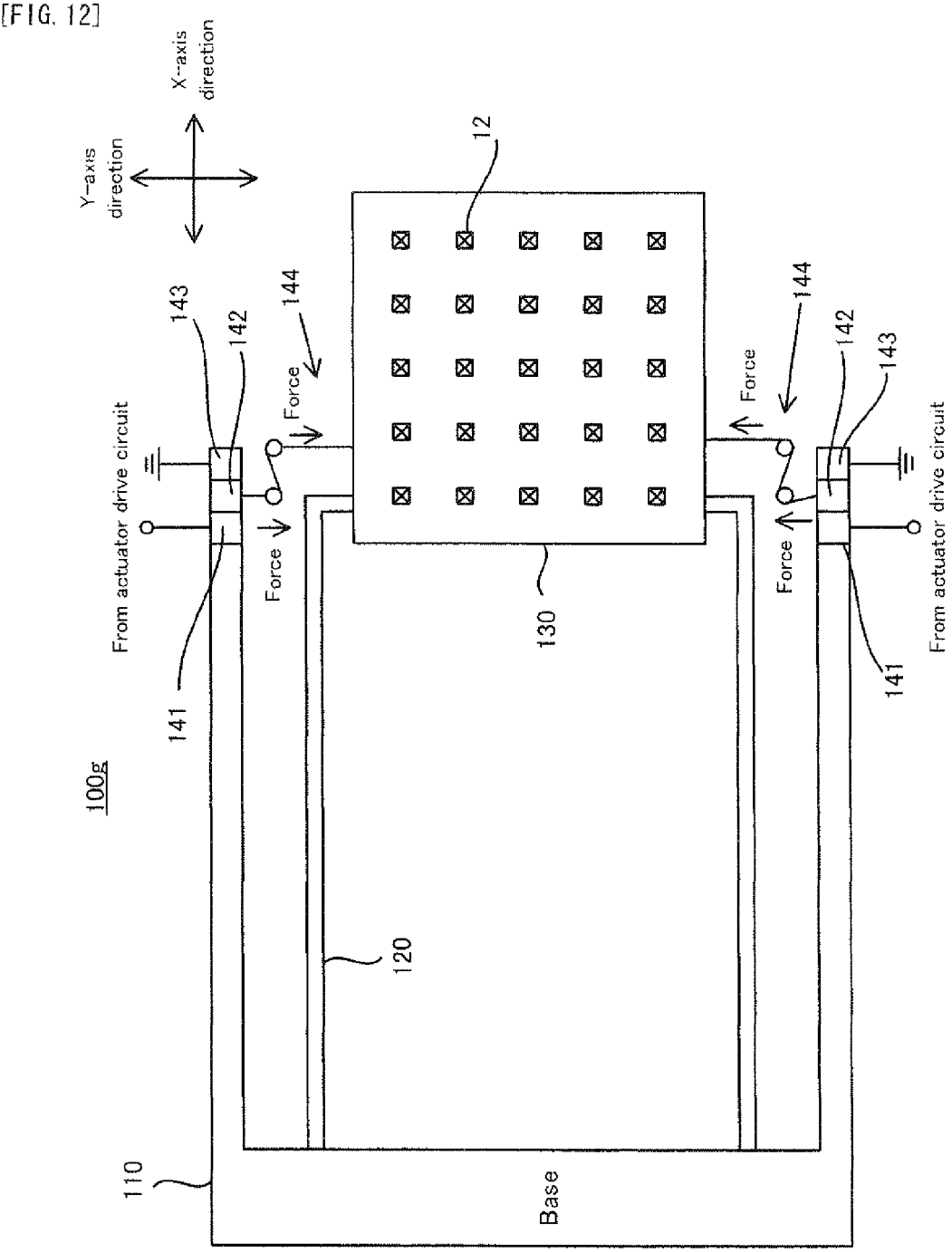

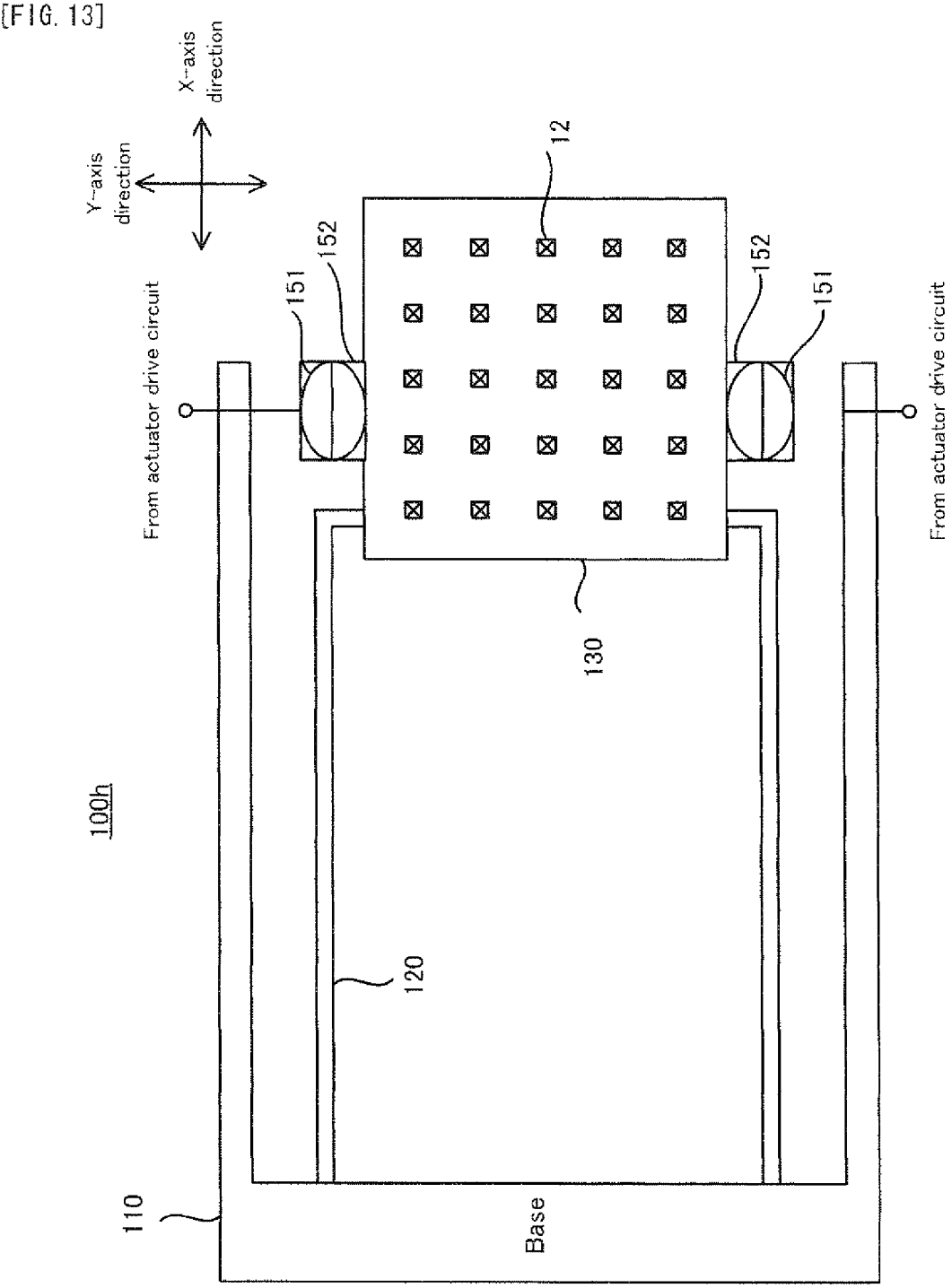

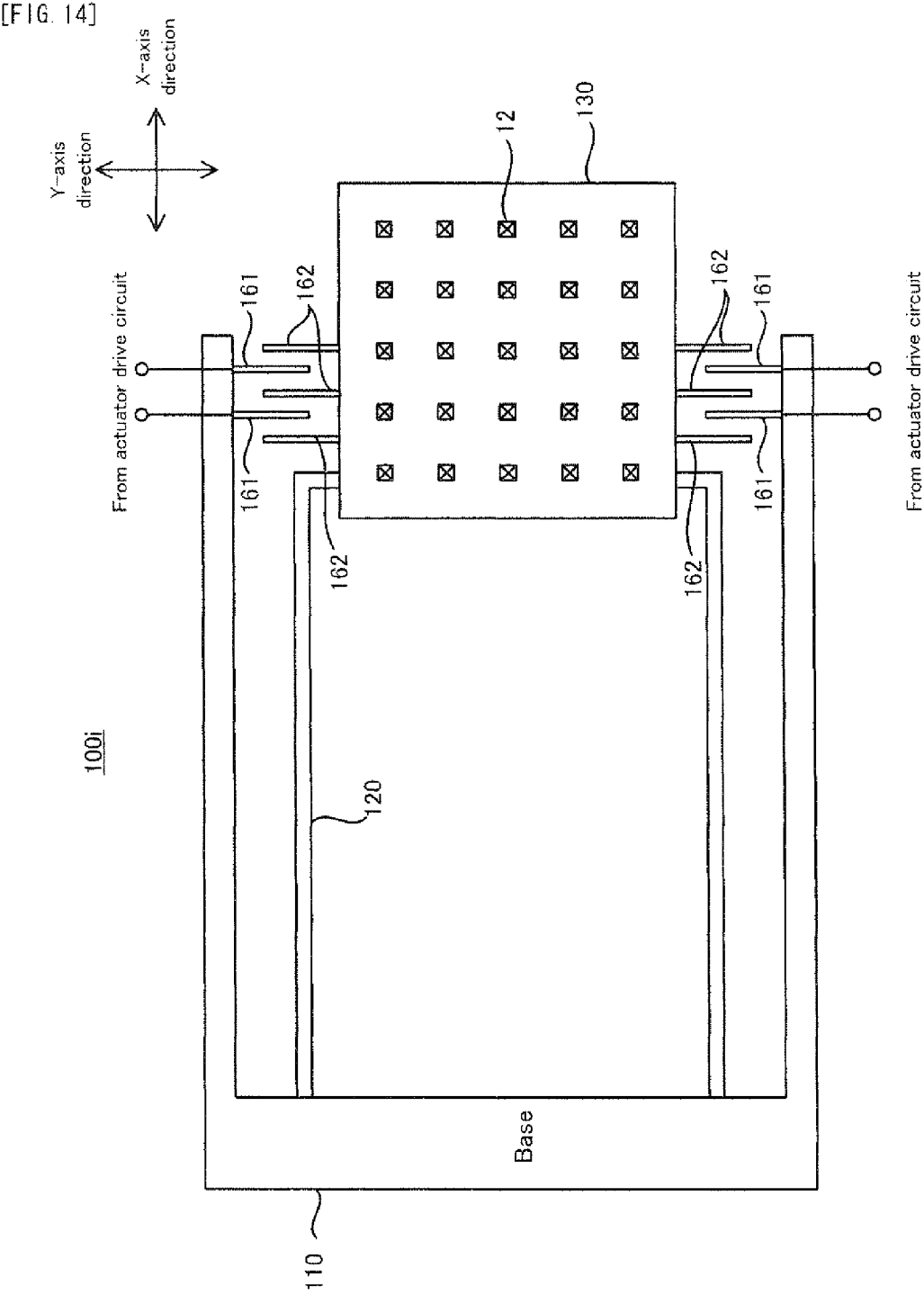

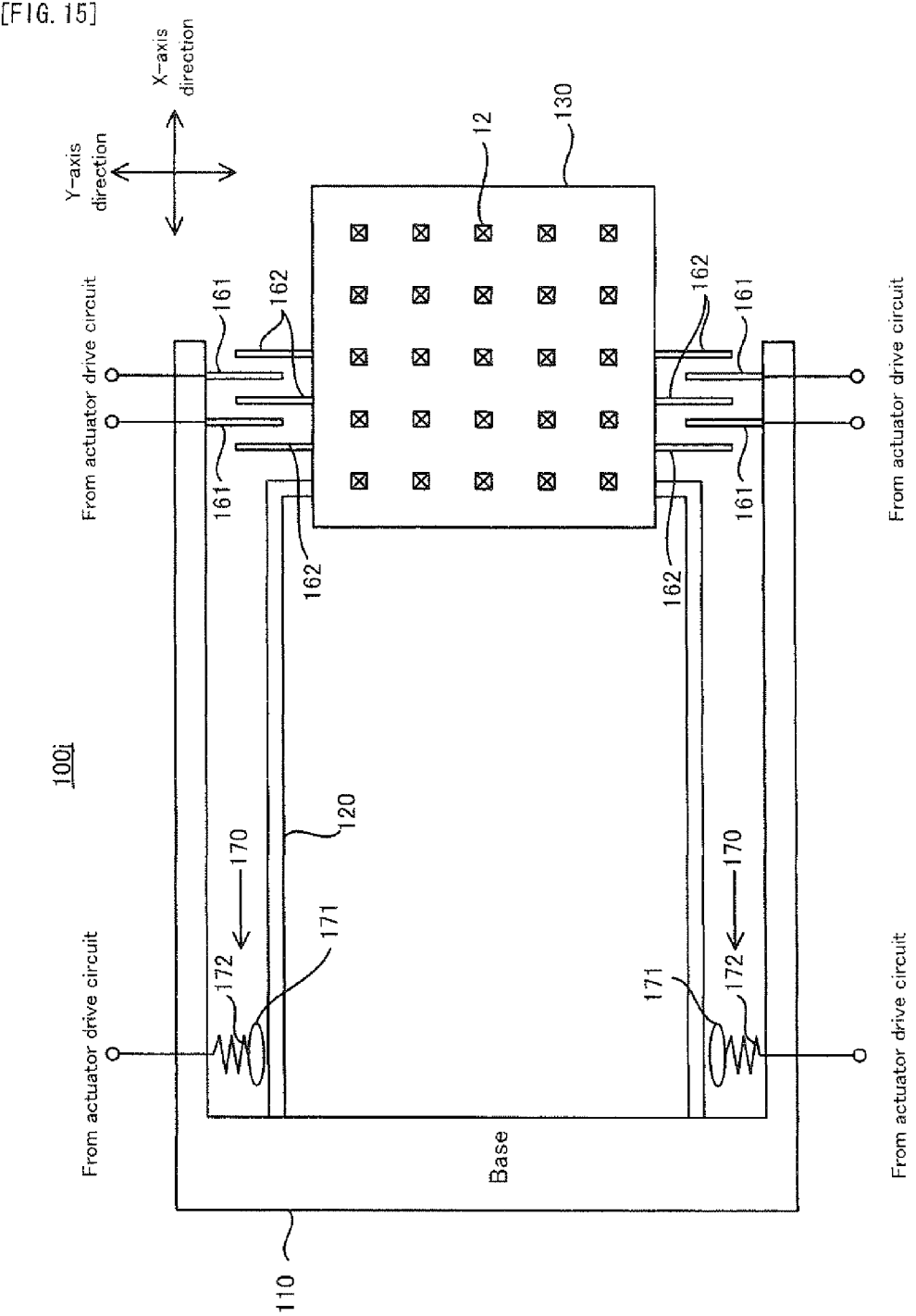

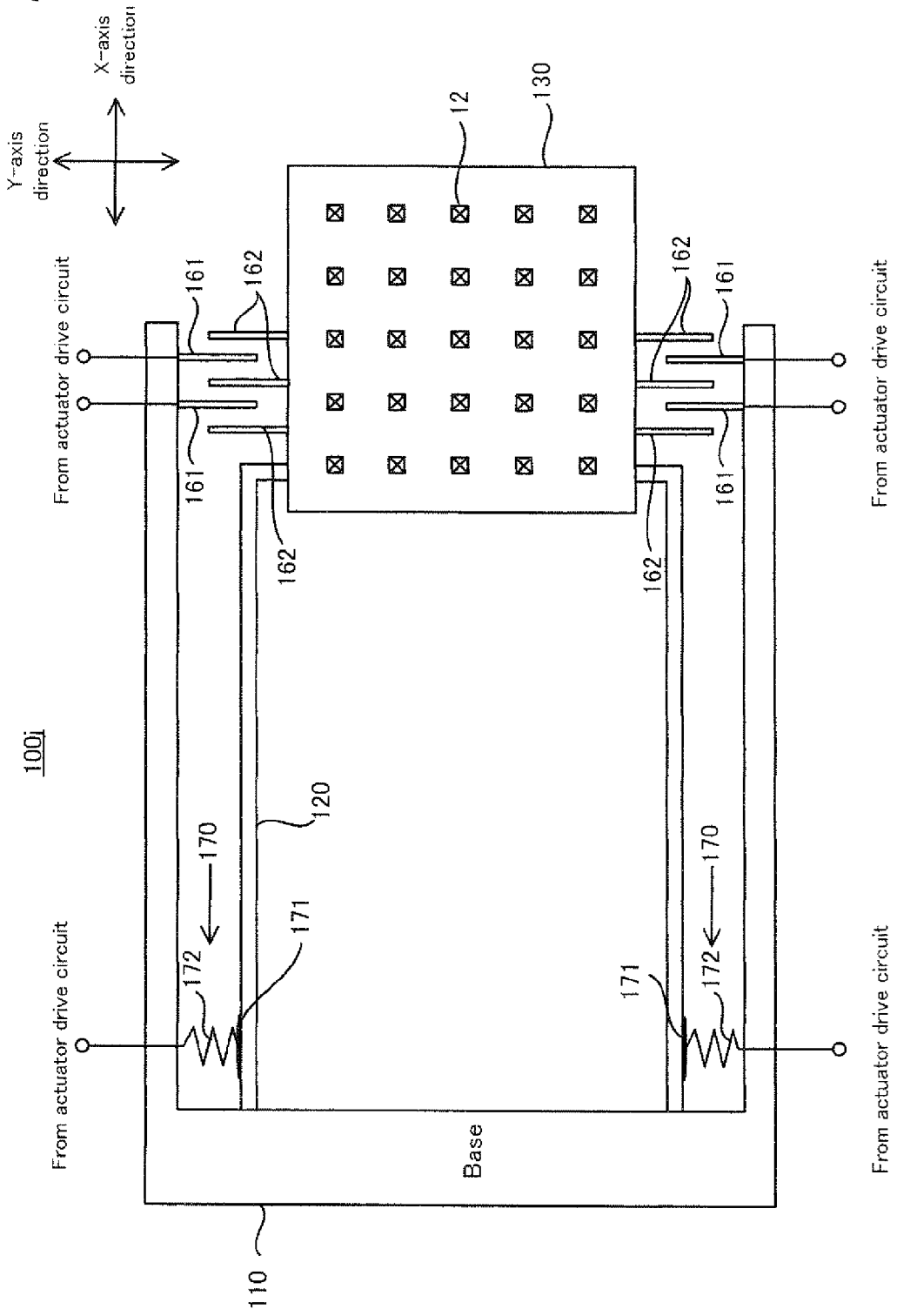

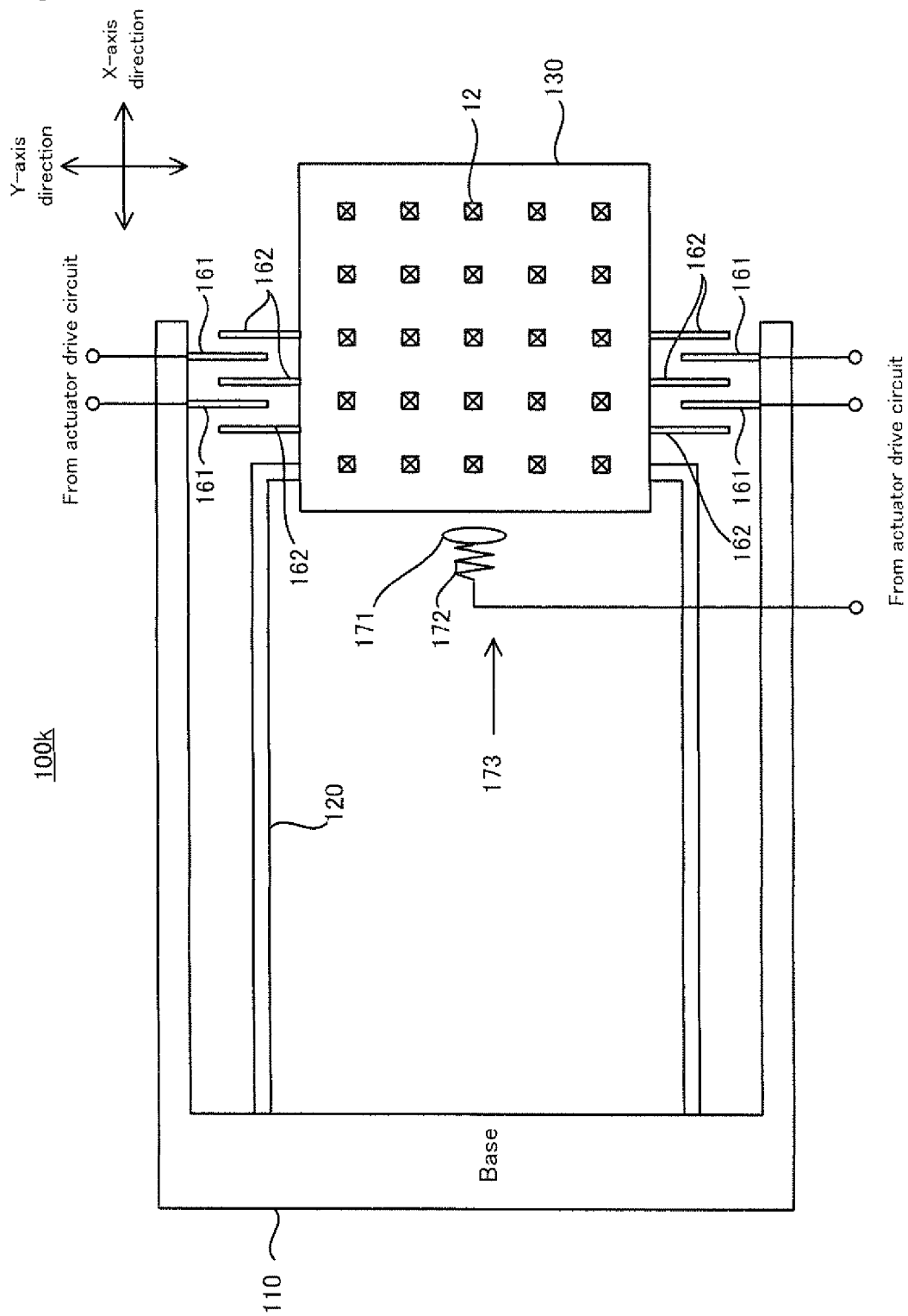
[FIG. 17]

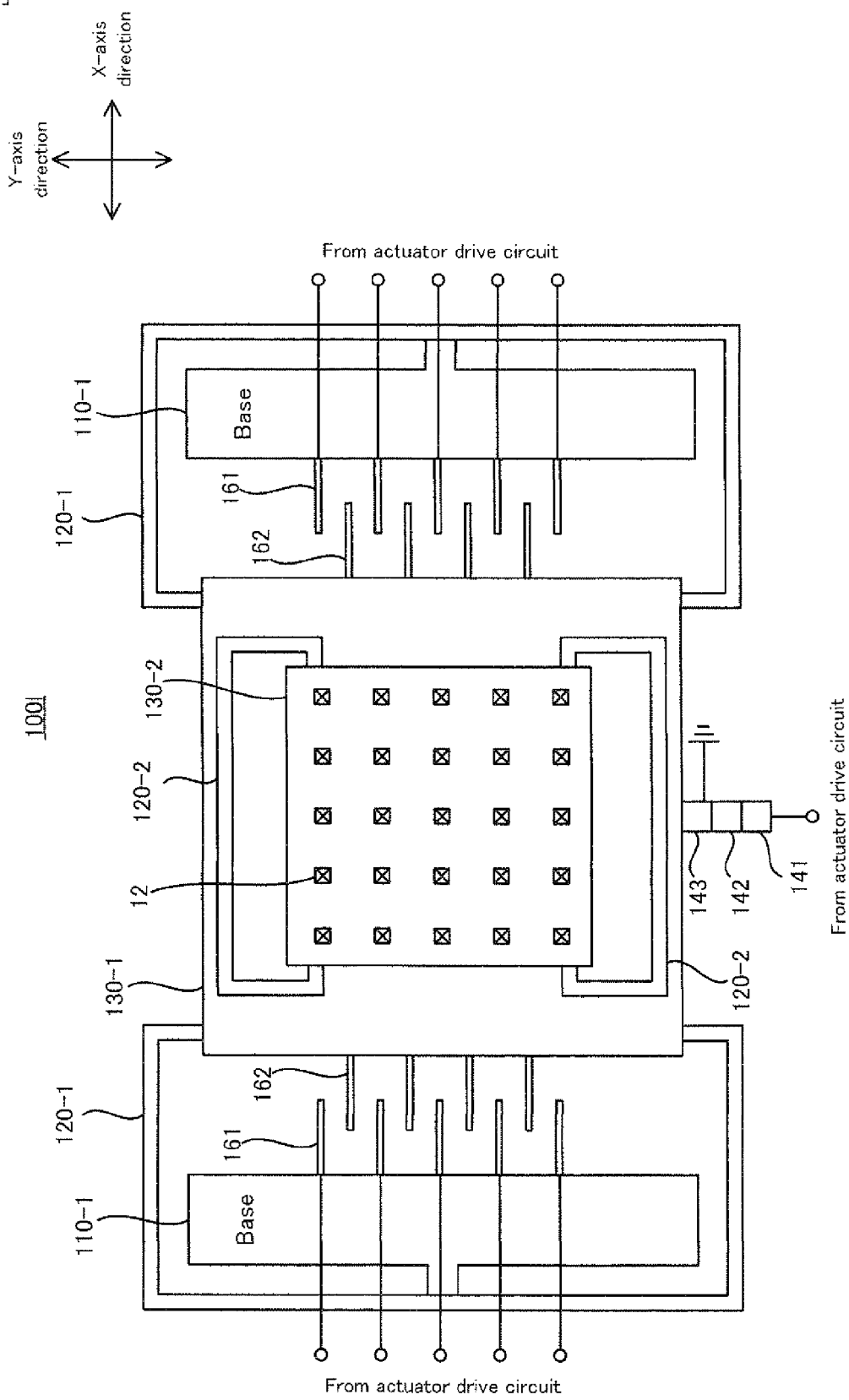
[FIG. 18]

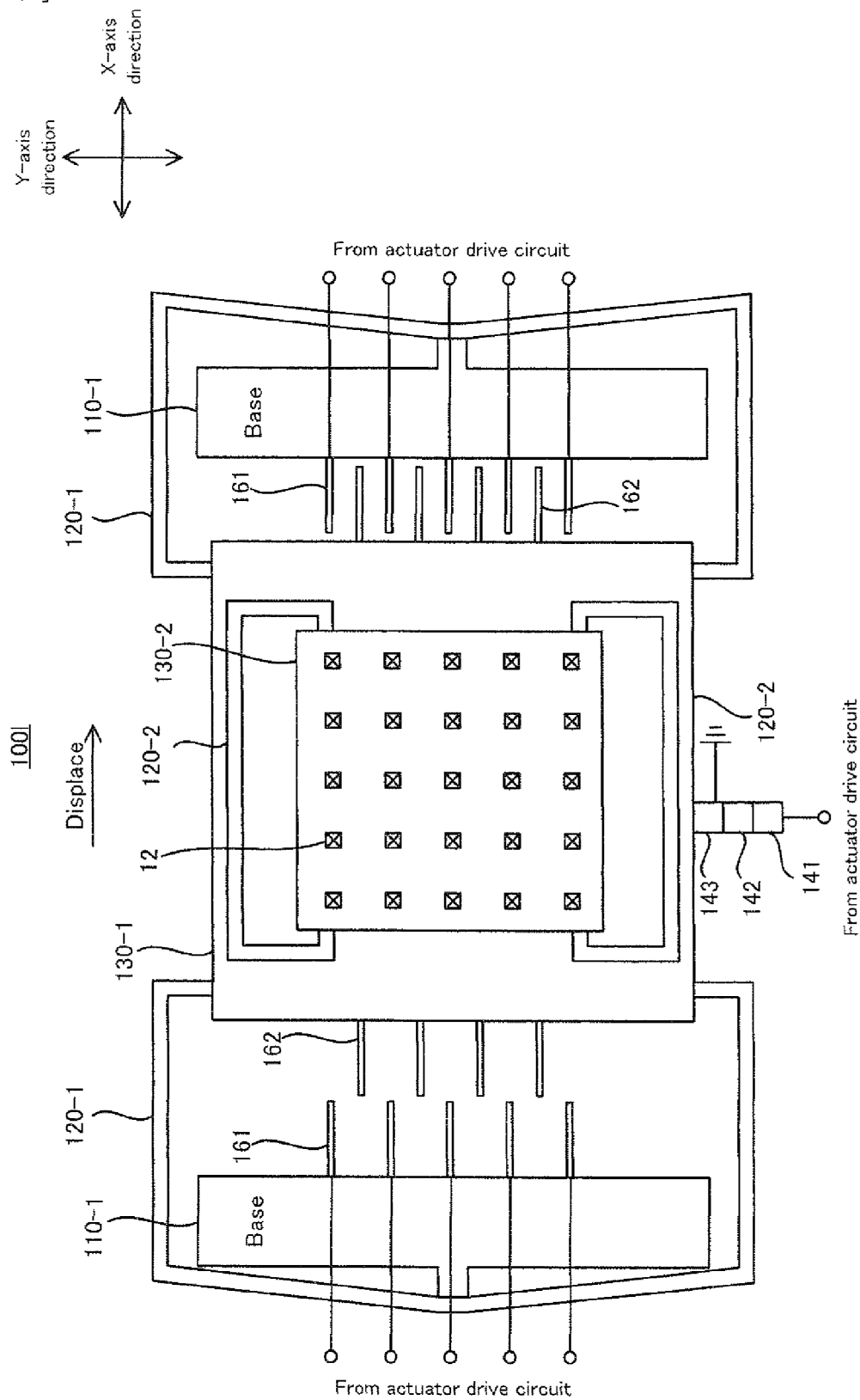

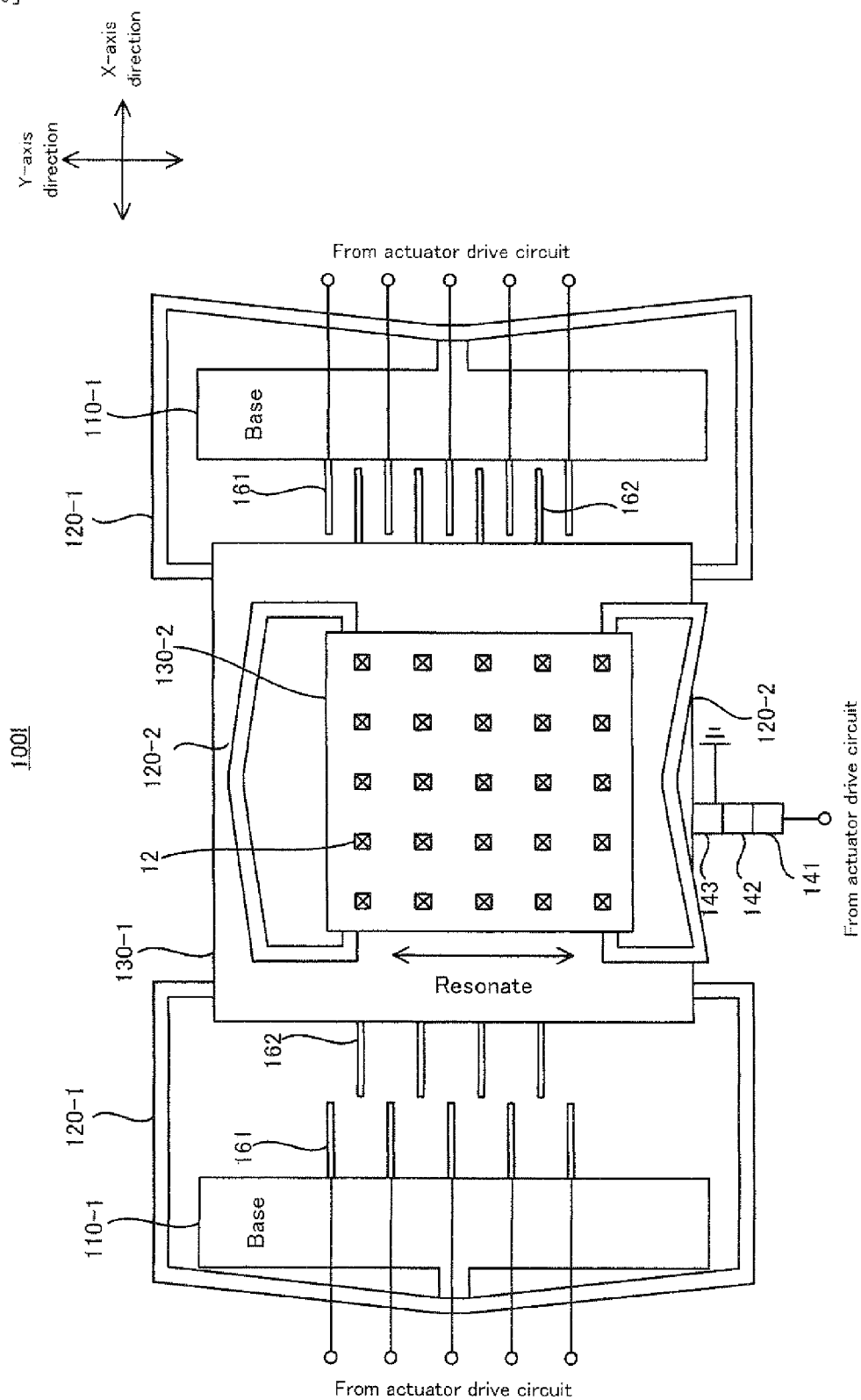
[FIG. 20]

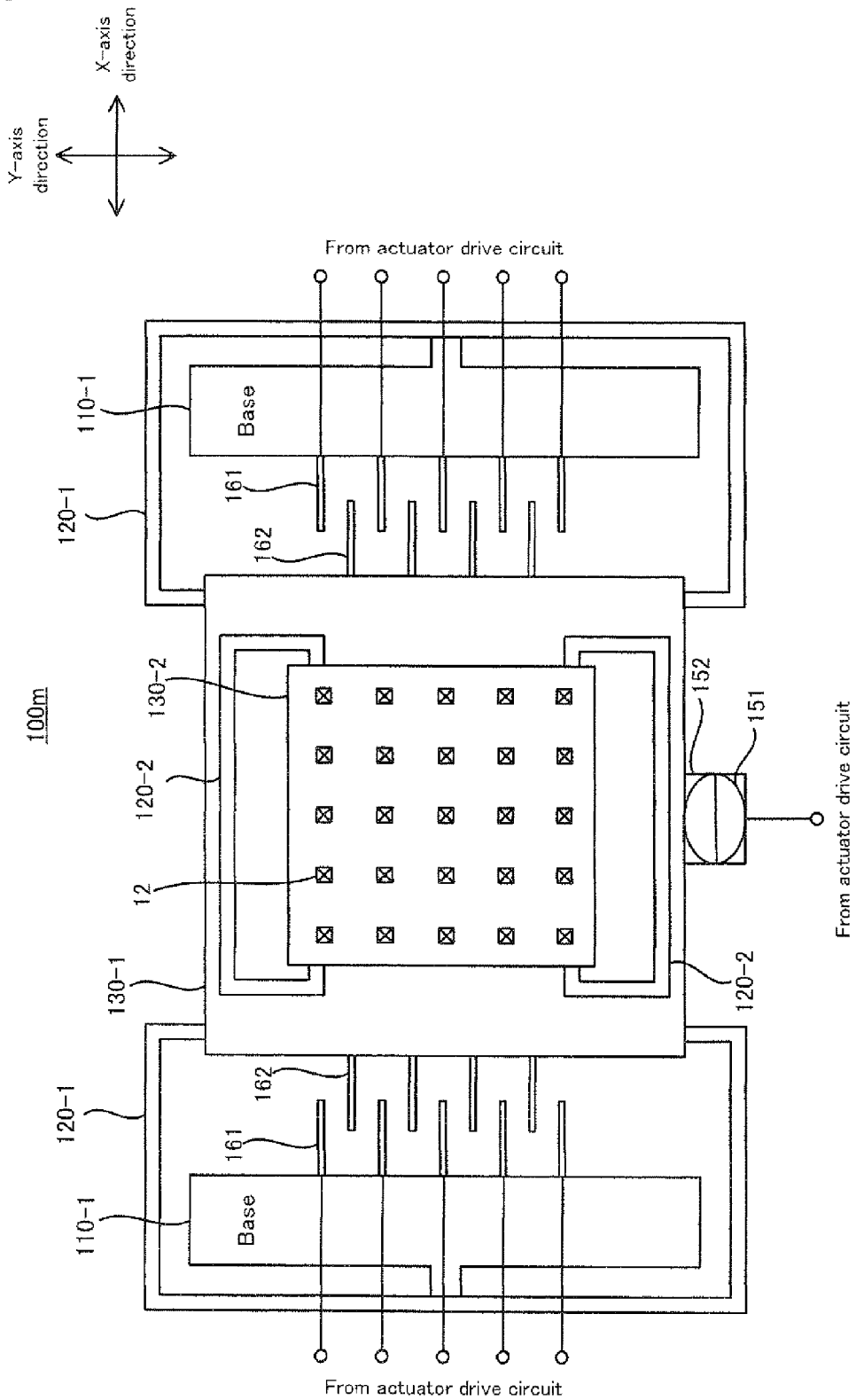

[FIG. 22]
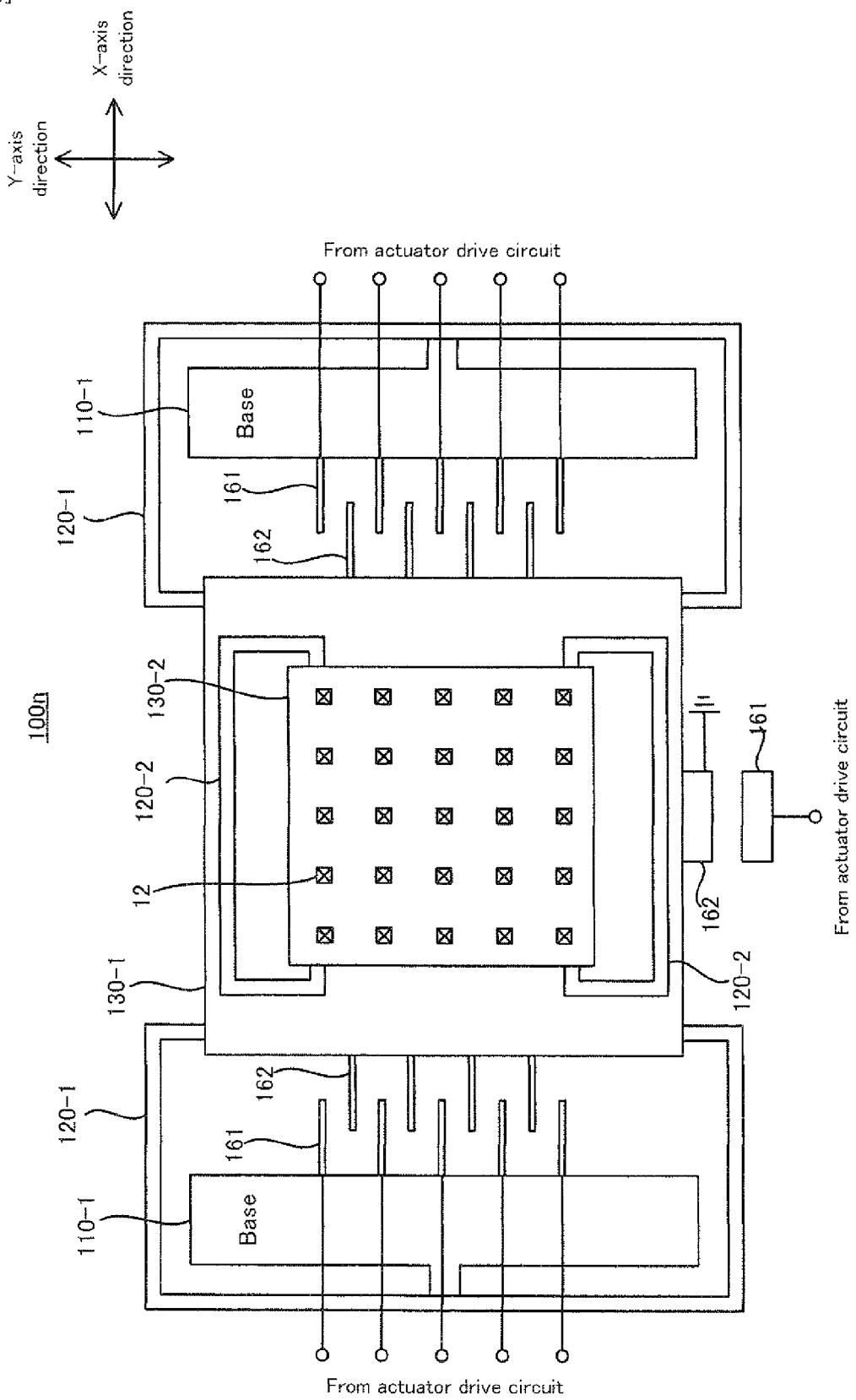

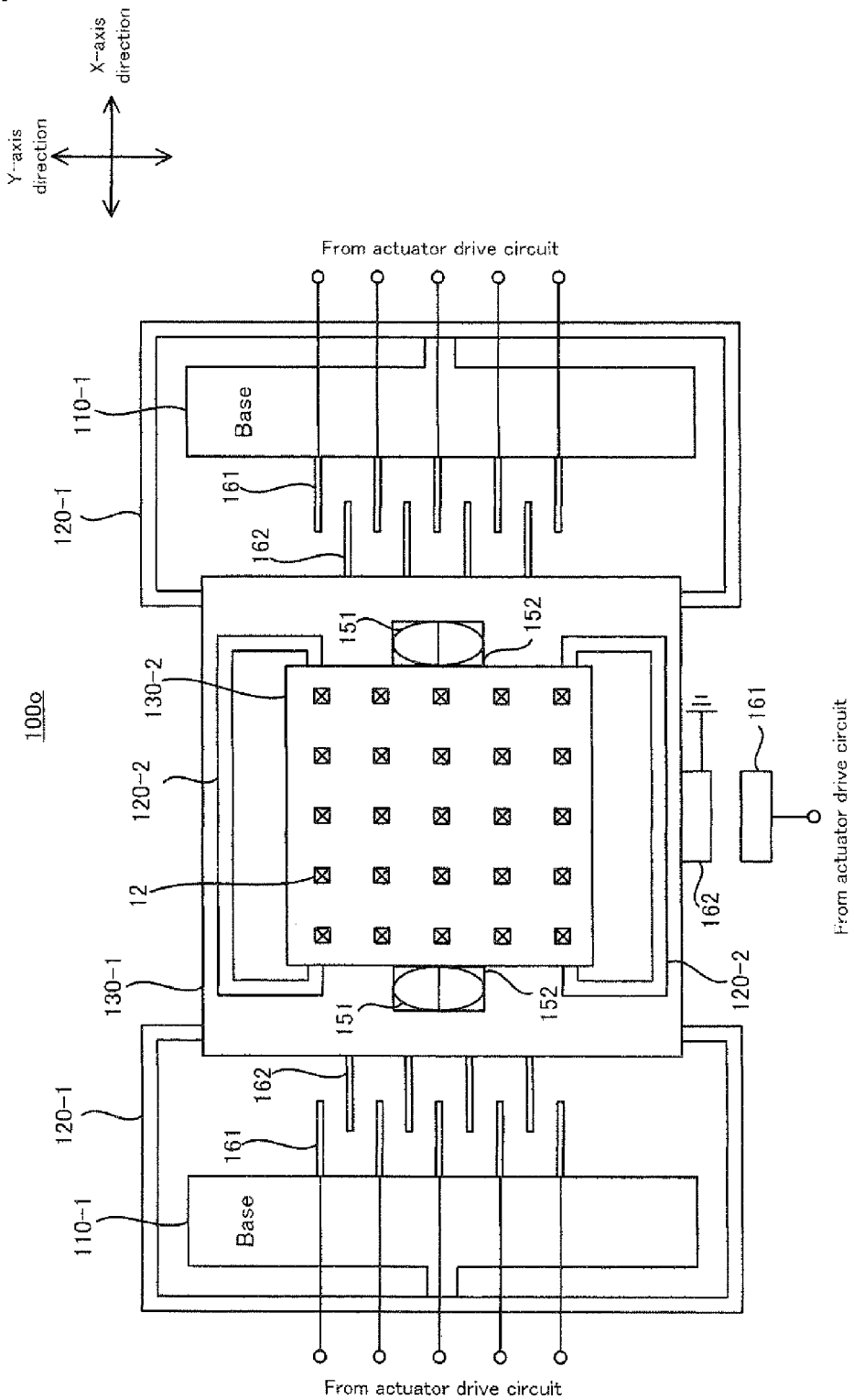

[FIG. 24]
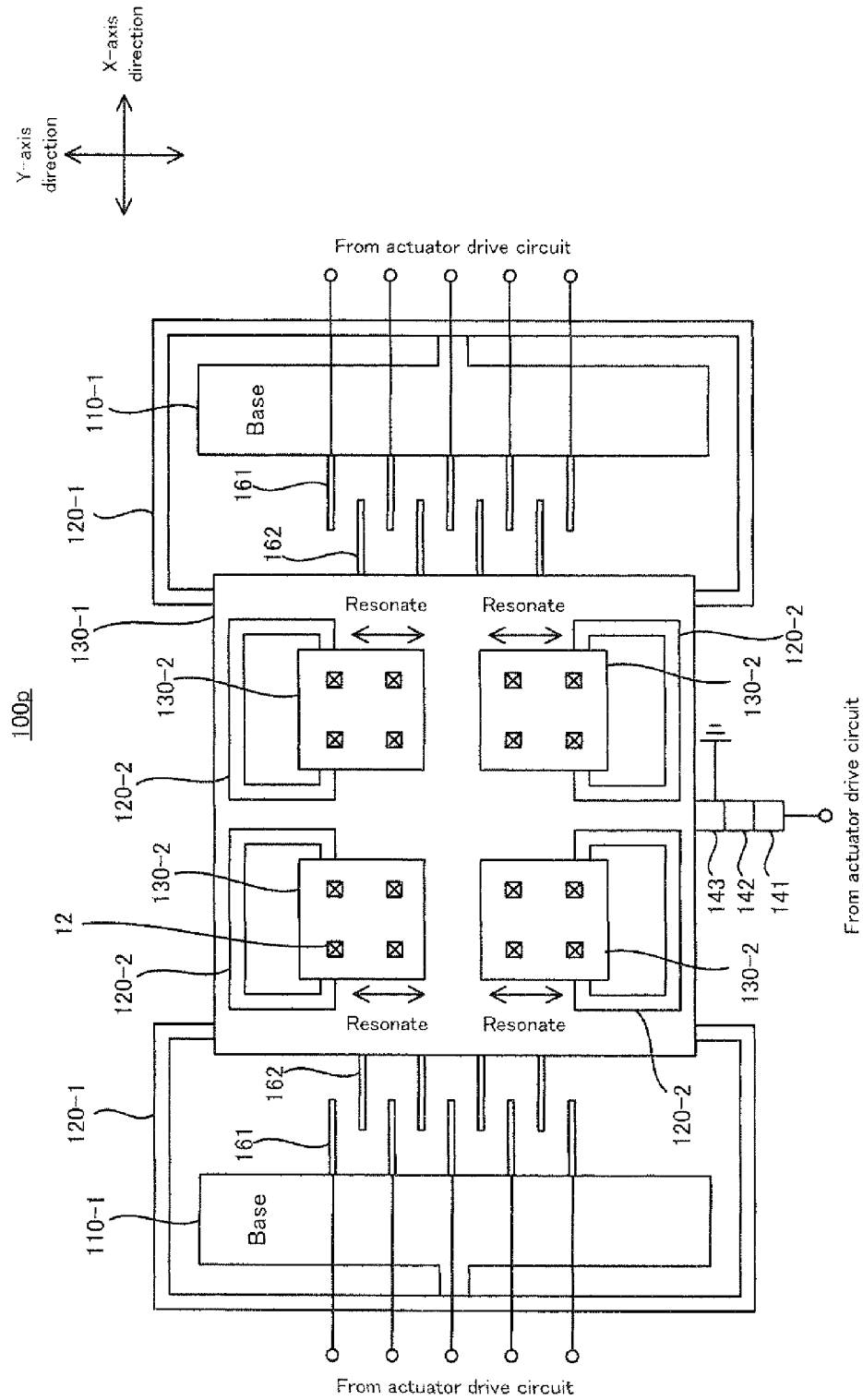

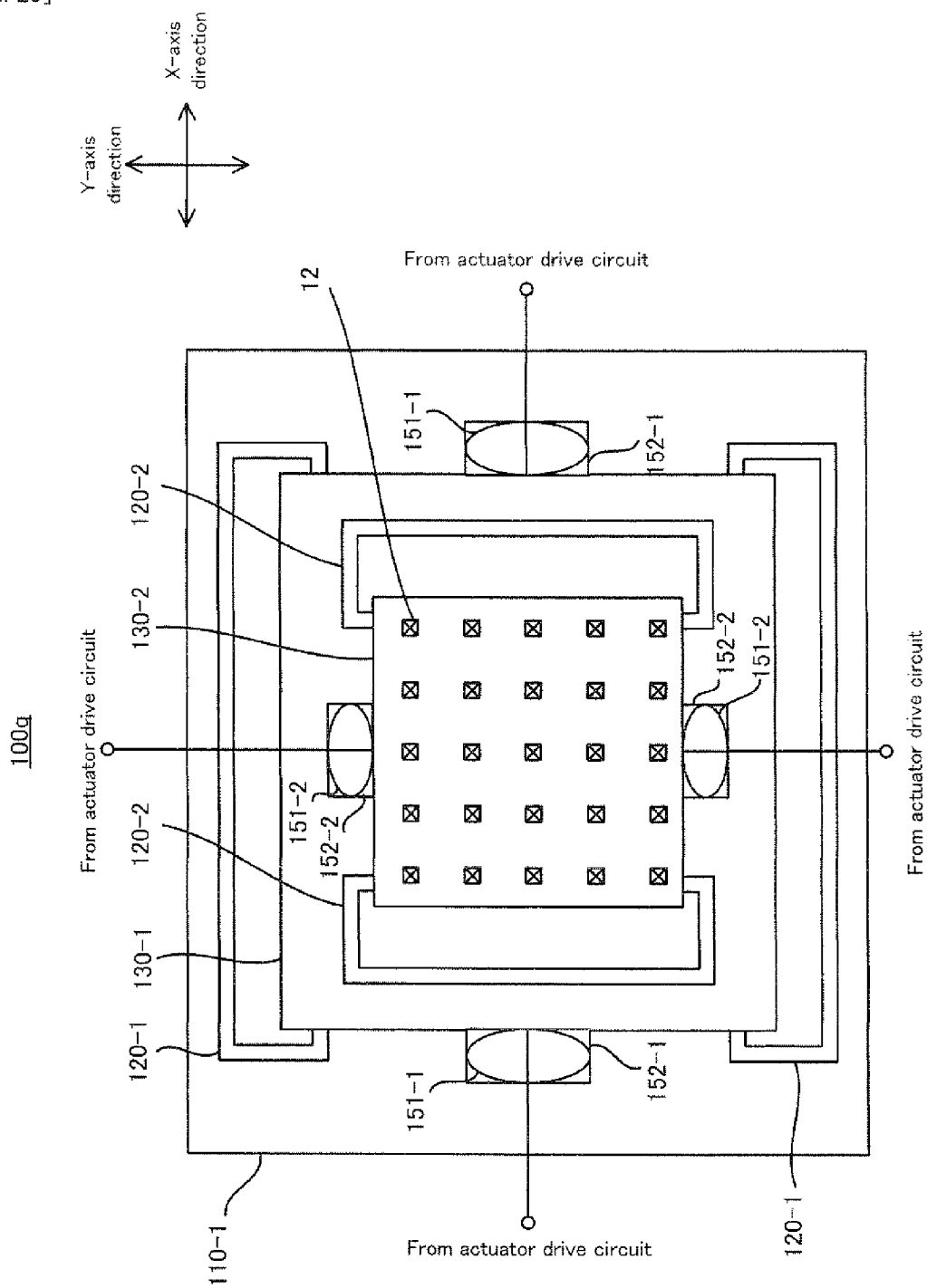
[FIG. 25]

[FIG. 26]
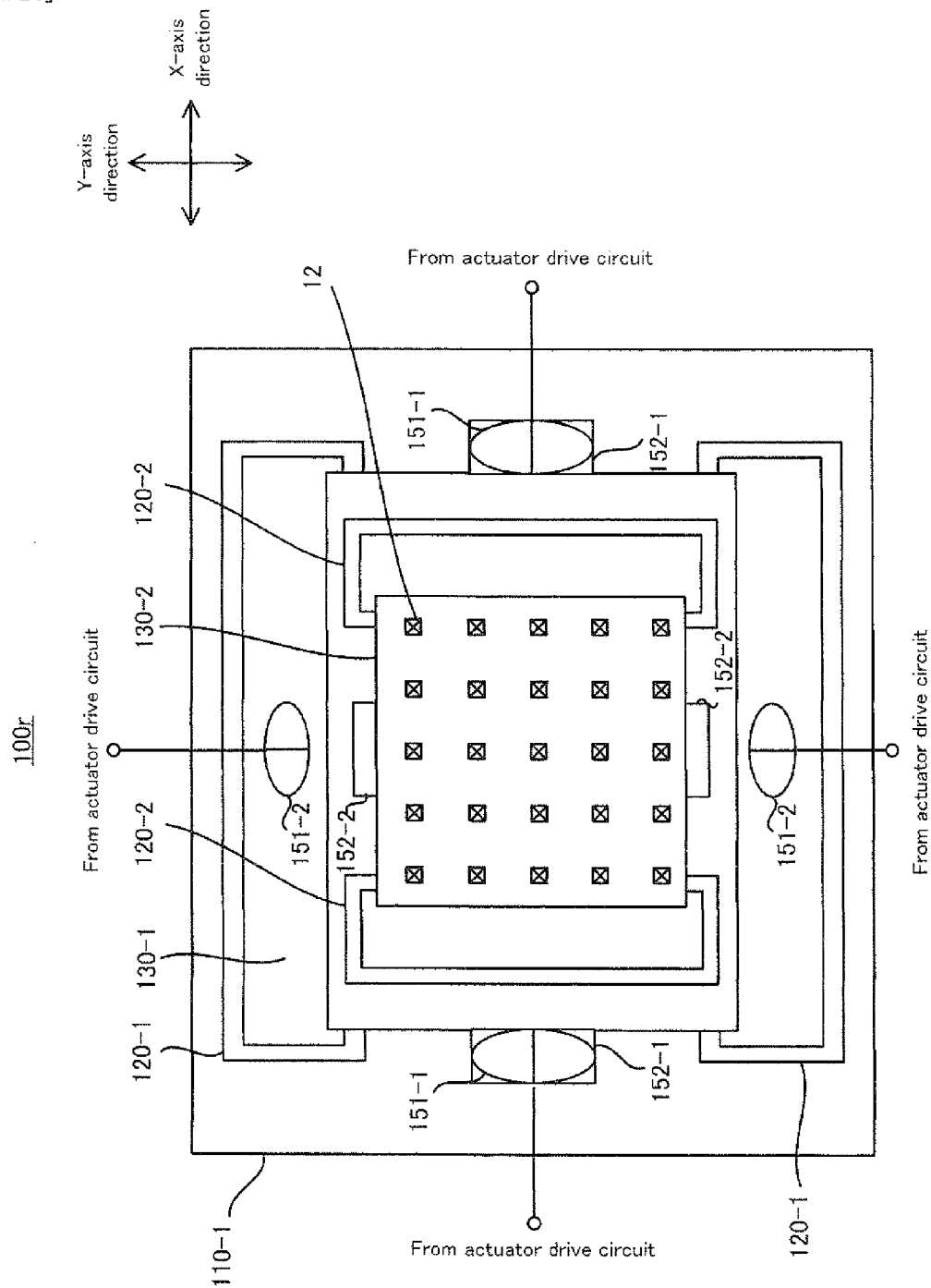

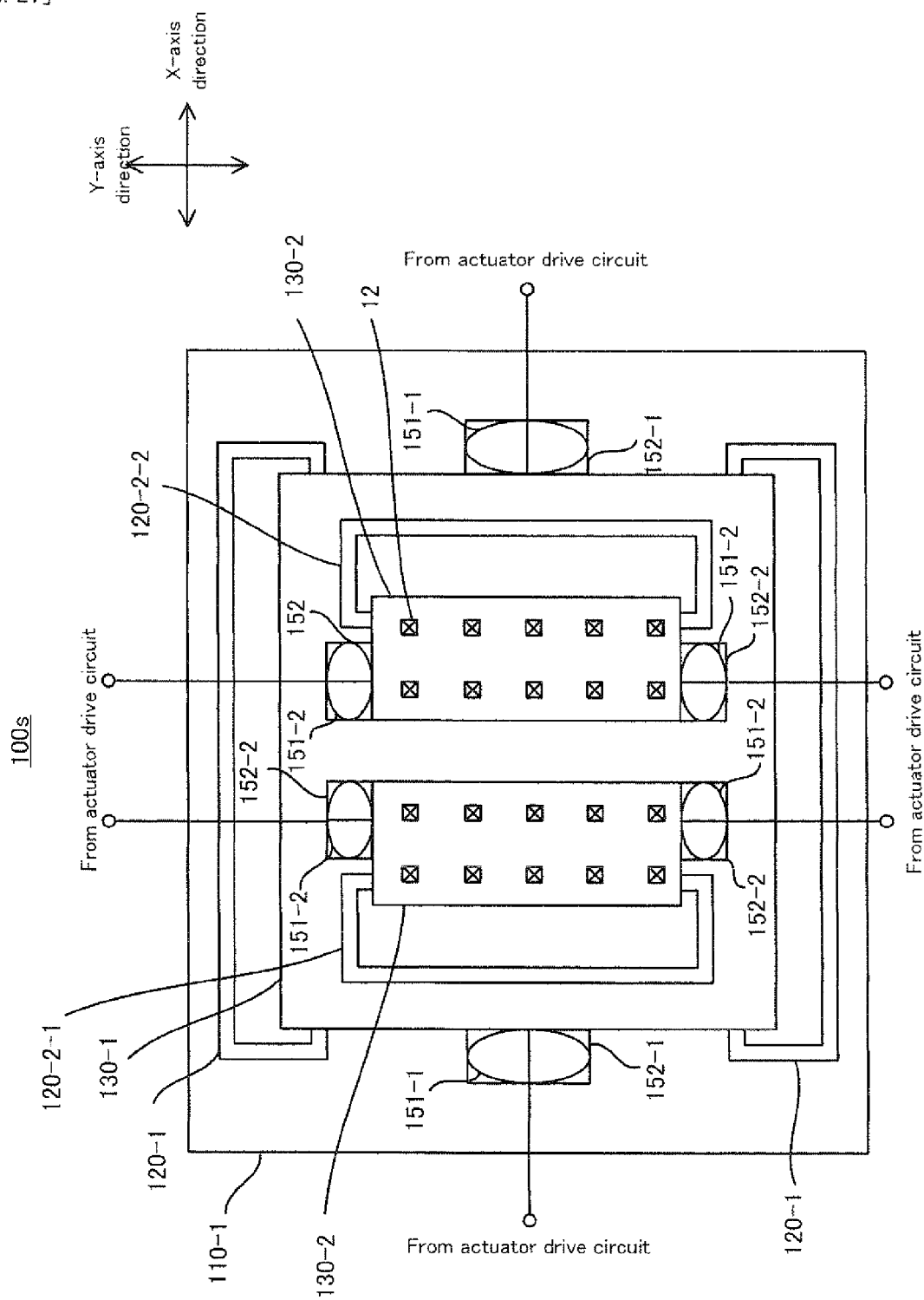

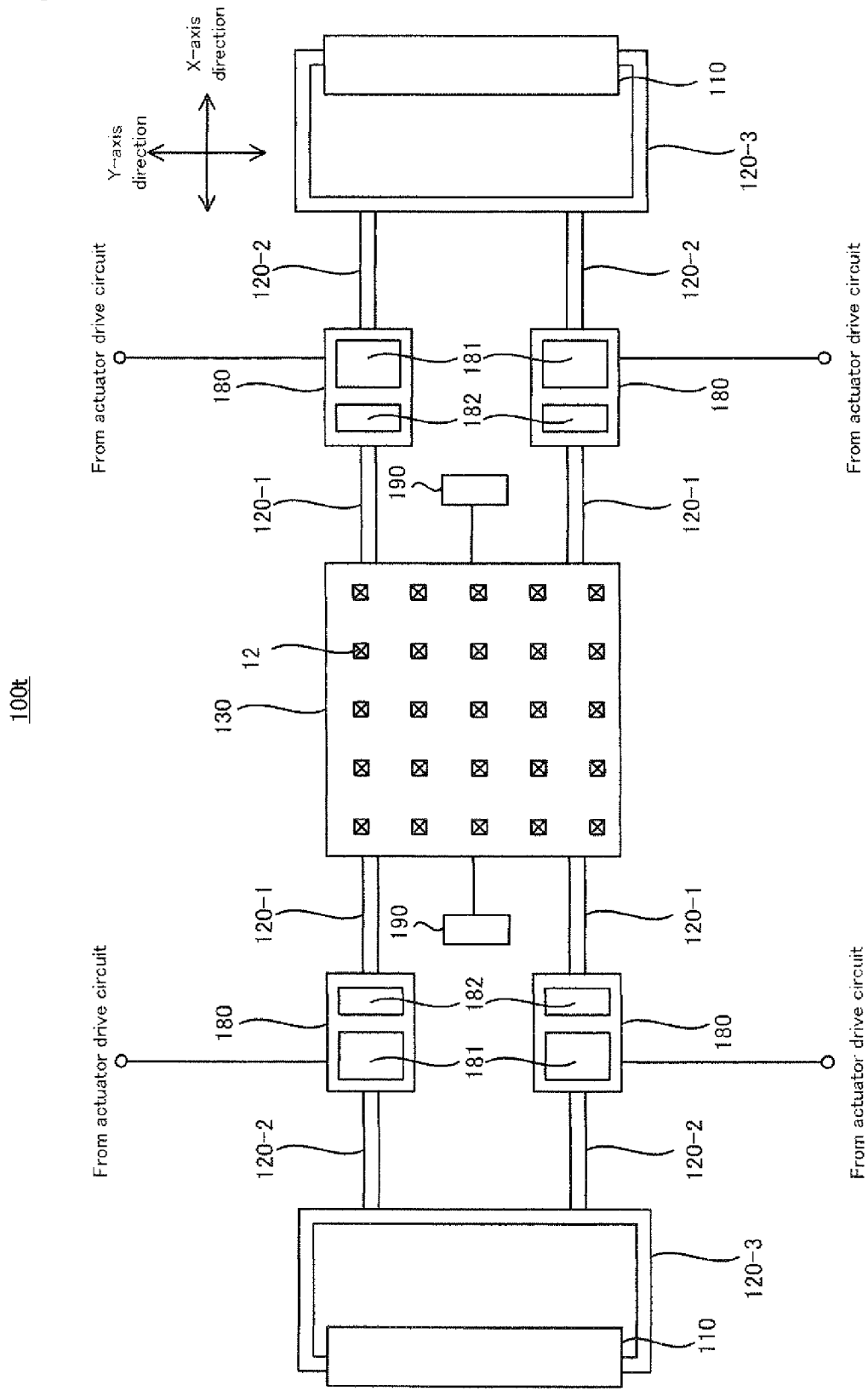
[FIG. 28]

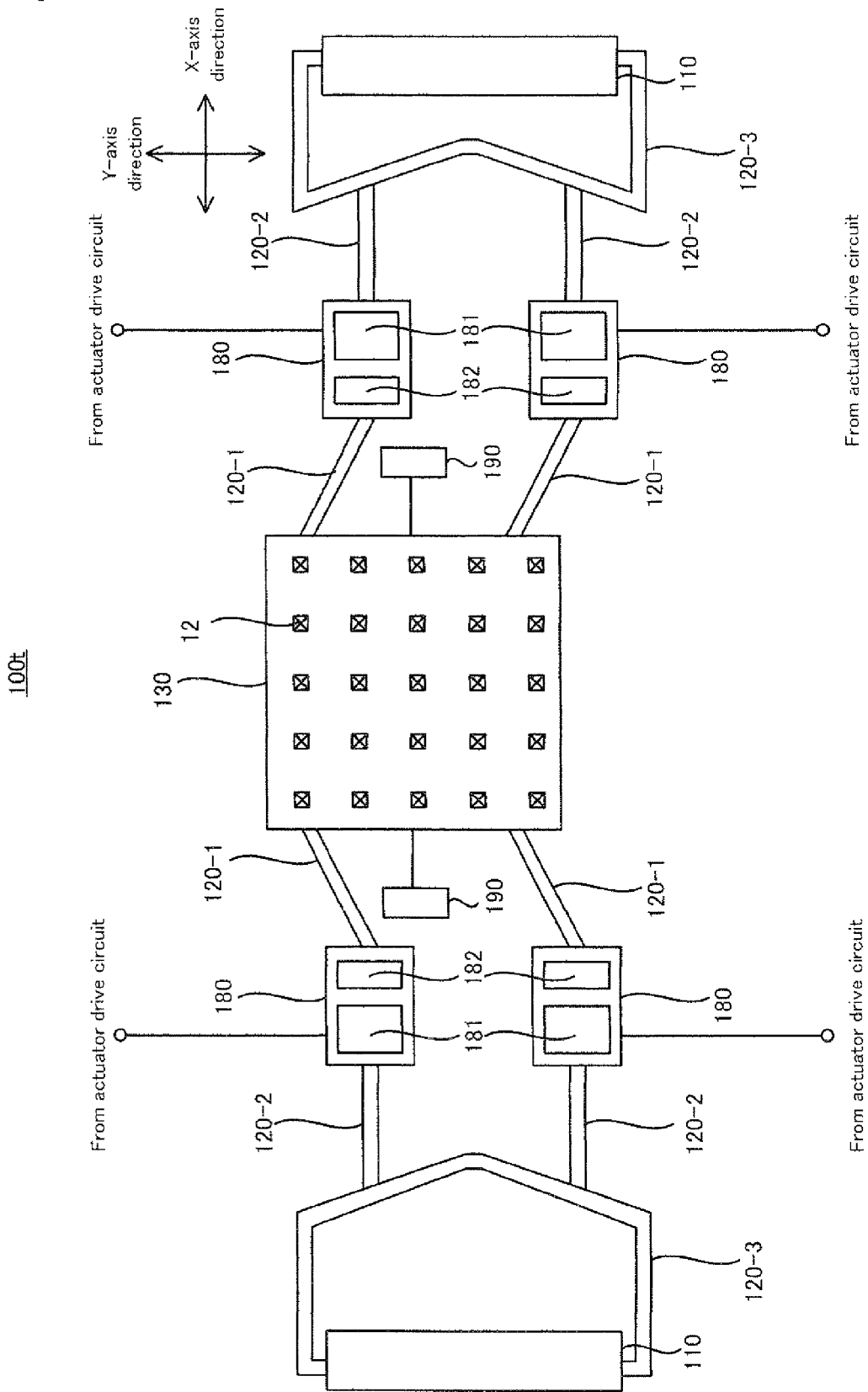

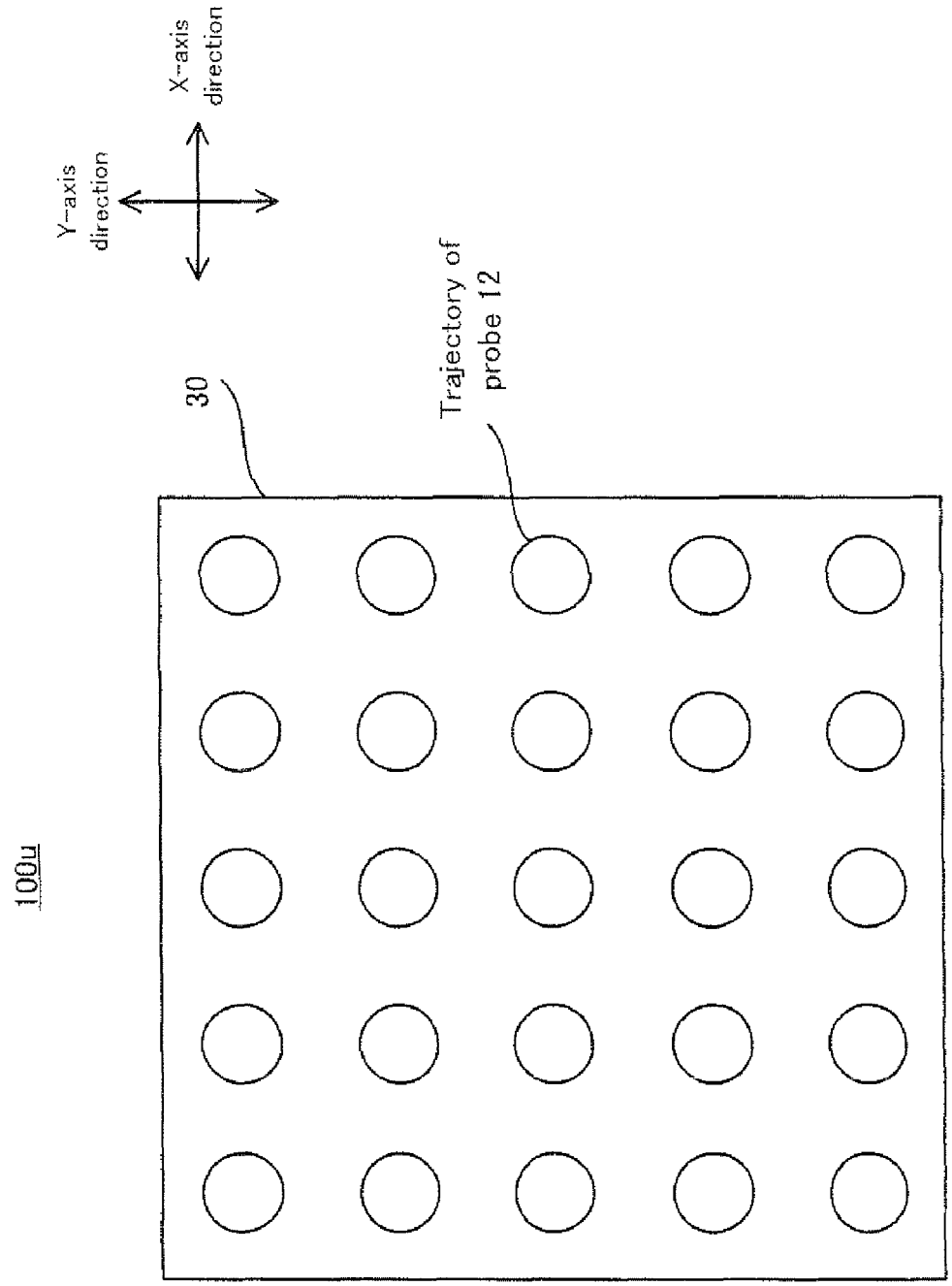

DRIVING APPARATUS

This application is the U.S. national phase of International Application No. PCT/JP2007/057063, filed 30 Mar. 2007, the entire contents of which is hereby incorporated by reference.

TECHNICAL FIELD

The present invention relates to a driving apparatus for driving a probe or the like in a uniaxial direction or biaxial directions so that the probe scans the surface or the like of a medium.

BACKGROUND ART

For example, the development of a probe memory has been advanced which records data onto a recording medium or which reproduces the data recorded on the recording medium by displacing a probe array including a plurality of probes along a recording surface of the recording medium. In such a probe memory, the location of the probe array with respect to the recording medium (in other words, a position relation between the probe array and the recording medium) is determined, for example, by displacing a stage provided with the probe array. In other words, the location of the probe array with respect to the recording medium is determined by the operations of a MEMS (Micro Electro Mechanical System) actuator which is provided with the stage and which can displace the stage.

As a specific structure for displacing the stage provided with the probe array, for example, a MEMS actuator disclosed in a non-patent document 1 is listed as one example. In such a MEMS actuator, the stage is displaced by applying a force to the stage such that the stage oscillates at a relatively low frequency (more specifically, at a frequency lower than the minimum resonance frequency of a spring-mass system including the stage). As described above, the reason why a force is applied to the stage to oscillate the stage at a frequency lower than the minimum resonance frequency is because it is considered that if the force is applied to the stage to oscillate the stage at a frequency near a resonance frequency, the gain of the oscillation (i.e. oscillation range) becomes too large, or it becomes harder to control a position at a frequency higher than the resonance frequency, resulting in unstable operations of the stage (i.e. operations of the MEMS actuator). By this, it is possible to stabilize the operations of the MEMS actuator.

Non-Patent document 1: Tatehiko Hasebe, Seiko Yamanaka, Takeshi Harada, Yasushi Mutou, "Development of wide lateral stroke electro-magnetic actuator driven by low voltage", IEEJ Sensors and Micromachines Society Sogo-Kenkyukai/Micromachines and Sensor systems Kenkyu-kai, No. MSS-06-12

DISCLOSURE OF INVENTION

Subject to be Solved by the Invention

On the other hand, for the MEMS actuator, due to its small size, lower power consumption is desired. Moreover, in order to increase a recording capacity of the recording medium, it is aimed to increase its recording density to be extremely high and to reduce a recording pitch to be on the order of nanometers. When the data is recorded into such an ultramicro area by using the probes, performances are influenced by slight distortion in the driving position of the stage and position repeatability. Thus, it is desired to displace the stage more efficiently.

The above can be listed as one example of the subject to be solved by the invention. It is therefore an object of the present invention to provide, for example, a driving apparatus (i.e. MEMS actuator) which can realize the lower power consumption and which can realize the stabilization of a drive position by displacing a stage more efficiently.

The above object of the present invention can be achieved by a driving apparatus provided with: stage portion which can be displaced; a first elastic portion whose one end is connected to the stage portion and which has elasticity to displace the stage portion in one direction; a driving source device, to which other end of the first elastic portion is connected, provided with: a first applying device for applying an excitation force for displacing the stage portion such that the stage portion is resonated in the one direction at a resonance frequency determined by the stage portion and the first elastic portion; and a second applying device for applying a driving force for displacing, in a stepwise manner or in a continuous manner, the stage portion in other direction which is substantially perpendicular to the one direction; a second elastic portion whose one end is connected to the driving source device and which has elasticity to displace the stage portion in the one direction; a third elastic portion whose one end is connected to the other end of the second elastic portion and which has elasticity to displace the stage portion in the other direction; and a base portion to which the other end of the third elastic portion is connected.

These operation and other advantages of the present invention will become more apparent from the embodiment explained below.

BRIEF DESCRIPTION OF DRAWINGS

FIG. 1 is a block diagram conceptually showing the structure of a ferroelectric recording/reproducing apparatus in example.

FIG. 2 are a plan view and a cross sectional view conceptually showing one example of a recording medium used in the example.

FIG. 3 is a cross sectional view conceptually showing a data recording operation.

FIG. 4 is a cross sectional view conceptually showing a data reproduction operation.

FIG. 5 is a plan view conceptually showing the structure of a driving apparatus in a first example.

FIG. 6 is a plan view conceptually showing an aspect when a stage of the driving apparatus in the first example shown in FIG. 5 is displaced.

FIG. 7 is a plan view conceptually showing the structure of a driving apparatus in which the stage is displaced by applying an excitation force caused by an electromagnetic force to a base.

FIG. 8 is a plan view conceptually showing the structure of a driving apparatus in which the stage is displaced by applying an excitation force caused by an electrostatic force to the base.

FIG. 9 is a plan view conceptually showing the structure of a driving apparatus in a second example.

FIG. 10 is a plan view conceptually showing the structure of a driving apparatus in which the stage is displaced by applying the excitation force caused by the electromagnetic force to two suspensions.

FIG. 11 is a plan view conceptually showing the structure of a driving apparatus in which the stage is displaced by applying the excitation force caused by the electrostatic force to the two suspensions.

FIG. 12 is a plan view conceptually showing the structure of a driving apparatus in a third example.

FIG. 13 is a plan view conceptually showing the structure of a driving apparatus in which the stage is displaced by applying the excitation force caused by the electromagnetic force to the stage.

FIG. 14 is a plan view conceptually showing the structure of a driving apparatus in which the stage is displaced by applying the excitation force caused by the electrostatic force to the stage.

FIG. 15 is a plan view conceptually showing the structure of a driving apparatus in a fourth example.

FIG. 16 is a plan view conceptually showing an aspect when the driving apparatus in the fourth example operates.

FIG. 17 is a plan view conceptually showing the structure of a driving apparatus in which the mass of the stage is adjusted.

FIG. 18 is a plan view conceptually showing a driving apparatus in a fifth example.

FIG. 19 is a plan view conceptually showing one aspect when a first stage of the driving apparatus in the fifth example shown in FIG. 18 is displaced.

FIG. 20 is a plan view conceptually showing another aspect when the first stage of the driving apparatus in the fifth example shown in FIG. 18 is displaced.

FIG. 21 is a plan view conceptually showing the structure of a driving apparatus in which a second stage is displaced in a Y-axis direction by applying the excitation force caused by the electromagnetic force to the first stage.

FIG. 22 is a plan view conceptually showing the structure of a driving apparatus in which the second stage is displaced in the Y-axis direction by applying the excitation force caused by the electrostatic force to the first stage.

FIG. 23 is a plan view conceptually showing the structure of a driving apparatus provided with two types of driving sources for displacing the second stage in the Y-axis direction.

FIG. 24 is a plan view conceptually showing the structure of a driving apparatus provided with a plurality of second stages on the first stage.

FIG. 25 is a plan view conceptually showing the structure of a driving apparatus in a sixth example.

FIG. 26 is a plan view conceptually showing another structure of the driving apparatus in the sixth example.

FIG. 27 is a plan view conceptually showing the structure of a driving apparatus provided with the plurality of second stages on the first stage.

FIG. 28 is a plan view conceptually showing the structure of a driving apparatus in a seventh example.

FIG. 29 is a plan view conceptually showing an aspect when the stage of the driving apparatus in the seven example shown in FIG. 28 is displaced.

FIG. 30 is a plan view conceptually showing trajectories of the displacement of a plurality of probes realized by a driving apparatus in an eighth example.

DESCRIPTION OF REFERENCE CODES 1 ferroelectric recording/reproducing apparatus
12 probe
30 recording medium
100 driving apparatus
110 base
120 suspension
130 stage
141, 143 electrode
142 piezoelectric element
144 force transmission mechanism
151 coil
152 magnetic pole
161, 162 electrode
170 spring constant adjustment device
171 member
172 spring
173 stage mass adjustment device
180 driving source

BEST MODE FOR CARRYING OUT THE INVENTION

Hereinafter, as the best mode for carrying out the present invention, an explanation will be given on embodiments of the driving apparatus of the present invention.

A first embodiment of the driving apparatus of the present invention is a driving apparatus provided with: stage portion which can be displaced; a first elastic portion whose one end is connected to the stage portion and which has elasticity to displace the stage portion in one direction; a driving source device, to which other end of the first elastic portion is connected, provided with: a first applying device for applying an excitation force for displacing the stage portion such that the stage portion is resonated in the one direction at a resonance frequency determined by the stage portion and the first elastic portion; and a second applying device for applying a driving force for displacing, in a stepwise manner or in a continuous manner, the stage portion in other direction which is substantially perpendicular to the one direction; a second elastic portion whose one end is connected to the driving source device and which has elasticity to displace the stage portion in the one direction; a third elastic portion whose one end is connected to the other end of the second elastic portion and which has elasticity to displace the stage portion in the other direction; and a base portion to which the other end of the third elastic portion is connected.

According to the first embodiment of the driving apparatus of the present invention, by the operation of the first applying device, the excitation force is applied that allows the stage portion to be resonated in the one direction (e.g. Y-axis direction) at the resonance frequency determined by the stage portion and the first elastic portion, by using the elasticity of the first elastic portion and the second elastic portion including various springs. In other words, due to the excitation force applied by the first applying device, the second stage portion is displaced (in other words, movable) to be resonated at the resonation frequency. In addition, in the embodiment, by the operation of the second applying device, the driving force is applied to displace the stage portion in the other direction (e.g. X-axis direction), in the stepwise manner or in the continuous manner. By this, the stage portion is displaced to perform a tracking operation in the other direction.

As described above, in the driving apparatus in the first embodiment, the stage portion can be resonated in the one direction, and the stage portion can be displaced in the other direction. By this, it is possible to resonate the driven object mounted on the stage portion in the one direction and to displace it in the other direction; namely, it is possible to biaxially drive the driven object.

Moreover, in the first embodiment, when the stage portion is displaced in the one direction, the characteristic of resonance is used. Here, the "resonance" is a phenomenon in which repetition or superposition of infinitesimal forces causes infinite displacement. Thus, even if the excitation force is reduced which is necessary to displace the stage portion in the one direction, it is possible to increase the displacement range of the stage portion. In other words, it is possible to relatively reduce the excitation force necessary for the displacement of the stage portion in the one direction. Thus, it is also possible to reduce electric energy which is necessary to apply the excitation force necessary for the displacement of the stage portion in the one direction. Therefore, it is possible to displace the stage portion more efficiently, resulting in lower power consumption.

Incidentally, in the construction described in the aforementioned Background Art, the stage portion is displaced such that the stage portion oscillates at a lower frequency than the minimum resonance frequency. In the embodiment, however, for the purpose of lower power consumption, the stage portion is displaced such that the first stage portion oscillates at the resonance frequency. Such lower power consumption can be said to be particularly effective in a small apparatus such as a MEMS actuator.

In addition, in the driving apparatus in which the stage portion is displaced by applying a force having directionality, the position (balance) of the stage portion is possibly distorted depending on a direction and a location on which the force applied to the stage portion acts. In other words, if the force is not applied to the center of gravity of the stage portion, the position of the stage portion is possibly distorted. Alternatively, if the force applied to the stage portion includes a rotational component, the position of the stage portion is possibly distorted. This may result in a loss of repeatability with respect to aspects of the displacement of the stage portion. In the first embodiment, however, the free or independent behavior of the oscillation system itself including the stage portion and the first elastic portion, which is the resonance, is used to displace the stage portion, so that it is possible to preferably maintain the stability of the position of the stage portion. As a result, it is possible to preferably obtain the repeatability with respect to aspects of the displacement of the stage portion.

Then, if a probe array as the driven object is disposed on the stage portion and if the recording medium is disposed to face the probe array, each of the plurality of probes included in the probe array can be displaced at a desired position on the recording medium. As a result, it is possible to record data at the desired position on the recording medium or to reproduce the data recorded at the desired position on the recording medium. In particular, according to the driving apparatus in the embodiment, the biaxial drive can be performed. Thus, it is possible to record the data onto the substantially entire recording surface on the recording medium, or to reproduce the data recorded on the substantially entire recording surface on the recording medium.

In one aspect of the first embodiment of the driving apparatus of the present invention, the stage portion, the first elastic portion, the driving source device, the second elastic portion, the third elastic portion, and the base portion are arranged along the other direction.

According to this aspect, as detailed later with reference to the drawings, the aforementioned various effects can be preferably received by the driving apparatus provided with the stage portion, the first elastic portion, the driving source device, the second elastic portion, the third elastic portion, and the base portion arranged along the other direction.

In another aspect of the first embodiment of the driving apparatus of the present invention, two first elastic portions, two driving source devices, two second elastic portions, two third elastic portions, and two base portions are arranged along the other direction at symmetric positions centered on the stage portion.

According to this aspect, as detailed later with reference to the drawings, the aforementioned various effects can be preferably received by the driving apparatus provided with the first elastic portions, the driving source devices, the second elastic portions, the third elastic portions, and the base portions arranged at the symmetric positions on the right and left sides or on the upper and lower sides of the stage portion.

In another aspect of the first embodiment of the driving apparatus of the present invention, two first elastic portions, two driving source devices, and two second elastic portions are arranged along the one direction.

According to this aspect, as detailed later with reference to the drawings, the aforementioned various effects can be preferably received by the driving apparatus provided with the two first elastic portions arranged along the one direction (i.e. resonance direction), the two driving source devices arranged along the one direction (i.e. resonance direction), and the two second elastic portions arranged along the one direction (i.e. resonance direction).

In addition, by shifting the phase of the excitation force or the driving force applied by one of the two driving source devices arranged along the one direction and the phase of the excitation force or the driving force applied by the other one of the two driving source devices arranged along the one direction, it is possible to adjust a range of displacement of the stage portion (in particular, the amplitude of the resonance of the stage portion).

In another aspect of the first embodiment of the driving apparatus of the present invention, the second elastic portion and the third elastic portion are unified.

According to this aspect, it is possible to preferably receive the aforementioned various effects.

In another aspect of the first embodiment of the driving apparatus of the present invention, the first applying device applies the excitation force with a period according to the resonance frequency.

According to this aspect, for example, if the resonance frequency is f0, the excitation force is applied with a period of 1/f0 or with a period that is N times or 1/N times the period of 1/f0 (wherein N is an integer of 1 or more). In other words, the excitation force is applied once in every period of 1/f or in every period that is N times or 1/N times the period of 1/f0 (wherein N is an integer of 1 or more). As a result, the excitation force is applied in timing to increase or maintain the resonance in accordance with aspects of the resonance of the stage portion. By this, the stage portion is displaced to be resonated at the resonance frequency. Therefore, it is possible to preferably receive the aforementioned various effects.

In another aspect of the first embodiment of the driving apparatus of the present invention, the first applying device applies the excitation force caused by a piezoelectric effect.

According to this aspect, for example, change of the shape of a piezoelectric element which is obtained by applying a voltage to the piezoelectric element can be used as the excitation force. As a result, it is possible to preferably receive the aforementioned various effects.

In another aspect of the first embodiment of the driving apparatus of the present invention, the first applying device applies the excitation force caused by an electromagnetic force.

According to this aspect, for example, the electromagnetic force which is obtained by electromagnetic interaction between a magnetic field generated by applying an electric current to a coil and a magnetic pole disposed to be adjacent to the coil can be used as the excitation force. As a result, it is possible to preferably receive the aforementioned various effects.

In another aspect of the first embodiment of the driving apparatus of the present invention, the first applying device applies the excitation force caused by an electrostatic force.

According to this aspect, for example, the electrostatic force which is generated due to a potential difference between facing two electrodes can be used as the excitation force. As a result, it is possible to preferably receive the aforementioned various effects.

A second embodiment of the driving apparatus of the present invention is a driving apparatus provided with: stage portion which can be displaced; a first elastic portion whose one end is connected to the stage portion and which has elasticity to displace the stage portion in one direction; a driving source device, to which other end of the first elastic portion is connected, provided with: a first applying device for applying an excitation force for displacing the stage portion such that the stage portion is resonated in the one direction at a resonance frequency determined by the stage portion and the first elastic portion; and a second applying device for applying a driving force for displacing, in a stepwise manner or in a continuous manner, the stage portion in other direction which is substantially perpendicular to the one direction; a second elastic portion whose one end is connected to the driving source device and which has elasticity to displace the stage portion in the other direction; and a base portion to which the other end of the second elastic portion is connected.

According to another embodiment of the driving apparatus of the present invention, although the second elastic portion and the third elastic portion are unified (or the second elastic portion is omitted) in the driving apparatus in the first embodiment described above, it is possible to preferably receive the same effects as those received by the driving apparatus in the first embodiment.

Incidentally, in response to the various aspects of the driving apparatus in the first embodiment described above, the driving apparatus in the second embodiment can adopt various aspects.

These operation and other advantages of the present invention will become more apparent from the examples explained below.

As explained above, according to the embodiment of the driving apparatus of the present invention, it is provided with the base portion, the stage portion, the first elastic portion, the second elastic portion, the third elastic portion, and the driving source device. Therefore, by displacing the stage more efficiently and stably, it is possible to realize lower power consumption and position stabilization.

EXAMPLES

Hereinafter, examples of the driving apparatus of the present invention will be described with reference to the drawings.

(1) Information Recording/Reproducing Apparatus

Firstly, with reference to FIG. 1 to FIG. 4, an explanation will be given on an information recording/reproducing apparatus provided with any of the examples of the driving apparatus of the present invention. Incidentally, here, an explanation will be given on a ferroelectric recording/reproducing apparatus which performs a recording operation or reproduction operation on a recording medium 30 in which a ferroelectric substance is used as a recording material.

(1-1) Structure

Firstly, the structure of a ferroelectric recording/reproducing apparatus in the example will be explained with reference to FIG. 1. FIG. 1 is a block diagram conceptually showing the structure of a ferroelectric recording/reproducing apparatus in example.

As shown in FIG. 1, a ferroelectric recording/reproducing apparatus 1 is provided with a probe 12 which is close to or in contact with a recording medium 30 and which is provided for a driving apparatus (in other words, a MEMS actuator) 100; and the recording medium 30 which is disposed at a position facing to the probe 12. Moreover, the ferroelectric recording/reproducing apparatus 1 is provided with a return electrode 11 for returning thereto a high-frequency signal for signal reproduction, applied from the probe 12; an inductor L which is disposed between the probe 12 and the return electrode 11; an oscillator 13 which oscillates at a resonance frequency determined by the inductor L and a capacitance Cs in a site that is polarized in accordance with record information and that is formed in an outer layer of or within a dielectric material 31 under the probe 12; an alternating current (AC) signal generator 16 for applying an alternating electric field which is to detect the state of polarization recorded in the dielectric material 31; a record signal generator 17 for recording the polarization state into the dielectric material 31; a switch 18 for changing the outputs of the AC signal generator 16 and the record signal generator 17; a HPF (High Pass Filter) 15; a demodulator 19 for demodulating a FM signal modulated by the capacitance corresponding to the polarization state owned by the dielectric material 31 under the probe 12; a signal detector 20 for detecting data from a demodulated signal; a tracking error detector 21 for detecting a tracking error signal from the demodulated signal; an actuator drive circuit 22 for controlling the operations of the driving apparatus 100; and the like.

The probe 12 is connected to the oscillator 13 through the HPF 15, and it is connected to the AC signal generator 16 and the record signal generator 17 through the HPF 15 and the switch 18. Moreover, the probe 12 functions as an electrode for applying an electric field to the dielectric material 31.

Incidentally, the probe 12 is disposed on a stage 130 provided for the driving apparatus 100 described later, and the probe 12 can be planarly displaced along a recording surface of the recording medium 30. The displacement operation of the probe 12 is performed under the control of the actuator drive circuit 22. Incidentally, the displacement operation of the probe 12 (in other words, the structure and operations of the driving apparatus 100) will be detailed later.

The return electrode 11 is an electrode for returning thereto a high-frequency electric field applied to the dielectric material 31 from the probe 12 (i.e. a resonance electric field from the oscillator 13), and the return electrode 11 is disposed to surround the probe 12. Incidentally, the shape and placement of the return electrode 11 can be arbitrarily set as long as the high-frequency electric field returns to the return electrode 11 without resistance.

Incidentally, in the examples, only one probe 12 is shown in FIG. 1 for simplification of explanation; however, a plurality of probes 12 are preferably provided in order to improve a recording speed and a reproduction speed. In this case, a plurality of AC signal generators 16 are provided in association with the respective probes 12. Moreover, a plurality of signal detectors 20 are provided in order to discriminate between reproduction signals corresponding to the AC signal generators 16 on the signal detectors 20, and the signal detectors 20 obtain reference signals from the respective AC signal generators 16, thereby outputting the corresponding reproduction signals.

The inductor L is disposed between the probe 12 and the return electrode 11, and it is formed from, for example, a microstripline. A resonance circuit 14 is constructed including the inductor L and the capacitance Cs. The inductance of the inductor L is determined such that this resonance frequency is, for example, approximately 1 GHz.

The AC signal generator 16 applies an alternating electric field to a micro domain between the return electrode 11 and an electrode 32. Moreover, the ferroelectric recording/reproducing apparatus which uses a plurality of probes 12 performs synchronization by using the frequencies of the alternating electric fields as reference signals, thereby discriminating signals detected on the probes 12. The frequencies are centered on about 100 kHz.

The oscillator 13 is an oscillator which oscillates at the resonance frequency determined from the inductor L and the capacitance Cs. The oscillation frequency varies depending on the change of the capacitance Cs. Therefore, FM modulation is performed in association with the change, which is due to the alternating field, of the capacitance Cs determined by the polarization state corresponding to the recorded data. By demodulating this FM modulation, it is possible to read the data recorded on the recording medium 30.

Incidentally, as described in detail later, the probe 12, the return electrode 11, the oscillator 13, the inductor L, the HPF 15, and the capacitance Cs in the dielectric material 31 constitute the resonance circuit 14, and the FM signal amplified in the oscillator 13 is outputted to the demodulator 19.

The record signal generator 17 generates a signal for recording and supplies it to the probe 12 at the time of recording. This signal is not limited to a digital signal and it may be an analog signal. The signal includes various signals, such as audio information, video information, and digital data for a computer. Moreover, the AC signal superimposed on the record signal is used to discriminate and reproduce the information on each probe, as the reference signal at the time of signal reproduction.

The switch 18 selects the output such that the signal from the AC signal generator 16 is supplied to the probe 12 at the time of reproduction and the signal from the record signal generator 17 is supplied to the probe 12 at the time of recording. For this apparatus, a mechanical relay and a semiconductor circuit are used. The switch 18 is preferably constructed from the relay in the case of the analog signal, and the semiconductor circuit in the case of the digital signal.

The HPF 15 includes an inductor and a condenser, and it is used to form a high pass filter for cutting off a signal system so that the signals from the AC signal generator 16 and the record signal generator 17 do not interfere with the oscillation of the oscillator 13. The cutoff frequency is $f=1/2\pi\sqrt{LC}$. Here, L is the inductance of the inductor included in the HPF 15, and C is the capacitance of the condenser included in the HPF 15. The frequency of the AC signal outputted from the AC signal generator 16 is about 100 KHz, and the oscillation frequency of the oscillator 13 is about 1 GHz. Thus, the separation is sufficiently performed on a first order LC filter. A higher-order filter may be used, but that increases the number of elements and possibly increases the apparatus size.

The demodulator 19 demodulates the FM signal and reconstructs a waveform corresponding to the polarization state of a site which is traced by the probe 12. If the recorded data are digital data of "0" and "1", there are two types of frequencies to be modulated. By judging the frequency, the data reproduction is easily performed.

The signal detector 20 reproduces the recorded data from the signal demodulated on the demodulator 19. As the signal detector 19, for example, a lock-in amplifier is used, and coherent detection or synchronized detection is performed on the basis of the frequency of the alternating electric field of the AC signal generator 16, to thereby reproduce the data. Incidentally, it is obvious that another phase detection device may be used.

The tracking error detector 21 detects a tracking error signal for controlling the apparatus, from the signal demodulated on the demodulator 19. The detected tracking error signal is inputted into a tracking mechanism, for the control.

Next, one example of the recording medium 30 using the dielectric material shown in FIG. 1 will be explained with reference to FIG. 2. FIG. 2 are a plan view and a cross sectional view conceptually showing one example of the recording medium 30 used in the example.

As shown in FIG. 2(*a*), the recording medium 30 has, for example, a rectangular shape. By relatively displacing the aforementioned probe 12 on the recording surface of the recording medium 30, the data is recorded onto the recording medium 30, or the data recorded on the recording medium 30 is reproduced.

Moreover, as shown in FIG. 2(*b*), the recording medium 30 is formed such that the electrode 32 is laminated on a substrate 33 and that the dielectric material 31 is laminated on the electrode 32.

The substrate 33 is, for example, Si (silicon) which is a preferable material in its strength, chemical stability, workability, or the like. The electrode 32 is intended to generate an electric field between the probe 12 (or the return electrode 11) and the electrode 32. By applying the electric field that is equal to or stronger than the coercive electric field of the dielectric material 31 to the dielectric material 31, the polarization direction is determined. By determining the polarization direction in accordance with the data, the recording is performed.

The dielectric material 31 is formed by a known technology, such as spattering $LiTaO_3$ or the like which is a ferroelectric substance, onto the electrode 32. Then, the recording is performed with respect to the Z surface of $LiTaO_3$ in which the plus and minus surfaces of the polarization have a 180-degree domain relation. It is obvious that another dielectric material may be used. In the dielectric material 31, the small polarization is formed at high speed by a voltage for data recording, which is applied simultaneously with a direct current bias voltage.

(1-2) Operation Principle

Next, with reference to FIG. 3 and FIG. 4, the operation principle of the ferroelectric recording/reproducing apparatus 1 in the example will be explained. Incidentally, in the explanation below, one portion of the constituent elements of the ferroelectric recording/reproducing apparatus 1 shown in FIG. 1 is extracted and explained.

(1-2-1) Recording Operation

Firstly, with reference to FIG. 3, the recording operation of the ferroelectric recording/reproducing apparatus 1 in the example will be explained. FIG. 3 is a cross sectional view conceptually showing the data recording operation.

As shown in FIG. 3, by applying an electric field which exceeds the coercive electric field of the dielectric material 31 between the probe 12 and the electrode 32, the dielectric material 31 is polarized having a direction corresponding to the direction of the applied electric field. Then, by controlling an applied voltage to thereby change the polarization direction, it is possible to record the predetermined information. This uses such a characteristic that if an electric field which exceeds the coercive electric field of a dielectric substance is applied to the dielectric substance (particularly, a ferroelectric substance), the polarization direction is reversed, and that the polarization direction is maintained thereafter.

For example, it is assumed that the micro domain has downward polarization P when an electric field is applied which directs from the probe 12 to the electrode 32, and that the micro domain has upward polarization P when an electric field is applied which directs from the electrode 32 to the probe 12. This corresponds to the state that the data information is recorded. If the probe 12 is displaced in an arrow-pointing direction by the operation of the driving apparatus 100, a detection voltage corresponds to the polarization P and is outputted as a rectangular wave which swings up and down.

(1-2-2) Reproduction Operation

Next, with reference to FIG. 4, the reproduction operation of the ferroelectric recording/reproducing apparatus 1 in the example will be explained. FIG. 4 is a cross sectional view conceptually showing the data reproduction operation.

The nonlinear dielectric constant of a dielectric substance changes in accordance with the polarization direction of the dielectric substance. Moreover, the nonlinear dielectric constant of the dielectric substance can be detected as a difference of the capacitance of the dielectric substance or a difference of the capacitance change when an electric field is applied to the dielectric substance. Therefore, by applying an electric field to the dielectric material and by detecting a difference of the capacitance Cs or a difference of the change of the capacitance Cs in a certain micro domain of the dielectric material at that time, it is possible to read and reproduce the data recorded as the polarization direction of the dielectric material.

Specifically, firstly, as shown in FIG. 4, an alternating electric field from the not-illustrated AC signal generator 16 is applied between the electrode 32 and the probe 12. The alternating electric field has an electric field strength which does not exceed the coercive electric field of the dielectric material 31, and it has a frequency of, for example, approximately 100 kHz. The alternating electric field is generated mainly to discriminate the difference of the capacitance change corresponding to the polarization direction of the dielectric material 31. Incidentally, instead of the alternating electric field, a direct current bias voltage may be applied to form an electric field in the dielectric material 31. The application of the alternating electric field causes the generation of an electric field in the dielectric material 31 of the recording medium 30.

Then, the probe 12 is brought closer to the recording surface until the distance between the tip of the probe 12 and the recording surface becomes extremely small on the order of nanometers. In this condition, the oscillator 13 is driven. Incidentally, in order to detect the capacitance Cs of the dielectric material 31 under the probe 12 highly accurately, it is preferable to bring the probe 12 in contact with the surface of the dielectric material 31, i.e. the recording surface. However, even if the tip of the probe 12 is not brought in contact with the recording surface, for example, if the tip of the probe 12 is brought closer to the recording surface to the extent that it can be substantially regarded as the contact, the reproduction operation (and moreover, the aforementioned recording operation) can be performed.

Then, the oscillator 13 oscillates at the resonance frequency of the resonance circuit 14 which includes the capacitance Cs, which is associated with the dielectric material 31 under the probe 12, and the inductor L as the constituent factors. The center frequency of the resonance frequency is set to approximately 1 GHz, as described above.

Here, the return electrode 11 and the probe 12 constitute one portion of the oscillation circuit 14 including the oscillator 13. The high-frequency signal of approximately 1 GHz, which is applied to the dielectric material 31 from the probe 12, passes through the dielectric material 31 and returns to the return electrode 11, as shown by solid lines in FIG. 4. By disposing the return electrode 11 in the vicinity of the probe 12 and shortening a feedback route to the oscillation circuit 14 including the oscillator 13, it is possible to reduce noise (e.g. a floating capacitance component) entering the oscillation circuit 14.

In addition, the change of the capacitance Cs corresponding to the nonlinear dielectric constant of the dielectric material 31 is extremely small, and it is necessary to adopt a detection method having high detection accuracy in order to detect this change. In a detection method using FM modulation, the high detection accuracy can be generally obtained; however, it is necessary to further improve the detection accuracy in order to make it possible to detect the small capacitance change corresponding to the nonlinear dielectric constant of the dielectric material 31. Thus, in the ferroelectric recording/reproducing apparatus 1 in the example (i.e. a recording/reproducing apparatus which uses the SNDM principle), the return electrode 11 is located in the vicinity of the probe 12 to shorten the feedback route to the oscillation circuit 14 as much as possible. By this, it is possible to obtain extremely high detection accuracy, thereby detecting the small capacitance change corresponding to the nonlinear dielectric constant of the dielectric substance.

After the oscillator 13 is driven, the probe 12 is displaced in parallel with the recording surface on the dielectric recording medium 30. Since the polarization state of the domain of the dielectric material 31 under the probe 12 varies depending on the recorded signal, the nonlinear component of the dielectric constant changes under the probe 12. If the nonlinear component of the dielectric constant changes, the phase of the resonance frequency, i.e. the oscillation frequency of the oscillator 13, changes with respect to the alternating electric field. As a result, the oscillator 13 outputs a signal which is FM-modulated on the basis of the polarization state, i.e. the recorded data.

This FM signal is frequency-voltage-converted by the demodulator 19. As a result, the change of the capacitance Cs is converted to the extent of the voltage. The change of the capacitance Cs corresponds to the nonlinear dielectric constant of the dielectric material 31, and the nonlinear dielectric constant corresponds to the polarization direction of the dielectric material 31, and the polarization direction corresponds to the data recorded in the dielectric material 31. Therefore, the signal obtained from the demodulator 19 is such a signal that the voltage changes in accordance with the data recorded on the recording medium 30. Moreover, the signal obtained from the demodulator 19 is supplied to the signal detector 20 and, for example, coherent detection or synchronized detection is performed to extract the data recorded on the recording medium 30.

At this time, on the signal detector 20, the AC signal generated by the AC signal generator 16 is used as the reference signal. By this, for example, even if the signal obtained from the demodulator 19 includes many noises or even if the data to be extracted is weak, the data can be extracted highly accurately by performing the synchronization with the reference signal, as described later.

(2) Driving Apparatus

Next, with reference to FIG. 5 to FIG. 30, an explanation will be given on the driving apparatus 100 for driving the plurality of probes 12 provided for the ferroelectric recording/reproducing apparatus 1 in the examples.

(2-1) Driving Apparatus Adopting Uniaxial Driving Method

Firstly, with reference to FIG. 5 to FIG. 17, of the driving apparatus 100 in the examples, driving apparatuses adopting a uniaxial driving method (specifically, a driving apparatus in a first example to a driving apparatus in a fourth example described later) will be described. Incidentally, the driving apparatus adopting the uniaxial driving method is a driving apparatus that can displace the probes 12 along one axis (e.g. Y axis). In other words, the driving apparatus adopting the uniaxial driving method is a driving apparatus that can realize the one-dimension displacement of the probes 12.

(2-1-1) First Example of Driving Apparatus

Firstly, with reference to FIG. 5 and FIG. 6, a driving apparatus 100a in a first example will be explained. FIG. 5 is a plan view conceptually showing the structure of the driving apparatus 100a in the first example. FIG. 6 is a plan view conceptually showing an aspect when a stage 130 of the driving apparatus 100a in the first example shown in FIG. 5 is displaced.

As shown in FIG. 5, the driving apparatus 100a in the first example is provided with a base 110, two suspensions 120, a stage 130, an electrode 141, a piezoelectric element 142, and an electrode 143.

To the base 110 which is fixed (in other words, which is fixed within a system as being the driving apparatus 100a), the two suspensions 120 which extend in a longitudinal direction are fixed at their one edges. Each of the two suspensions 120 constitutes one specific example of the "elastic portion" of the present invention, and it is a member having elasticity such as a spring made of, for example, silicon, copper alloys, iron-type alloys, other metal, resins, and the like. The two suspensions 120 are fixed to the stage 130 at the other edges. In other words, the stage 130 is supported (or hung) by the two suspensions 120. The stage 130 can be displaced in a Y-axis direction due to the elasticity of the two suspensions 120; namely, the stage 130 is displaced in the Y-axis direction by the two suspensions 120, as shown in FIG. 6. Moreover, the aforementioned probes 12 (here, the plurality of proves 12) are disposed on the stage 130. Moreover, the electrode 141 is disposed to hold the piezoelectric element 142 between the electrode 141 and the electrode 143 which is fixed to the base 110 and which is grounded.

Incidentally, on the base 110, the aforementioned recording medium 30 is preferably held. In other words, since the plurality of probes 12 are displaced by disposing the plurality of probes 12 on the stage 130, the recording medium 30 is preferably constructed to be fixed to the base 110 (i.e. not to displace the recording medium 30).

Moreover, the base 110 may be constructed as a box-type case which is provided with the two suspensions 120 and the stage 130 in its inner space. In this case, various constituents of the ferroelectric recording/reproducing apparatus 1 explained with reference to FIG. 1 (excluding at least the probes 12) may be disposed within and on the base 110 which is the box-type case. In other words, the ferroelectric recording/reproducing apparatus 1 in the example may be constructed as a card-type memory or the like having the base 110 as the case. Furthermore, it may be also constructed such that the base 110 is a movable body supported or hung by the two suspensions 120.

Here, an explanation will be given on the operations of the driving apparatus 100a in the first example having the aforementioned structure. A desired voltage is applied to the electrode 141 in desired timing from the actuator drive circuit 22. Due to the application of the voltage to the electrode 141, the piezoelectric element 142 changes its shape. Here, since the electrode 143 is fixed to the base 110, the change of the shape of the piezoelectric element 142 is added as a force to the base 110 through the electrode 143. In other words, in the first example, a force caused by the change of the shape of the piezoelectric element 142 due to the application of the voltage (i.e. a piezoelectric effect) is applied to the base 110.

Here, since the base 110 is semifixed and the force is applied at the resonance frequency of the movable body (the two suspensions 120 and the stage 130 in the first example) as described later, the base 110 rarely moves or slightly oscillates even if the force is applied by the piezoelectric element 142 to the base 110. Moreover, even if the base 110 slightly oscillates, its frequency is sufficiently higher than the frequency of the oscillation of the stage 130 (i.e. the resonance frequency described later). In other words, the amplitude of the oscillation of the base 110 is sufficiently smaller than that of the stage 130.

On the other hand, the two suspensions 120 which are fixed to the base 110 at the one edges start to oscillate in accordance with the force applied by the piezoelectric element 142 to the base 110. As a result, the stage 130 which is fixed to the other edges of the two suspensions 120 oscillates (i.e. is displaced) in the Y-axis direction as shown in FIG. 6.

Incidentally, in the explanation below, the force applied to the base 110 to displace the stage 130 (particularly, to oscillate the stage 130 at the resonance frequency) will be referred to as an "excitation force".

In the first example, in particular, the actuator drive circuit 22 applies a desired voltage to the electrode 141 in desired timing so as to apply the excitation force for oscillating (i.e. resonating) the stage 130 at the resonance frequency determined by the two suspensions 120 and the stage 130. For example, if the mass of the stage 130 is m and a spring constant is k when the two suspensions 120 is regarded as one spring, the actuator drive circuit 22 applies the desired voltage to the electrode 141 in the desired timing so as to apply the excitation force for resonating the stage 130 at a frequency of $\sqrt{(k/m)}$ (or at a frequency 1/N times the frequency of $\sqrt{(k/m)}$ (wherein N is an integer of 1 or more). In this case, the actuator drive circuit 22 preferably applies the desired voltage to the electrode 141 so as to apply the excitation force to the base 110 in timing synchronized with the resonance frequency. In other words, if the resonance frequency is f0, the actuator drive circuit 22 preferably applies the desired voltage to the electrode 141 such that the excitation force is applied to the base 110 with a period of 1/f0 or with a period that is M times the period of 1/f0 (wherein M is an integer of 1 or more). Moreover, the actuator drive circuit 22 preferably applies the desired voltage to the electrode 141 so as to apply the excitation force that can maintain the displacement of the stage 130 (i.e. the excitation force that can apply a force acting in the same direction as the displacement direction of the stage 130). Of course, if it is desired that the displacement of the stage 130 is stopped (or if it is desired that a range of the displacement of the stage 130 is reduced or attenuated), obviously, it is preferable to apply the excitation force that can stop the displacement of the stage 130 (i.e. the excitation force that can apply to the stage 130 a force applying in the opposite direction of the displacement direction of the stage 130 or the excitation force that can apply to the stage 130 a force applying in the same direction as the displacement direction of the stage 130 in timing in which phases are shifted by 180 degrees).

As described above, in the first example, the excitation force is applied to the base 110 in timing according to the resonance frequency determined by the two suspensions 120 and the stage 130. As a result, the driving apparatus 100a in the first example can resonate the stage 130 at the resonance frequency determined by the two suspensions 120 and the stage 130. In other words, the stage 130 performs self-resonance.

Here, the "resonance" is a phenomenon in which repetition or superposition of infinitesimal forces causes infinite displacement. Thus, even if the excitation force is reduced which is applied to the base 110 to displace the stage 130, it is possible to increase the displacement range of the stage 130. In other words, it is possible to relatively reduce the excitation force necessary for the displacement of the stage 130. Thus, it is also possible to reduce electric energy which is necessary to apply the excitation force necessary for the displacement of the stage 130 to the base 110. Therefore, it is possible to displace the stage 130 more efficiently, resulting in the lower power consumption of the driving apparatus 100a.

In addition, in the driving apparatus in which the stage 130 is displaced by applying to the stage 130 a force having directionality, the position (balance) of the stage 130 is possibly distorted depending on a direction and a location on which the force applied to the stage 130 (specifically, the force applied to the stage 130 in accordance with the excitation force) acts. For example, if the force is not applied to the center of gravity of the stage 130, the position of the stage 130 is possibly distorted. Alternatively, if the force applied to the stage 130 includes a rotational component, the position of the stage 130 is possibly distorted. This may result in a loss of repeatability with respect to aspects of the displacement of the stage 130. However, the driving apparatus 100a in the first example adopts such a method that the behavior of the oscillation system including the stage 130 and the two suspensions 120, which is the resonance, is used to displace the stage 130 and to apply the excitation force to the base 110, so that it is possible to preferably maintain the stability of the position of the stage 130. As a result, it is possible to preferably obtain the repeatability with respect to aspects of the displacement of the stage 130.

Moreover, as opposed to using a phenomenon in which the oscillation has a high gain when the stage is oscillated at the resonance frequency, in the first example, it is possible to reduce the magnitude of the excitation force at each time by using the phenomenon in which the resonance is the superposition of infinitesimal forces. Thus, it is possible to control the position of the stage 130 to be more stable.

Moreover, if the plurality of probes 12 are provided for the stage 130 and if the recording medium 30 is disposed to face the plurality of probes 12, each of the plurality of probes 12 can be displaced to a desired position on the recording medium 30. As a result, it is possible to record the data at the desired position on the recording medium 30 or to reproduce the data recorded at the desired position on the recording medium 30.

In addition, in the first example, the excitation force is applied to the base 110. In other words, a driving source for applying the excitation force (i.e. the electrode 141, the piezoelectric element 142, and the electrode 143) is fixed to the base 110. Therefore, it is unnecessary to provide a driving source fixed to the movable portion including the two suspensions 120 and the stage 130. This can relatively limit or control the generation of a heat caused by the driving source in the movable portion including the two suspensions 120 and the stage 130. As a result, it is possible to preferably limit or control an adverse effect of the heat on the movable portion including the two suspensions 120 and the stage 130.

Moreover, since the excitation force is applied to the base 110, it is unnecessary to provide the driving source for the movable portion including the two suspensions 120 and the stage 130. Thus, it is possible to apply the excitation force without increasing the mass of the movable portion including the two suspensions 120 and the stage 130. Therefore, it is possible to increase sensitivity related to the displacement of the stage 130.

Moreover, in the first example, the excitation force caused by the piezoelectric effect is applied. Thus, it is possible to apply the relatively large excitation force while the amount of change of the shape of the piezoelectric element 142 (i.e. the amount of displacement of the piezoelectric element 142) is relatively small. In other words, it is possible to apply the large excitation force without excessively increasing the amount of change of the shape of the piezoelectric element 142 (i.e. the amount of displacement of the piezoelectric element 142).

Incidentally, if the excitation force caused by the piezoelectric effect is applied, the excitation force may be applied intermittently. For example, as described above, if the resonance frequency is f0, the excitation force may be applied once in every period of 1/f or in every period that is M times the period of 1/f0 (wherein M is an integer of 2 or more). Even in such construction, it is possible to preferably resonate the stage 130 since the excitation force caused by the piezoelectric effect is relatively large. On the other hand, the excitation force is not necessarily applied all the time, so that it is possible to further reduce the electric energy necessary for the application of the excitation force. However, it is obvious that the excitation force may be applied with a period other than the aforementioned examples or all the time as long as the stage 130 can be resonated. Moreover, even if an excitation force caused by an electromagnetic force or an electrostatic force is applied, the excitation force may be applied intermittently, or the excitation force may be applied all the time. Even in such construction, it is possible to properly receive the same effects as in the case where the excitation force caused by the piezoelectric effect is applied intermittently. This holds true in a second example and the like explained below.

Incidentally, in the first example, since the stage 130 is resonated, the displacement velocity of the stage 130 varies sinusoidally. In other words, at the limit of the displacement range of the stage 130 (i.e. at the position of the maximum displacement of the stage 130), the displacement direction of the stage 130 changes from a positive direction to a negative direction (e.g. an upward direction in FIG. 5 to a downward direction in FIG. 5), or from the negative direction to the positive direction (e.g. the downward direction in FIG. 5 to the upward direction in FIG. 5). Thus, from the viewpoint of performing the stable recording operation and reproduction operation, it is preferable not to perform the recording operation and reproduction operation using the probes 12 near the limit of the displacement range of the stage 130. This holds true in the second example and the like explained below.

Moreover, in the explanation of the driving apparatus 100a in the first example described above, the stage 130 is displaced by applying the excitation force caused by the piezoelectric effect to the base 110. However, in addition to or instead of the excitation force caused by the piezoelectric effect, the excitation force caused by the electromagnetic force or the excitation force caused by the electrostatic force may be applied to the base 110. Here, with reference to FIG. 7 and FIG. 8, an explanation will be given on the structures of a driving apparatus 100b in which the stage 130 is displaced by applying the excitation force caused by the electromagnetic force to the base 110 and a driving apparatus 100c in which the stage 130 is displaced by applying the excitation force caused by the electrostatic force to the base 110. FIG. 7 is a plan view conceptually showing the structure of the driving apparatus 100b in which the stage 130 is displaced by applying the excitation force caused by the electromagnetic force to the base 100. FIG. 8 is a plan view conceptually showing the structure of the driving apparatus 100c in which the stage 130 is displaced by applying the excitation force caused by the electrostatic force to the base 110.

As shown in FIG. 7, the driving apparatus 100b is provided with the base 110, the two suspensions 120, and the stage 130, as in the driving apparatus 100a. The driving apparatus 100b is provided particularly with a coil 151 and a magnetic pole 152 at least one of which is fixed to the base 110, instead of the electrode 141, the piezoelectric element 142, and the electrode 143 provided for the driving apparatus 100a. To the coil 151, a desired voltage is applied in desired timing from the actuator drive circuit 22. The application of the voltage to the coil 151 causes electromagnetic interaction between the coil 151 and the magnetic pole 152. As a result, an electromagnetic force by the electromagnetic interaction is generated. Here, since at least one of the coil 151 and the magnetic pole 152 is fixed to the base 110, a force caused by the electromagnetic force is applied to the base 110. In other words, in the driving apparatus 100b, the force caused by the electromagnetic force is applied to the base 110 as the excitation force. As a result, the stage 130 oscillates (i.e. is displaced) in the Y-axis direction.

Even in such a driving apparatus 100b, it is possible to receive substantially the same effects as those received by the driving apparatus 100a in which the aforementioned excitation force caused by the piezoelectric effect is applied to the base 110.

As shown in FIG. 8, the driving apparatus 100c is provided with the base 110, the two suspensions 120, and the stage 130, as in the driving apparatus 100a. The driving apparatus 100c is provided particularly with an electrode 161 and an electrode 162 which is fixed to the base 110 and which is grounded, instead of the electrode 141, the piezoelectric element 142, and the electrode 143 provided for the driving apparatus 100a. The electrode 161 and the electrode 162 are disposed with a predetermined distance therebetween. To the electrode 161, a desired voltage is applied in desired timing from the actuator drive circuit 22. Here, due to a potential difference between the electrode 161 and the electrode 162, an electrostatic force (in other words, Coulomb force) is generated between the electrode 161 and the electrode 162. Here, since the electrode 162 is fixed to the base 110, a force caused by the electrostatic force is applied to the base 110. In other words, in the driving apparatus 100c, the force caused by the electrostatic force is applied to the base 110 as the excitation force. As a result, the stage 130 oscillates (i.e. is displaced) in the Y-axis direction.

Even in such a driving apparatus 100c, it is possible to receive substantially the same effects as those received by the driving apparatus 100a in which the aforementioned excitation force caused by the piezoelectric effect is applied to the base 110.

Incidentally, considering that the base 110 rarely oscillates, the structure for applying the excitation force to the base 110 does not require such a large force as the excitation force. Moreover, in comparison to the excitation force caused by the piezoelectric effect and the excitation force caused by the electromagnetic force, the excitation force caused by the electrostatic force is generally small. Thus, the structure for applying the excitation force to the base 110 preferably applies the excitation force caused by the electrostatic force.

Incidentally, a combination of the actuator drive circuit 22, the electrode 141, the piezoelectric element 142, and the electrode 143 constitutes one specific example of the "applying device" of the present invention. Moreover, a combination of the actuator drive circuit 22, the coil 151, and the magnetic pole 152 constitutes one specific example of the "applying device" of the present invention. Moreover, a combination of the actuator drive circuit 22, the electrode 161, and the electrode 162 constitutes one specific example of the "applying device" of the present invention.

(2-1-2) Second Example of Driving Apparatus

Next, with reference to FIG. 9, a driving apparatus 100d in a second example will be explained. FIG. 9 is a plan view conceptually showing the structure of the driving apparatus 100d in a second example. Incidentally, the same constituents as those of the driving apparatus 100a in the first example described above (and moreover, the driving apparatus 100b and the driving apparatus 100c) will carry the same referential numerals, and the detailed explanation thereof will be omitted.

As shown in FIG. 9, the driving apparatus 100d in the second example is provided with the base 110, the two suspensions 120, the stage 130, and two pairs of electrodes 141, piezoelectric elements 142, and electrodes 143, which correspond to the two suspensions, as in the driving apparatus 100a in the first example.

In the driving apparatus 100d in the second example, in particular, the excitation force caused by the change of the shape of the piezoelectric element 142 due to the application of the voltage (i.e. the piezoelectric element) is applied to the two suspensions 120 instead of the base 110. Moreover, the driving apparatus 100d is provided with two pairs of force transmission mechanisms 144 for amplifying the amount of displacement by the excitation force. The force transmission mechanism 144 uses the principle of leverage and is adapted to amplify the amount of displacement by the excitation force to several times to several ten times. Moreover, even in the driving apparatus 100d in the second example, as in the driving apparatus 100a in the first example, the excitation force that can displace the stage 130 is applied in timing according to the resonance frequency determined by the two suspensions 120 and the stage 130. By this, the two suspensions 120 to which the excitation force is applied start to oscillate. As a result, the stage 130 which is fixed to the other edges of the two suspensions 120 is resonated (i.e. is displaced) in the Y-axis direction.

By this, even in the driving apparatus 100d in the second example, it is possible to receive the same effects as those received by the driving apparatus 100a in the first example. In other words, it is possible to reduce the electric energy which is necessary to apply the excitation force necessary for the displacement of the stage 130 to the two suspensions 120. Therefore, it is possible to displace the stage 130 more efficiently, resulting in the lower power consumption of the driving apparatus 100d. Moreover, since the behavior of the oscillation system including the stage 130 and the two suspensions 120, which is the resonance, is used to displace the stage 130, it is possible to preferably maintain the stability of the position of the stage 130. As a result, it is possible to preferably obtain the repeatability with respect to aspects of the displacement of the stage 130. As a result, it is possible to record the data at a desired position on the recording medium 30, or to reproduce the data recorded at the desired position on the recording medium 30.

In addition, in the driving apparatus 100d in the second example, the excitation force is applied to the two suspensions 120. Here, if points of the two suspensions 120 to which the excitation force is applied are regarded as points of effort, if points of the two suspensions 120 to which the base 110 is fixed are regarded as the fulcrums, and if points of the two suspensions 120 to which the stage 130 is fixed are regarded as points of load, it can be seen that the stage 130 is resonated by using the principle of leverage. In other words, in the driving apparatus 100d in the second example, the two suspensions 120 are used as levers. By this, by virtue of the excitation force that realizes the amount of displacement that is relatively small, it is possible to displace the stage 130 relatively greatly.

Considering that the two suspensions 120 are used as levers, as described above, a distance between the points to which the excitation force is applied and the points at which the two suspensions 120 and the stage 130 are fixed is preferably greater than a distance between the points to which the excitation force is applied and the points at which the two suspensions 120 and the base 110 are fixed. In other words, the points to which the excitation force is applied are preferably close to the points at which the two suspensions 120 and the base 110 are fixed. As the points to which the excitation force is applied are closer to the points at which the two suspensions 120 and the base 110 are fixed, it is possible to displace the stage 130 relatively greatly by the excitation force that realizes the smaller amount of displacement.

Incidentally, from the viewpoint that the excitation force is simply applied, the driving apparatus 100d in the second example is not necessarily provided with the force transmission mechanisms 144. However, considering that the amount of change of the shape of the piezoelectric element 142 due to the application of the voltage is relatively small and that it is necessary to actually oscillate (i.e. displace) the two suspensions 120 by the excitation force, it is preferable to amplify the amount of change of the shape of the piezoelectric element 142 by using the force transmission mechanisms 144 and to apply the excitation force caused by the amplified amount of change to the two suspensions 120.

Incidentally, in the second example, the stage 130 is displaced by applying the excitation force caused by the piezoelectric effect to the two suspensions 120. However, even in the second example, as in the first example, in addition to or instead of the excitation force caused by the piezoelectric effect, the excitation force caused by the electromagnetic force and the excitation force caused by the electrostatic force may be applied to the two suspensions 120. Here, with reference to FIG. 10 and FIG. 11, an explanation will be given on a driving apparatus 100e in which the stage 130 is displaced by applying the excitation force caused by the electromagnetic force to the two suspensions 120 and a driving apparatus 100f in which the stage 130 is displaced by applying the excitation force caused by the electrostatic force to the two suspensions 120. FIG. 10 is a plan view conceptually showing the structure of the driving apparatus 100e in which the stage 130 is displaced by applying the excitation force caused by the electromagnetic force to two suspensions 120. FIG. 11 is a plan view conceptually showing the structure of the driving apparatus 100f in which the stage 130 is displaced by applying the excitation force caused by the electrostatic force to the two suspensions 120.

As shown in FIG. 10, the driving apparatus 100e is provided with two pairs of coils 151 and magnetic poles 152 at least one of which is fixed to the corresponding suspension 120 of the two suspensions 120, instead of the two pairs of electrodes 141, piezoelectric elements 142, electrodes 143, and force transmission mechanisms 144 which are provided for the driving apparatus 100d, as in the aforementioned driving apparatus 100b. In this case, the other of the coil 151 and the magnetic pole 152 that are not fixed to the corresponding suspension 120 may be fixed to the base 110. To each of the coils 151, a desired voltage is applied in desired timing from the actuator drive circuit 22. By this, in the driving apparatus 100e, a force caused by the electromagnetic force is applied to the two suspensions 120 as the excitation force. As a result, the stage 130 oscillates (i.e. is displaced) in the Y-axis direction. Even in such a driving apparatus 100e, it is possible to receive substantially the same effects as those received by the driving apparatus 100d in which the aforementioned excitation force caused by the piezoelectric effect is applied to the two suspensions 120.

As shown in FIG. 11, the driving apparatus 100f is provided with a plurality of electrodes 161 each of which is fixed to the base 110 and a plurality of electrodes 162 each of which is fixed to the corresponding suspension 120 of the two suspensions 120 and each of which is grounded, instead of the two pairs of electrodes 141, piezoelectric elements 142, electrodes 143, and force transmission mechanisms 144 which are provided for the driving apparatus 100d, as in the aforementioned driving apparatus 100c. In particular, one of the plurality of electrodes 162 arranged in a comblike manner is disposed between two of the plurality of electrodes 161 arranged in a comblike manner. To each of the plurality of electrodes 161, a desired voltage is applied in desired timing from the actuator drive circuit 22. By this, in the driving apparatus 100f, a force caused by the electrostatic force is applied to the two suspensions 120 as the excitation force. As a result, the stage 130 oscillates (i.e. is displaced) in the Y-axis direction. Even in such a driving apparatus 100f, it is possible to receive substantially the same effects as those received by the driving apparatus 100d in which the aforementioned excitation force caused by the piezoelectric effect is applied to the two suspensions 120.

(2-1-3) Third Example

Next, with reference to FIG. 12, a driving apparatus 100g in a third example will be explained. FIG. 12 is a plan view conceptually showing the structure of the driving apparatus 100g in the third example. Incidentally, the same constituents as those of the driving apparatus 100a in the first example described above (and moreover, the driving apparatus 100b and the driving apparatus 100c) and the driving apparatus 100d in the second example (and moreover, the driving apparatus 100e and the driving apparatus 100f) will carry the same referential numerals, and the detailed explanation thereof will be omitted.

As shown in FIG. 12, the driving apparatus 100d in the third example is provided with the base 110, the two suspensions 120, the stage 130, and the two pairs of electrodes 141, piezoelectric elements 142, electrodes 143, and force transmission mechanisms 144, as in the driving apparatus 100d in the second example.

In the driving apparatus 100g in the third example, in particular, the excitation force caused by the change of the shape of the piezoelectric element 142 due to the application of the voltage (i.e. the piezoelectric element) is applied directly to the stage 130 instead of the base 110 and the two suspensions 120. Moreover, even in the driving apparatus 100g in the third example, the excitation force is applied that can resonate the stage 130 at the resonance frequency determined by the two suspensions 120 and the stage 130, as in the driving apparatus 100a in the first example and the driving apparatus 100d in the second example. By this, the stage 130 to which the excitation force is applied is resonated (i.e. is displaced) in the Y-axis direction.

By this, even in the driving apparatus 100g in the third example, it is possible to receive the same effects as those received by the driving apparatus 100a in the first example. In other words, it is possible to reduce the electric energy which is necessary to apply the excitation force, which is necessary for the displacement of the stage 130, to the stage 130. Therefore, it is possible to displace the stage 130 more efficiently, resulting in the lower power consumption of the driving apparatus 100g. Moreover, since the behavior of the oscillation system including the stage 130 and the two suspensions 120, which is the resonance, is used to displace the stage 130, it is possible to preferably maintain the stability of the position of the stage 130. As a result, it is possible to preferably obtain the repeatability with respect to aspects of the displacement of the stage 130. As a result, it is possible to record the data at a desired position on the recording medium 30, or to reproduce the data recorded at the desired position on the recording medium 30.

Moreover, since the excitation force is applied to the stage 130, if the excitation force is applied in timing according to the displacement of the stage 130, i.e. intermittently, it is possible to resonate the stage 130. Specifically, although the distance between the force transmission mechanisms 144 and the stage 130 varies depending on the displacement of the stage 130, if the excitation force is applied when the force transmission mechanisms 144 and the stage 130 are in contact, it is possible to resonate the stage 130. Thus, it is no longer necessary to apply the excitation force all the time, so that it is possible to further reduce the electric energy which is necessary to apply the excitation force.

Incidentally, in the third example, the stage 130 is displaced by applying the excitation force caused by the piezoelectric effect to the stage 130. However, even in the third example, in addition to or instead of the excitation force caused by the piezoelectric effect as in the first and second examples, the excitation force caused by the electromagnetic force and the excitation force caused by the electrostatic force may be applied to the stage 130. Here, with reference to FIG. 13 and FIG. 14, an explanation will be given on a driving apparatus 100h in which the stage 130 is displaced by applying the excitation force caused by the electromagnetic force to the stage 130 and a driving apparatus 100i in which the stage 130 is displaced by applying the excitation force caused by the electrostatic force to the stage 130. FIG. 13 is a plan view conceptually showing the structure of the driving apparatus 100h in which the stage 130 is displaced by applying the excitation force caused by the electromagnetic force to the stage 130. FIG. 14 is a plan view conceptually showing the structure of the driving apparatus 100i in which the stage 130 is displaced by applying the excitation force caused by the electrostatic force to the stage 130.

As shown in FIG. 13, the driving apparatus 100h is provided with two pairs of coils 151 and magnetic poles 152 at least ones of which are fixed to the stage 130, instead of the two pairs of electrodes 141, piezoelectric elements 142, electrodes 143, and force transmission mechanisms 144 which are provided for the driving apparatus 100g, as in the driving apparatus 100b and the driving apparatus 100e described above. In this case, the others of the coil 151 and the magnetic pole 152 that are not fixed to the stage 130 may be fixed to the base 110. To each of the coils 151, a desired voltage is applied in desired timing from the actuator drive circuit 22. By this, in the driving apparatus 100h, a force caused by the electromagnetic force is applied to the stage 130 as the excitation force. As a result, the stage 130 oscillates (i.e. is displaced) in the Y-axis direction. Even in such a driving apparatus 100h, it is possible to receive substantially the same effects as those received by the driving apparatus 100g in which the aforementioned excitation force caused by the piezoelectric effect is applied to the stage 130.

As shown in FIG. 14, the driving apparatus 100i is provided with a plurality of electrodes 161 each of which is fixed to the base 110 and a plurality of electrodes 162 each of which is fixed to the stage 130 and each of which is grounded, instead of the two pairs of electrodes 141, piezoelectric elements 142, electrodes 143, and force transmission mechanisms 144 which are provided for the driving apparatus 100g, as in the driving apparatus 100c and the driving apparatus 100f described above. In particular, one of the plurality of electrodes 162 arranged in a comblike manner is disposed between two of the plurality of electrodes 161 arranged in a comblike manner. To each of the electrodes 161, a desired voltage is applied in desired timing from the actuator drive circuit 22. By this, in the driving apparatus 100i, a force caused by the electrostatic force is applied to the stage 130 as the excitation force. Even in such a driving apparatus 100i, it is possible to receive substantially the same effects as those received by the driving apparatus 100g in which the aforementioned excitation force caused by the piezoelectric effect is applied to the stage 130.

(2-1-4) Fourth Example

Next, with reference to FIG. 15 and FIG. 16, a driving apparatus 100j in a fourth example will be explained. FIG. 15 is a plan view conceptually showing the structure of the driving apparatus 100j in the fourth example. FIG. 16 is a plan view conceptually showing an aspect when the driving apparatus 100j in the fourth example operates. Incidentally, the same constituents as those of the driving apparatus 100a in the first example described above (and moreover, the driving apparatus 100b and the driving apparatus 100c), the driving apparatus 100d in the second example (and moreover, the driving apparatus 100e and the driving apparatus 100f), and the driving apparatus 100g in the third example (and moreover, the driving apparatus 100h and the driving apparatus 100i) will carry the same referential numerals, and the detailed explanation thereof will be omitted.

As shown in FIG. 15, the driving apparatus 100j in the fourth example is provided with the base 110, the two suspensions 120, the stage 130, the plurality of electrodes 161 each of which is fixed to the base 110, and the plurality of electrodes 162 each of which is fixed to the stage 130 and each of which is grounded, as in the driving apparatus 100i in the third example (refer to FIG. 14).

Particularly, the driving apparatus 100j in the fourth example is provided with two spring constant adjustment devices 170 corresponding to the two suspensions 120. Each of the two spring constant adjustment devices 170 is provided with a predetermined member 171 which can be freely attached to and detached from the corresponding suspension 120 of the two suspensions 120 and a spring 172 for applying a force to attach the member 171 to the corresponding suspension 120 or to detach the member 171 from the corresponding suspension 120.

The spring 172 extends in response to a control signal outputted from the actuator drive circuit 22. As a result, the member 171 is attached to the corresponding suspension 120. In other words, as shown in FIG. 16, the member 171 and the corresponding suspension 120 are unified. This results in a change of the spring constant of each of the two suspensions 120. On the other hand, the spring 172 contracts in response to the control signal outputted from the actuator drive circuit 22. As a result, the member 171 is detached from the corresponding suspension 120. In other words, the member 171 and the corresponding suspension 120 which are unified are detached. This results in a change of the spring constant of each of the two suspensions 120.

This changes the resonance frequency determined by the two suspensions 120 and the stage 130, so that it is possible to resonate the stage 130 at a desired frequency.

Incidentally, in addition to or instead of changing the resonance frequency by adjusting the spring constant of the two suspensions 120, the mass of the stage 130 may be adjusted to change the resonance frequency. Here, the structure of a driving apparatus 100k in which the mass of the stage 130 is adjusted will be explained with reference to FIG. 17. FIG. 17 is a plan view conceptually showing the structure of the driving apparatus 100k in which the mass of the stage 130 is adjusted.

As shown in FIG. 17, the driving apparatus 100k is provided with the base 110, the two suspensions 120, the stage 130, the plurality of electrodes 161 each of which is fixed to the base 110, the plurality of electrodes 162 each of which is fixed to the stage 130 and each of which is grounded, as in the aforementioned driving apparatus 100j, and a stage mass adjustment device 173. The stage mass adjustment device 173 is provided with a predetermined member 171 which can be freely attached to and detached from the stage 130 and a spring 172 for applying a force to attach the member 171 to the stage 130 or to detach the member 171 from the stage 130.

The spring 172 extends in response to a control signal outputted from the actuator drive circuit 22. As a result, the member 171 is attached to the stage 130. In other words, the member 171 and the stage 130 are unified. This results in a change of the mass of the stage 130. On the other hand, the spring 172 contracts in response to the control signal outputted from the actuator drive circuit 22. As a result, the member 171 is detached from the stage 130. In other words, the member 171 and the stage 130 which are unified are detached. This results in a change of the mass of the stage 130.

This changes the resonance frequency determined by the two suspensions 120 and the stage 130, so that it is possible to resonate the stage 130 at a desired frequency.

Incidentally, in the fourth example, the spring 172 is presented as a driving force generation member for applying, to the member 171, the force for attaching and detaching the member 171 with respect to the stage 130 or the corresponding suspension 120. Instead of the spring 172, however, a driving force generation member which uses the electrostatic force, the electromagnetic force, and the like may be adopted.

Incidentally, the aforementioned explanation describes the structure that is realized by combining the constituents for adjusting the resonance frequency with respect to the driving apparatus 100i in the third example. However, it is obvious that the constituents for adjusting the resonance frequency may be combined with respect to the other driving apparatus 100g or driving apparatus 100h in the third example. In the same manner, it is obvious that the constituents for adjusting the resonance frequency may be combined with respect to the other driving apparatuses 100a to 100c in the first example or the driving apparatuses 100d to 100f in the second example.

(2-2) Driving Apparatus Adopting Biaxial Driving Method

Next, with reference to FIG. 18 to FIG. 30, of the driving apparatus 100 in the examples, driving apparatuses adopting a biaxial driving method (specifically, driving apparatuses in a fifth example to an eighth example, described later) will be described. Incidentally, the driving apparatus adopting the biaxial driving method is a driving apparatus that can displace the probes 12 along two axes (e.g. X axis and Y axis). In other words, the driving apparatus adopting the biaxial driving method is a driving apparatus that can realize the two-dimension displacement of the probes 12.

Incidentally, the same constituents as those of the driving apparatus 100a in the first example (an moreover, the driving apparatus 100b and the driving apparatus 100c), the driving apparatus 100d in the second example (an moreover, the driving apparatus 100e and the driving apparatus 100f), the driving apparatus 100g in the third example (an moreover, the driving apparatus 100h and the driving apparatus 100i), and the driving apparatus 100j in the fourth example (an moreover, the driving apparatus 100k) described above will carry the same numerical references, and the detailed explanation thereof will be omitted.

(2-2-1) Fifth Example of Driving Apparatus

Firstly, with reference to FIG. 18 to FIG. 20, a driving apparatus 100l in a fifth example will be explained. FIG. 18 is a plan view conceptually showing the structure of the driving apparatus 100l in the fifth example. FIG. 19 is a plan view conceptually showing an aspect when a first stage 130-1 of the driving apparatus 100l in the fifth example shown in FIG. 18 is displaced. FIG. 20 is a plan view conceptually showing another aspect when a second stage 130-2 of the driving apparatus 100l in the fifth example shown in FIG. 18 is displaced.

As shown in FIG. 18, the driving apparatus 100l in the fifth example is provided with first bases 110-1, first suspensions 120-1 which are fixed to the first bases 110-1 at their one edges and which can extend and contract in an X-axis direction, a first stage 130-1 to which the other edges of the first suspensions 120-1 are fixed, second suspensions 120-2 which are fixed to the first stage 130-1 at their one edges and which can expand and contract in a Y-axis direction, and a second stage 130-2 to which the other edges of the second suspensions 120-2 are fixed and which is provided with the plurality of probes 12. As described above, in the driving apparatus 100l in the fifth example, the first stage 130-1 is supported by the two first suspensions 120-1, and the second stage 130-2 is supported by the two second suspensions 120-2. Moreover, the driving apparatus 100l in the fifth example is provided with the plurality of electrodes 161 each of which is fixed to respective one of the first bases 110-1 and the plurality of electrodes 162 each of which is fixed to the first stage 130-1 and each of which is grounded. Moreover, the driving apparatus 100l in the fifth example is provided with the electrode 141, the electrode 143 which is fixed to the first stage 130-1 and which is grounded, and the piezoelectric element 142 which is disposed between the electrode 141 and the electrode 143. Incidentally, the first base 110-1, the first suspension 120-1, the plurality of electrodes 161, and the plurality of electrodes 162 are disposed on each of the left and right sides of the first stage 130-1. Moreover, the second suspension 120-2 is disposed on each of the upper and lower sides of the second stage 130-2. In other words, the driving apparatus 100l in the fifth example is provided with two pairs of the first bases 110-1, two pairs of the first suspensions 120-1, two pairs of the plurality of electrodes 161, and two pairs of the plurality of electrodes 162. In the same manner, the driving apparatus 100l in the fifth example is provided with two pairs of the second suspensions 120-2.

Here, an explanation will be given on the operations of the driving apparatus 100l in the fifth example having the aforementioned structure. Firstly, to each of the plurality of electrodes 161, a desired voltage is applied in desired timing from the actuator drive circuit 22. By this, a force caused by the electrostatic force is applied to the first stage 130-1 as the excitation force. As a result, the first stage 130-1 oscillates (i.e. is displaced) in the X-axis direction by using the elasticity of the first suspensions 120-1, as shown in FIG. 19.

At this time, the actuator drive circuit 22 applies the desired voltage to each of the plurality of electrodes 161 in the desired timing such that the force for displacing the first stage 130-1 is applied in a stepwise manner or in a continuous manner by a predetermined amount.

Incidentally, in the explanation below, the force applied to the base 110 (or the suspensions 120 or the stage 130 as described later) for displacing the stage 130 in the stepwise manner or in the continuous manner by the predetermined amount (in other words, for displacing the stage 130 in an aspect other than the aspect of oscillating the stage 130 at the resonance frequency) is referred to as a "driving force".

More specifically, the actuator drive circuit 22 applies the desired voltage to each of the plurality of electrodes 161 in the desired timing such that the driving force for realizing a tracking operation on the recording surface of the recording medium 30 by the displacement of the first stage 130-1 is applied. For example, if the pitch of the data (i.e. track pitch) recorded on the recording medium 30 is t, the desired voltage is applied to each of the plurality of electrodes 161 in the desired timing so as to apply the driving force for displacing the first stage 130-1 by the distance t or distance Lt (wherein L is an integer of 1 or more). As a result, the first stage 130-1 is displaced in the stepwise manner or in the continuous manner by the predetermined amount.

On the other hand, to the electrode 141, a desired voltage is applied in desired timing from the actuator drive circuit 22. By this, a force caused by a change of the shape of the piezoelectric element 142 (i.e. the piezoelectric effect) is applied to the first stage 130-1 as the excitation force. By this, the two suspensions 120-2 which are fixed to the first stage 130-1 at their one edges start to oscillate. As a result, the second stage 130-2 which is fixed to the other edges of the two second suspensions 120-2 oscillates (i.e. is displaced) in the Y-axis direction by using the elasticity of the second suspensions 120-2, as shown in FIG. 20.

At this time, the actuator drive circuit 22 applies the desired voltage to the electrode 141 in the desired timing so as to apply the excitation force for oscillating (i.e. resonating) the second stage 130-2 at the resonance frequency determined by the two second suspensions 120-2 and the second stage 130-2. In particular, the actuator drive circuit 22 applies the desired voltage to the electrode 141 in the desired timing so as to apply the excitation force for resonating the second stage 130-2, with the first stage 130-1 as a reference position. As a result, the second stage 130-2 is resonated at the resonance frequency determined by the two second suspensions 120-2 and the second stage 130-2, if it is viewed as a relative position to the first stage 130-1.

As described above, in the driving apparatus 100*l* in the fifth example, it is possible to displace the second stage 130-2 in the X-axis direction while resonating it in the Y-axis direction, by displacing the first stage 130-1 in the X-axis direction and by resonating the second stage 130-2 disposed on the first stage 130-1 in the Y-axis direction. In other words, it is possible to biaxially drive the second stage 130-2 (i.e. the plurality of probes 12 disposed on the second stage 130-2). Thus, it is possible to record the data onto the substantially entire recording surface on the recording medium 30 having a rectangular shape, or to reproduce the data recorded on the substantially entire recording surface on the recording medium 30, by using the plurality of probes 12.

Moreover, even in the driving apparatus 100*l* in the fifth example, the second stage 130-2 is displaced in the Y-axis direction by using the resonance as in the aforementioned driving apparatus 100*a* in the first example and the like, so that it is possible to receive the same effects as those received by the driving apparatus 100*a* in the first example. In other words, it is possible to reduce the electric energy which is necessary to apply the excitation force necessary for the displacement of the second stage 130-2 to the first stage 130-1. Therefore, it is possible to displace the second stage 130-2 more efficiently, resulting in the lower power consumption of the driving apparatus 100*l*. Moreover, since the behavior of the oscillation system including the second stage 130-2 and the two second suspensions 120-2, which is the resonance, is used to displace the second stage 130-2, it is possible to preferably maintain the stability of the position of the second stage 130-2. As a result, it is possible to preferably obtain the repeatability with respect to aspects of the displacement of the second stage 130-2. As a result, it is possible to record the data at a desired position on the recording medium 30, or to reproduce the data recorded at the desired position on the recording medium 30.

Incidentally, in the driving apparatus 100*l* in the fifth example, if one of the first bases 110-1, one of the first suspensions 120-1, and the first stage 130-1 are regarded as one driving apparatus, it is possible to read, from the explanations and corresponding drawings described above, that the one driving apparatus including the one first base 110-1, the one first suspension 120-1, and the first stage 130-1 has substantially the same structure as the aforementioned driving apparatus adopting the uniaxial driving method (in particular, the driving apparatus 100*i* in the third example). Moreover, if the first stage 130-1, one of the second suspensions 120-2, and the second stage 130-2 are regarded as one driving apparatus, it is possible to read, from the explanations and corresponding drawings described above, that the driving apparatus including the first stage 130-1, the one second suspension 120-2, and the second stage 130-2 has substantially the same structure as the aforementioned driving apparatus adopting the uniaxial driving method (in particular, the driving apparatus 100*a* in the first example). In other words, the first stage 130-1 functions as the aforementioned stage 130 in the driving system including the first stage 130-1, the first suspension 120-1, and the first stage 130-1, whereas the first stage 130-1 functions as the aforementioned base 110 in the driving system including the first stage 130-1, the second suspension 120-2, and the second stage 130-2.

However, a second base 110-2 may be further disposed on the first stage 130-1, and the second suspensions 120-2 and the second stage 130-2 may be further disposed on the second base 110-2. Even in such construction, obviously, it is possible to preferably receive the aforementioned various effects.

Moreover, in the explanation about the driving apparatus 100*l* in the fifth example described, the second stage 130-2 is displaced in the Y-axis direction by applying the excitation force caused by the piezoelectric effect to the first stage 130-1. However, in addition to or instead of the excitation force caused by the piezoelectric effect, the excitation force caused by the electromagnetic force and the excitation force caused by the electrostatic force may be applied to the first stage 130-1. Here, with reference to FIG. 21 and FIG. 22, an explanation will be given on a driving apparatus 100*m* in which the second stage 130-2 is displaced in the Y-axis direction by applying the excitation force caused by the electromagnetic force to the first stage 130-1 and a driving apparatus 100*n* in which the second stage 130-2 is displaced in the Y-axis direction by applying the excitation force caused by the electrostatic force to the first stage 130-1. FIG. 21 is a plan view conceptually showing the structure of the driving apparatus 100*m* in which the second stage 130-2 is displaced in the Y-axis direction by applying the excitation force caused by the electromagnetic force to the first stage 130-1. FIG. 22 is a plan view conceptually showing the structure of the driving apparatus 100*n* in which the second stage 130-2 is displaced in the Y-axis direction by applying the excitation force caused by the electrostatic force to the first stage 130-1. Incidentally, here, the structure for applying the "excitation force" is explained; however, it is obvious that the structure for applying the "driving force" may also use the piezoelectric effect, the electromagnetic force, and the electrostatic force.

As shown in FIG. 21, the driving apparatus 100*m* is provided with the coil 151 and the magnetic pole 152 at least one of which is fixed to the first stage 130-1, instead of the electrode 141, the piezoelectric element 142, and the electrode 143 provided for the driving apparatus 100*l*, as in the driving apparatus 100*b*, the driving apparatus 100*e*, and the driving apparatus 100*h* described above. To the coil 151, a desired voltage is applied in desired timing from the actuator drive circuit 22. By this, in the driving apparatus 100*m*, a force caused by the electromagnetic force is applied to the first stage 130-1 as the excitation force. As a result, the second stage 130-2 oscillates (i.e. is displaced) in the Y-axis direction. Even in such a driving apparatus 100*m*, it is possible to receive substantially the same effects as those received by the driving apparatus 100*l* in which the aforementioned excitation force caused by the piezoelectric effect is applied to the first stage 130-1.

As shown in FIG. 22, the driving apparatus 100*n* is provided with the electrode 161 and the electrode 162 which is fixed to the first stage 130-1 and which is grounded, instead of the electrode 141, the piezoelectric element 142, and the electrode 143 provided for the driving apparatus 100*l*, as in the driving apparatus 100*c*, the driving apparatus 100*f*, and the driving apparatus 100*i* described above. To the electrode 161, a desired voltage is applied in desired timing from the actuator drive circuit 22. By this, in the driving apparatus 100*n*, a force caused by the electrostatic force is applied to the first stage 130-1 as the excitation force. As a result, the second stage 130-2 oscillates (i.e. is displaced) in the Y-axis direction. Even in such a driving apparatus 100*n*, it is possible to receive substantially the same effects as those received by the driving apparatus 100*l* in which the aforementioned excitation force caused by the piezoelectric effect is applied to the first stage 130-1.

Incidentally, considering that the excitation force caused by the electrostatic force is relatively small, the structure for applying the excitation force caused by the electrostatic force to the first stage 130-1 as shown in FIG. 22 may be provided with two types of driving sources for displacing the second stage 130-2 in the Y-axis direction. The structure will be explained with reference to FIG. 23. FIG. 23 is a plan view conceptually showing the structure of a driving apparatus 100*o* provided with the two types of driving sources for displacing the second stage 130-2 in the Y-axis direction.

As shown in FIG. 23, the driving apparatus 100*o* has the same structure as the above described driving apparatus 100*n*. Particularly, the driving apparatus 100*o* is provided with two pairs of coils 151 and magnetic poles 152 at least ones of which are fixed to the second stage 130-2. In this case, the others of the coil 151 and the magnetic pole 152 that are not fixed to the second stage 130-2 may be fixed to the first stage 130-1. To each of the coils 151, a desired voltage is applied in desired timing from the actuator drive circuit 22. By this, in the driving apparatus 100*o*, a force caused by the electromagnetic force can be applied to the second stage 130-2 as the excitation force. In other words, in the driving apparatus 100*o*, each of the excitation force caused by the electrostatic force and the excitation force caused by the electromagnetic force can be applied to the second stage 130-2.

Here, in the driving apparatus 100*o*, at an initial stage at which the second stage 130-2 starts to be resonated (i.e. in a predetermined period from the start of the resonance of the second stage 130-2), the excitation force caused by the electromagnetic force is applied to the second stage 130-2. Then, after the initial stage, the excitation force caused by the electromagnetic forced is applied to the second stage 130-2, as the excitation force to maintain the resonance of the second stage 130-2.

By this, it is possible to start to resonate the second stage 130-2 by using the relatively large excitation force caused by the electromagnetic force, and if the behavior of the second stage 130-2 is stabilized, it is also possible to maintain the resonance of the second stage 130-2 by using the relatively small excitation force caused by the electrostatic force. Thus, it is possible to resonate the second stage 130-2 more efficiently.

Moreover, it is possible to minimize the application of the voltage to the coils 151 which are heat sources for the second stage 130-2. In other words, it is possible to relatively limit or control heat generation caused by the coils 151 as the driving sources, in the movable portion including the two second suspensions 120-2 and the second stage 130-2. As a result, it is possible to preferably limit or control an adverse effect of the heat on the movable portion including the two second suspensions 120-2 and the second stage 130-2.

Incidentally, not only in the structure for applying the excitation force caused by the electrostatic force to the first stage 130-1 but also in the structure for applying the excitation force caused by the piezoelectric effect to the first stage 130-1 or the structure for applying the excitation force caused by the electromagnetic force to the first stage 130-1, there may be provided with the two types of driving sources for displacing the second stage 130-2 in the Y-axis direction.

Moreover, the aforementioned driving apparatus 100*l* in the fifth example is provided with one second stage 130-2 on the first stage 130-1; however, it may be provided with a plurality of second stages 130-2 on the first stage 130-1. In other words, the second stage 130-2 shown in FIG. 18 may be divided. The structure will be explained with reference to FIG. 24. FIG. 24 is a plan view conceptually showing the structure of a driving apparatus 100*p* provided with the plurality of second stages 130-2 on the first stage 130-1.

As shown in FIG. 24, the driving apparatus 100*p* is provided with two pairs of first bases 110-1 and first suspensions 120-1, the first stage 130-1, the plurality of electrodes 161, the plurality of electrodes 162, the electrode 141, the electrode 143, and the piezoelectric element 142, as in the aforementioned driving apparatus 100*l*.

Particularly, the driving apparatus 100*p* is provided with four second stages 130-2 each of which has a relatively small size (specifically, each of which has a smaller size than the second stage 130-2 in the driving apparatus 100*l*), on the first stage 130-1. To each of the four second stages 130-2, the corresponding second suspension 120-2 is fixed at its other edge. To the first stage 130-1, each of the four second suspension 120-2 is fixed at its one edge.

In the driving apparatus 100*p*, the actuator drive circuit 22 applies a desired voltage to the electrode 141 in desired timing so as to apply the excitation force for oscillating (i.e. resonating) each of the second stages 130-2 at the resonance frequency determined by the corresponding second suspension 120-2 and each of the second stages 130-2. As a result, each of the four second stages 130-2 is resonated at the resonance frequency determined by the corresponding second suspension 120-2 and each of the second stages 130-2.

By this, even in the driving apparatus 100p, it is possible to receive the same effects as those received by the driving apparatus 100l described above.

Moreover, since the size of each of the second stages 130-2 can be relatively reduced, it is possible to relatively reduce the mass of each of the second stages 130-2. Thus, even if the size of the second suspension 120-2 for supporting each of the second stages 130-2 is reduced (e.g. even if its thickness or its width is reduced), it is possible to preferably support each of the second stages 130-2. Therefore, it is possible to lighten or miniaturize the driving apparatus 100p.

Incidentally, in the aforementioned driving apparatus 100l in the fifth example (and moreover, the driving apparatus 100m to the driving apparatus 100p), the driving system in which the second stage 130-2 is resonated adopts a structure for applying the excitation force to the first stage 130-2 (i.e. the same structure as in the first example for applying the excitation force to the base 110 described above). However, as in the aforementioned driving apparatus 100d in the second example and moreover, the driving apparatus 100e and the driving apparatus 100f), it is obvious that the excitation force may be applied to the second suspension 120-2. In the same manner, as in the driving apparatus 100g in the third example (and moreover, the driving apparatus 100e and the driving apparatus 100f), it is obvious that the excitation force may be applied to the second stage 130-2.

Moreover, with respect to the aforementioned driving apparatus 100l in the fifth example (and moreover, the driving apparatus 100m to the driving apparatus 100p), obviously, the various structures explained in the first example to the fourth example described above may be applied, as occasion demands. In particular, it is effective to adjust the deviation of the amplitude, the resonance frequency, or the like of the plurality of stages 130 for more efficient adjustment of oscillation and amplitude, by incorporating the mechanism for adjusting the resonance frequency explained in the fourth example.

(2-2-2) Sixth Example

Next, with reference to FIG. 25, a driving apparatus 100q in a sixth example will be explained. FIG. 25 is a plan view conceptually showing the structure of the driving apparatus 100q in the sixth example.

As shown in FIG. 25, the driving apparatus 100q in the sixth example is provided with the first base 110-1, the first suspensions 120-1 which are fixed to the first base 110-1 at their one edges and which can expand and contract in the Y-axis direction, the first stage 130-1 to which the other edges of the first suspensions 120-1 are fixed, the second suspensions 120-2 which are fixed to the first stage 130-1 at their one edges and which can expand and contract in the X-axis direction, and the second stage 130-2 to which the other edges of the second suspensions 120-2 are fixed and which is provided with the plurality of probes 12. As described above, in the driving apparatus 100q in the sixth example, the first stage 130-1 is supported by the two first suspensions 120-1, and the second stage 130-2 is supported by the two second suspensions 120-2. Moreover, the driving apparatus 100q in the sixth example is provided with coils 151-1 and magnetic poles 152-1 at least ones of which are fixed to the first stage 130-1. In this case, the others of the coils 151-1 and the magnetic poles 152-1 that are not fixed to the first stage 130-1 may be fixed to the first base 110-1. Moreover, the driving apparatus 100q in the sixth example is provided with coils 151-2 and magnetic poles 152-2 at least ones of which are fixed to the second stage 130-2. In this case, the others of the coils 151-2 and the magnetic poles 152-2 that are not fixed to the second stage 130-2 are fixed to the first stage 130-1. Incidentally, the first suspension 120-1 is disposed on each of the upper and lower sides of the first stage 130-1. Moreover, the coils 151-1 and the magnetic poles 152-1 are disposed at symmetrical positions on the left and right sides of the first stage 130-1. Moreover, the second suspension 120-2 is disposed on each of the left and right sides of the second stage 130-2. Moreover, the coils 151-2 and the magnetic poles 152-2 are disposed at symmetrical positions on the upper and lower sides of the second stage 130-2.

Here, an explanation will be given on the operation of the driving apparatus 100q in the sixth example having the aforementioned structure. Firstly, to each of the two coils 151-1, a desired voltage is applied in desired timing from the actuator drive circuit 22. By this, a force caused by the electromagnetic force is applied to the first stage 130-1 as the excitation force. As a result, the first stage 130-1 oscillates (i.e. is displaced) in the Y-axis direction, by using the elasticity of the first suspension 120-1.

At this time, the actuator drive circuit 22 applies the desired voltage to each of the two coils 151-1 in the desired timing so as to apply the excitation force for oscillating (i.e. resonating) the first stage 130-1 at the resonance frequency determined by the two first suspensions 120-1 and the first stage 130-1. As a result, the first stage 130-1 is resonated at the resonance frequency determined by the two first suspensions 120-1 and the first stage 130-1.

On the other hand, to each of the two coils 151-2, a desired voltage is applied in desired timing from the actuator drive circuit 22. By this, a force caused by the electromagnetic force is applied to the second stage 130-2 as the excitation force. As a result, the second stage 130-2 is driven (i.e. is displaced) in the X-axis direction, by using the elasticity of the second suspensions 120-2.

At this time, the actuator drive circuit 22 applies the desired voltage to each of the two coils 151-2 in the desired timing so as to apply the driving force for displacing the second stage 130-2 in the stepwise manner or in the continuous manner by a predetermined amount. More specifically, the actuator drive circuit 22 applies the desired voltage to each of the two coils 151-2 in the desired timing such that the driving force for realizing a tracking operation on the recording surface of the recording medium 30 by the displacement of the second stage 130-2 is applied. As a result, the second stage 130-2 is displaced in the stepwise manner or in the continuous manner by the predetermined amount.

As described above, in the driving apparatus 100q in the sixth example, the second stage 130-2 can be displaced in the X-axis direction while resonating it in the Y-axis direction, as in the aforementioned driving apparatus 100l in the fifth example, by resonating the first stage 130-1 in the Y-axis direction and by displacing the second stage 130-2 disposed on the first stage 130-1 in the X-axis direction. In other words, it is possible to biaxially drive the second stage 130-2 (i.e. the plurality of probes 12 disposed on the second stage 130-2). Thus, it is possible to record the data onto the substantially entire recording surface on the recording medium 30 having a rectangular shape, or to reproduce the data recorded on the substantially entire recording surface on the recording medium 30, by using the plurality of probes 12.

Moreover, even in the driving apparatus 100q in the sixth example, the second stage 130-2 is displaced in the Y-axis direction by using the resonance as in the aforementioned driving apparatus 100a in the first example or the like, so that it is possible to receive the same effects as those received by the driving apparatus 100*a* in the first example. In other words, it is possible to reduce the electric energy which is necessary to apply the excitation force necessary for the displacement of the second stage 130-2 to the first stage 130-1. Therefore, it is possible to displace the second stage 130-2 more efficiently, resulting in the lower power consumption of the driving apparatus 100*q*. Moreover, since the behavior of the oscillation system including the first stage 130-1 provided with the second stage 130-2 and the two first suspensions 120-1, which is the resonance, is used to displace the first stage 130-1, it is possible to preferably maintain the stability of the position of the first stage 130-1 (i.e. the second stage 130-2 disposed on the first stage 130-1). As a result, it is possible to preferably obtain the repeatability with respect to aspects of the displacement of the second stage 130-2. As a result, it is possible to record the data at a desired position on the recording medium 30, or to reproduce the data recorded at the desired position on the recording medium 30.

Incidentally, in the driving apparatus 100*q* in the sixth example, the first base 110-1, one of the first suspensions 120-1, and the first stage 130-1 are regarded as one driving apparatus, it is possible to read, from the explanations and corresponding drawings described above, that the one driving apparatus including the first base 110-1, the one first suspension 120-1, and the first stage 130-1 has substantially the same structure as the aforementioned driving apparatus adopting the uniaxial driving method (in particular, the driving apparatus 100*i* in the third example). Moreover, if the first stage 130-1, one of the second suspensions 120-2, and the second stage 130-2 are regarded as one driving apparatus, it is possible to read, from the explanations and corresponding drawings described above, that the driving apparatus including the first stage 130-1, the one second suspension 120-2, and the second stage 130-2 has substantially the same structure as the aforementioned driving apparatus adopting the uniaxial driving method (in particular, the driving apparatus 100*i* in the third example). In other words, the first stage 130-1 functions as the aforementioned stage 130 in the driving system including the first stage 130-1, the first suspension 120-1, and the first stage 130-1, whereas the first stage 130-1 functions as the aforementioned base 110 in the driving system including the first stage 130-1, the second suspension 120-2, and ht second stage 130-2.

However, the second base 110-2 may be disposed on the first stage 130-1, and the second suspensions 120-2 and the second stage 130-2 may be disposed on the second base 110-2. Even in such construction, obviously, it is possible to preferably receive the aforementioned various effects.

In addition, in the driving apparatus 100*q*, the coils 151-1 and the magnetic poles 152-1 which are the driving sources for displacing the first stage 130-1 are disposed at symmetrical positions on the left and right sides of the first stage 130-1. By this, it is possible to control the position of the first stage 130-1 by using the two pairs of coils 151-1 and magnetic poles 152-1. By adjusting the voltage (e.g. its magnitude, phase, or the like) applied to each of the two pairs of coils 151-1 and magnetic poles 152-1, it is possible to preferably prevent a disadvantage of inclination or rotation of the first stage 130-1.

Moreover, the driving apparatus 100*q* uses the electromagnetic force by the electromagnetic interaction between ones of the coils 151-2 and the magnetic poles 152-2 that are fixed to the second stage 130-2 and the others of the coils 151-2 and the magnetic poles 152-2 that are fixed to the first stage 130-1, as the excitation force. In other words, the excitation force is applied to the second stage 130-2 as a relative force from the resonating first stage 130-1 (i.e. the first stage 130-1 as a self-resonator). Thus, the second stage 130-2, and the coils 151-2 and the magnetic poles 152-2 which are the driving sources for displacing the second stage 130-2 are disposed on the common first stage 130-1. By this, even if the first stage 130-1 is resonated, the second stage 130-2, and the coils 151-2 and the magnetic poles 152-2 which are the driving sources for displacing the second stage 130-2 are displaced in substantially the same aspect. Therefore, the driving apparatus 100*q* can be constructed without considering an influence of the bias in the Y-axis direction caused by the resonance of the first stage 130-1. By this, it is possible to simplify the structures of the second stage 130-2, and the coils 151-2 and the magnetic poles 152-2 which are the driving sources for displacing the second stage 130-2. Specifically, it is possible to miniaturize the magnetic pole 152-2.

Incidentally, instead of the structure for applying the excitation force caused by the electromagnetic force to the second stage 130-2, even if the structure for applying the excitation force caused by the electrostatic force to the second stage 130-2 is adopted, it is possible to preferably form the plurality of tomblike electrodes explained by using FIG. 10 and the like by applying the excitation force as the relative force from the first stage 130-1 to the second stage 130-2. Moreover, instead of the structure for applying the excitation force caused by the electromagnetic force to the second stage 130-2, even if the structure for applying the excitation force caused by the piezoelectric effect to the second stage 130-2 is adopted, it is possible to preferably form the electrode 141, the piezoelectric element 142, and the electrode 143 by applying the excitation force as the relative force from the first stage 130-1 to the second stage 130-2.

However, in addition to or instead of applying the excitation force as the relative force from the first stage 130-1 to the second stage 130-2, the excitation force as the relative force from the first base 110-1 may be applied to the second stage 130-2. This structure will be explained with reference to FIG. 26. FIG. 26 is a plan view conceptually showing another structure of the driving apparatus 100*r* in the sixth example.

As shown in FIG. 26, the driving apparatus 100*r* has substantially the same structure as the aforementioned driving apparatus 100*q*. In the driving apparatus 100*r*, in particular, the others of the coils 151-2 and the magnetic poles 152-2 that are not fixed to the second stage 130-2 (the coils 151-2 in FIG. 26) are fixed to the first base 110-1, instead of the first stage 130-1. Therefore, the driving apparatus 100*r* uses the electromagnetic force by the electromagnetic interaction between ones of the coils 151-2 and the magnetic poles 152-2 that are fixed to the second stage 130-2 and the others of the coils 151-2 and the magnetic poles 152-2 that are fixed to the first base 110-1, as the excitation force. In other words, the excitation force is applied to the second stage 130-2 as the relative force from the fixed first base 110-1.

In the driving apparatus 100*r* having the aforementioned structure, if the first stage 130-1 is resonated, the location of the second stage 130-2 varies with respect to the other of the coils 151-2 and the magnetic poles 152-2 which are the driving sources for displacing the second stage 130-2. Therefore, in the driving apparatus 100*r*, since there is no more influence of the unexpected bias in the X-axis direction, if the displacement of the plurality of probes 12 is focused on, the accuracy of the displacement increases.

Incidentally, the aforementioned driving apparatus 100*q* in the sixth example is provided with one second stage 130-2 on the first stage 130-1; however, it may be provided with a plurality of second stages 130-2 on the first stage 130-1. In other words, the second stage 130-2 shown in FIG. 25 may be divided. This structure will be explained with reference to FIG. 27. FIG. 27 is a plan view conceptually showing the structure of a driving apparatus 100s provided with the plurality of second stages 130-2 on the first stage 130-1.

As shown in FIG. 27, the driving apparatus 100s is provided with the first base 110-1, the two first suspensions 120-1, the coils 151-1, and the magnetic poles 152-1, as in the aforementioned driving apparatus 100q. Particularly, the driving apparatus 100s is provided with the two second stages 130-2 each of which has a relatively small size (specifically, each of which has a smaller size than the second stage 130-2 in the driving apparatus 100q). The two second stages 130-2 are arranged in line in the X-axis direction (in other words, the displacement direction by the tracking operation). In other words, the two second stages 130-2 in the driving apparatus 100s are obtained by dividing the second stage 130-2 in the driving apparatus 100q along a direction substantially perpendicular to the X-axis. To each of the two second stages 130-2, the other edge of the corresponding second suspension 120-2 is connected. Each of the two second suspensions 120-2 is connected to the first stage 130-1 at its one edge. Moreover, the driving apparatus 100s is provided with the two pairs of coils 151-2 and magnetic poles 152-2, each pair of which are the driving sources for displacing one second stage 130-2, for each second stage 130-2 independently.

In the driving apparatus 100s, the actuator drive circuit 22 applies a desired voltage to each coil 151-2 in desired timing so as to apply the excitation force for displacing each of the second stages 130-2. As a result, each of the two second stages 130-2 oscillates (i.e. is displaced) in the X-axis direction.

By this, even in the driving apparatus 100s, it is possible to receive the same effects as those received by the driving apparatus 100o described above.

Moreover, since the size of each of the second stages 130-2 can be reduced, it is possible to relatively reduce the mass of each of the second stages 130-2. Thus, even if the size of the second suspension 120-2 for supporting each of the second stages 130-2 is reduced (e.g. even if its thickness or its width is reduced), it is possible to preferably support each of the second stages 130-2. Therefore, it is possible to lighten or miniaturize the driving apparatus 100s.

In addition, in the driving apparatus 100s, the plurality of second stages 130-2 are arranged to be in line in the displacement direction by the tracking operation. Here, in the recording medium 30 having a rectangular shape, there may be variations between thermal expansion in one area on the recording surface of the recording medium 30 and thermal expansion in another area distant from the one area. Thus, there may be such a disadvantage that the pitch of data in the one area does not match the pitch of data in the other area. Here, if using a driving apparatus provided with a single second stage 130-2, the tracking operation is performed on all the probes 12 by a common distance. Therefore, the probes 12 provided in vicinity of one edge of the second stage 130-2 can perform data recording and reproduction in a desired area portion (e.g. an area portion to record the data, an area portion to reproduce the data) in the one area on the recording surface of the recording medium 30, whereas the probes 12 provided in vicinity of the other edge of the second stage 130-2 cannot perform the data recording and reproduction in a desired area portion in the other area on the recording surfaced of the recording medium 30, which may be disadvantageous. According to the driving apparatus 100s, however, the two second stages 130-2 are provided, and each of the two second stages 130-2 is displaced by the corresponding driving source of the two independent driving sources. Therefore, even if there are variations between the thermal expansion in the one area on the recording surface of the recording medium 30 and the thermal expansion in the other area, the displacement of the probes 12 in each of the one area and the other area can be independently performed, so that it is possible to preferably perform the data recording operation and reproduction operation with respect to each of the one area and the other area.

Incidentally, with respect to the aforementioned driving apparatus 100q in the sixth example (and moreover, the driving apparatus 100r to the driving apparatus 100s), obviously, the various structures explained in the first example to the fifth example described above may be applied, as occasion demands.

(2-2-3) Seventh Example

Next, with reference to FIG. 28 and FIG. 29, a driving apparatus 100t in a seventh example will be explained. FIG. 28 is a plan view conceptually showing the structure of the driving apparatus 100t in the seventh example. FIG. 29 is a plan view conceptually showing an aspect when the stage of the driving apparatus 100t in the seven example shown in FIG. 28 is displaced.

As shown in FIG. 28, the driving apparatus loot in the seventh example is provided with the stage 130 provided with the plurality of probes 12. On each of the left and right sides of the stage 130, there are provided the two first suspensions 120-1 each of which extends in a longitudinal direction and each of which is fixed to the stage 130 at its one edge. Incidentally, in the explanation below, for simplification of explanation, the structure of the right side of the stage 130 will be described; however, the left side of the stage 130 obviously has the same structure.

The two first suspensions 120-1 are arranged to match the longitudinal direction and the X-axis direction and to be adjacent in a lateral direction (i.e. Y-axis direction). The other edges of the two first suspensions 120-1 are fixed to one edges of two driving sources 180. The driving sources 180 are arranged in the Y-axis direction and each of them is provided with an excitation force application device 181 for applying the excitation force to displace the stage 130 in the Y-axis direction; and a driving force application device 182 for applying the driving force to displace the stage 130 in the X-axis direction. To the other edges of the driving sources 180, the two second suspensions 120-2 are fixed which extend in the longitudinal direction. The two second suspension 120-2 are arranged to match the longitudinal direction and the X-axis direction and to be adjacent in the lateral direction (i.e. Y-axis direction). The other edges of the two second suspensions 120-2 are fixed to one edge of a third suspension 120-3 which can extend and contract in the X-axis direction. The other edge of the third suspension 120-3 is fixed to the base 110. Moreover, the stage 130 is connected to a tracking circuit 190 for performing the tracking operation of the stage 130 in the X-axis direction in a narrower range than the tracking operation by the driving force application device 182.

Incidentally, the stage 130, the two first suspension 120-1, the two driving sources 180, the two second suspensions 120-2, the third suspension 120-3, and the base 110 are arranged in line in the X-axis direction.

The stage 130 is displaced in the Y-axis direction, as shown in FIG. 29, by using the elasticity of the two first suspensions 120-1 and the two second suspensions 120-2. In this case, the two first suspensions 120-1 actually oscillate, whereas the two second suspensions 120-2 do not oscillate or rarely oscillate. Thus, the second suspensions 120-2 may be omitted so that the driving sources 180 and the third suspension 120-3 are connected. Alternatively, the second suspensions 120-2 and the third suspension 120-3 may be unified.

Moreover, the stage 130 is displaced in the X-axis direction, as shown in FIG. 29, by using the elasticity of the third suspension 120-3. The excitation force and the driving force for displacing the stage 130 as described above are applied by applying a desired voltage in desired timing from the actuator drive circuit 22 to the excitation force application device 181 and the driving force application device 182 provided for the driving source 180. Incidentally, the excitation force application device 181 and the driving force application device 182 may have the structure for applying the driving force and the excitation force caused by the piezoelectric element (specifically, the electrode 141, the piezoelectric element 142, and the electrode 143), or the structure for applying the driving force and the excitation force caused by the electromagnetic force (specifically, the coil 151 and the magnetic pole 152), or the structure for applying the driving force and the excitation force caused by the electrostatic force (specifically, the electrode 161 and the electrode 162).

Moreover, the actuator drive circuit 22 applies the desired voltage in the desired timing to the excitation force application device 181 so as to apply the excitation force for oscillating (i.e. resonating) the stage 130 at the resonance frequency determined by the stage 130 and the two first suspensions 120-1 on each side, i.e. four in total. As a result, the stage 130 is resonated at the resonance frequency determined by the stage 130 and the two first suspensions 120-1 on each side, i.e. four in total.

On the other hand, the actuator drive circuit 22 applies the desired voltage in the desired timing to the driving force application device 182 so as to apply the driving force for displacing the stage 130 in the stepwise manner or in the continuous manner by a predetermined amount. As a result, the stage 130 is displaced in the X-axis direction in the stepwise manner or in the continuous manner by the predetermined amount.

In addition, the tracking circuit 190 displaces the stage 130 in the stepwise manner or in the continuous manner by a predetermined amount and by a finer unit than the tracking operation by the driving force application device 182. As a result, the tracking operation is highly accurately performed on the stage 130 in the X-axis direction.

Thus, the driving apparatus 100t in the seventh example can resonate the stage 130 in the Y-axis direction and displace the stage 130 in the X-axis direction. In other words, it is possible to biaxially drive the stage 130 (i.e. the plurality of probes 12 disposed on the stage 130). Thus, it is possible to record the data onto the substantially entire recording surface on the recording medium 30 having a rectangular shape, or to reproduce the data recorded on the substantially entire recording surface on the recording medium 30, by using the plurality of probes 12.

Moreover, even in the driving apparatus 100t in the seventh example, since the stage 130 is displaced in the Y-axis direction by using the resonance as in the aforementioned driving apparatus 100a in the first example or the like, it is possible to receive the same effects as those received by the driving apparatus 100a in the first example. In other words, it is possible to reduce the electric energy which is necessary to apply the excitation force necessary for the displacement of the stage 130. Therefore, it is possible to displace the stage 130 more efficiently, resulting in the lower power consumption of the driving apparatus 100t. Moreover, since the behavior of the oscillation system including the stage 130 and the two suspensions 120-1, which is the resonance, is used to displace the stage 130, it is possible to preferably maintain the stability of the position of the stage 130. As a result, it is possible to preferably obtain the repeatability with respect to aspects of the displacement of the stage 130. As a result, it is possible to record the data at a desired position on the recording medium 30, or to reproduce the data recorded at the desired position on the recording medium 30.

Incidentally, in the driving apparatus 100t in the seventh example, the phase (or direction) of the excitation force applied by the upper driving source 180 of the two driving sources 180 arranged in the Y-axis direction may be shifted from the phase (or direction) of the excitation force applied by the lower driving source 180 of the two driving sources 180 arranged in the Y-axis direction. By shifting the phases of the excitation forces applied by the two driving sources 180 arranged in the Y-axis direction (i.e. the direction of the resonance) as described above, the amplitude of the resonance of the stage 130 (i.e. the displacement range in the Y-axis direction of the stage 130) can be adjusted. For example, if the upper driving source 180 applies the excitation force for displacing the stage 130 to the upper side, and if the lower driving source 180 applies the excitation force for displacing the stage 130 to the lower side (i.e. on the opposite side of the direction in which the excitation force applied by the upper driving source 180 displaces the stage 130), it is possible to attenuate the amplitude of the resonance of the stage 130. In the same manner, if the upper driving source 180 applies the excitation force for displacing the stage 130 to the upper side, and if the lower driving source 180 applies the excitation force for displacing the stage 130 to the lower side (i.e. on the same side as the direction in which the excitation force applied by the upper driving source 180 displaces the stage 130), it is possible to amplify the amplitude of the resonance of the stage 130.

The aforementioned examples shows that the phases of the two driving sources are shifted by 180 degrees; however, the phases may be shifted not only by 180 degrees but also by 45 degrees, by 90 degrees, by other numeral values, or the phases may be changed continuously. In this case, slight amplitude adjustment is possible.

Incidentally, with respect to the aforementioned driving apparatus loot in the seventh example, obviously, the various structures explained in the first example to the sixth example described above may be applied, as occasion demands.

(2-2-4) Eighth Example

Next, with reference to FIG. 30, a driving apparatus 100u in an eighth example will be explained. FIG. 30 is a plan view conceptually showing trajectories of the displacement of the plurality of probes 12 realized by the driving apparatus 100u in the eighth example.

The driving apparatus 100l in the fifth example (and moreover, the driving apparatus 100m to the driving apparatus 100p), the driving apparatus 100q in the sixth example (and moreover, the driving apparatus 100r and the driving apparatus 100s), and the driving apparatus 100t in the seventh example described above operate so as to realize such a state that the second stage 130-2 is resonated only in the Y-axis direction. In other words, the second stage 130-2 is not resonated in the X-axis direction. The driving apparatus 100u in the eighth example, however, operates so as to realize such a state that the second stage 130-2 is resonated in each of the Y-axis direction and the X-axis direction, while having the same structure as those of the driving apparatus 100l in the fifth example (and moreover, the driving apparatus 100m to the driving apparatus 100p), the driving apparatus 100q in the sixth example (and moreover, the driving apparatus 100r and the driving apparatus 100s), and the driving apparatus 100t in the seventh example described above.

At this time, in the driving apparatus 100u in the eighth example, the phase of the resonance in the X-axis direction of the second stage 130-2 and the phase of the resonance in the Y-axis direction of the second stage 130-2 are shifted by approximately 90 degrees. In other words, a desired voltage is applied in desired timing from the actuator drive circuit 22 so as to apply the excitation force by which the phase of the resonance of the second stage 130-2 in the X-axis direction and the phase of the resonance of the second stage 130-2 in the Y-axis direction can be shifted by approximately 90 degrees. As a result, the trajectories of the plurality of probes 12 are circular orbits as shown in FIG. 30.

In this case, the radius of the circular orbit may be changed depending on the number of the probes 12 disposed on the second stage 130-2. For example, if the number of the probes 12 is relatively small, it is preferable to increase the radius of the circular orbit because the area portion in which the data recording and reproduction are performed by one probe 12 becomes relatively large. On the other hand, if the number of the probes 12 is relatively large, it is preferable to reduce the radius of the circular orbit due to the area portion in which the data recording and reproduction are performed by one probe 12 becomes relatively small.

Even in such a driving apparatus 100u, it is possible to properly receive the aforementioned various effects.

Incidentally, with respect to the aforementioned driving apparatus 100u in the eighth example, obviously, the various structures explained in the first example to the seventh example described above may be applied, as occasion demands.

Incidentally, the aforementioned explanation describes the example that the plurality of probes 12 are disposed on the stage 130 of the driving apparatus 100; however, instead of the plurality of probes 12, the recording medium 30 may be disposed on the stage 130 of the driving apparatus 100.

Moreover, the aforementioned explanation describes the example that the driving apparatus 100 is applied to the ferroelectric recording/reproducing apparatus 1; however, obviously, the driving apparatus 100 may be applied not only to the ferroelectric recording/reproducing apparatus 1 but also to various information recording/reproducing apparatuses including various probe memories. Moreover, the driving apparatus 100 may be applied not only to the information recording/reproducing apparatuses but also to a structure using the probe (e.g. AFM (Atomic Force Microscopy)). Moreover, the driving apparatus 100 may be applied to various apparatuses for displacing the stage in the two axes: the X-axis and the Y-axis.

Moreover, in the present invention, various changes may be made, if desired, without departing from the essence or spirit of the invention which can be read from the claims and the entire specification. A driving apparatus which involves such changes is also intended to be within the technical scope of the present invention.

INDUSTRIAL APPLICABILITY

The driving apparatus of the present invention can be applied to a driving apparatus for driving a medium or the like in a uniaxial direction or biaxial directions so that the probe scans the surface or the like of the medium.

The invention claimed is:
1. A driving apparatus comprising:
a stage portion which can be displaced;
a first elastic portion whose one end is connected to the stage portion and which has elasticity to displace the stage portion in one direction;
a driving source device, to which other end of the first elastic portion is connected, comprising: a first applying device for applying, to the other end of the first elastic portion, an excitation force for displacing the stage portion such that the stage portion is resonated in the one direction at a resonance frequency determined by the stage portion and the first elastic portion; and a second applying device for applying a driving force for displacing, in a stepwise manner or in a continuous manner, the stage portion in other direction which is substantially perpendicular to the one direction;
a second elastic portion whose one end is connected to the driving source device and which has elasticity to displace the stage portion in the one direction;
a third elastic portion whose one end is connected to other end of the second elastic portion and which has elasticity to displace the stage portion in the other direction; and
a base portion to which other end of the third elastic portion is connected.

2. The driving apparatus according to claim 1, wherein the stage portion, the first elastic portion, the driving source device, the second elastic portion, the third elastic portion, and the base portion are arranged along the other direction.

3. The driving apparatus according to claim 1, wherein two first elastic portions, two driving source devices, two second elastic portions, two third elastic portions, and two base portions are arranged along the other direction at symmetric positions centered on the stage portion.

4. The driving apparatus according to claim 1, wherein two first elastic portions, two driving source devices, and two second elastic portions are arranged along the one direction.

5. The driving apparatus according to claim 1, wherein the second elastic portion and the third elastic portion are unified.

6. The driving apparatus according to claim 1, wherein the first applying device applies the excitation force with a period according to the resonance frequency.

7. The driving apparatus according to claim 1, wherein the first applying device applies the excitation force caused by a piezoelectric effect.

8. The driving apparatus according to claim 1, wherein the first applying device applies the excitation force caused by an electromagnetic force.

9. The driving apparatus according to claim 1, wherein the first applying device applies the excitation force caused by an electrostatic force.

10. A driving apparatus comprising:
a stage portion which can be displaced;
a first elastic portion whose one end is connected to the stage portion and which has elasticity to displace the stage portion in one direction;
a driving source device, to which other end of the first elastic portion is connected, comprising: a first applying device for applying, to the other end of the first elastic portion, an excitation force for displacing the stage portion such that the stage portion is resonated in the one direction at a resonance frequency determined by the stage portion and the first elastic portion; and a second applying device for applying a driving force for displacing, in a stepwise manner or in a continuous manner, the stage portion in other direction which is substantially perpendicular to the one direction;
a second elastic portion whose one end is connected to the driving source device and which has elasticity to displace the stage portion in the other direction; and
a base portion to which other end of the second elastic portion is connected.

* * * * *